US011630374B2

(12) United States Patent
Richins

(10) Patent No.: US 11,630,374 B2
(45) Date of Patent: *Apr. 18, 2023

(54) PRODUCTION EQUIPMENT SUPPORT ASSEMBLY

(71) Applicant: Light-Path, LLC, Orem, UT (US)

(72) Inventor: Russell D. Richins, Orem, UT (US)

(73) Assignee: Light-Path, LLC, Orem, UT (US)

( * ) Notice: Subject to any disclaimer, the term of this patent is extended or adjusted under 35 U.S.C. 154(b) by 289 days.

This patent is subject to a terminal disclaimer.

(21) Appl. No.: 16/244,094

(22) Filed: Jan. 9, 2019

(65) Prior Publication Data

US 2019/0250485 A1 Aug. 15, 2019

Related U.S. Application Data

(60) Provisional application No. 62/662,215, filed on Apr. 24, 2018, provisional application No. 62/615,430, filed on Jan. 9, 2018.

(51) Int. Cl.
*G03B 15/02* (2021.01)
*F16M 11/24* (2006.01)

(52) U.S. Cl.
CPC ............ *G03B 15/02* (2013.01); *F16M 11/24* (2013.01); *F16M 2200/08* (2013.01)

(58) Field of Classification Search
USPC ............ 248/346.01, 346.03, 346.04, 346.06, 248/346.07, 346.5, 519; 108/156, 159
See application file for complete search history.

(56) References Cited

U.S. PATENT DOCUMENTS

| 4,815,734 | A | 3/1989 | Verhulst |
| 5,018,468 | A | 5/1991 | Peterson |
| 6,332,780 | B1 | 12/2001 | Traxel et al. |
| 6,488,256 | B1 * | 12/2002 | Chang .................... B23D 47/02 248/346.03 |
| 6,536,731 | B1 | 3/2003 | Tegland |
| 7,611,112 | B2 * | 11/2009 | Lin ........................ B60R 11/02 248/274.1 |
| 8,100,552 | B2 | 1/2012 | Spero |
| 9,314,084 | B2 | 4/2016 | Maldonado |

(Continued)

FOREIGN PATENT DOCUMENTS

CN 205449295 U 8/2016

*Primary Examiner* — Alfred J Wujciak

(57) ABSTRACT

An equipment mounting system and assembly for rapid mounting and supporting of a fixture mount and a fixture or other equipment, such as motion picture production fixtures and other similar equipment, to a mount support base without fasteners. The equipment mounting assembly can comprise one or more fixture mounts having a base plate and a fixture coupling extending from the base plate, the one or more fixture mounts being operable with an equipment mounting system comprising a mount support base having an upper surface, and a retention system operable to selectively and releasably and interchangeably capture and secure one or more fixture mounts to the mount support base. The retention system can comprise a position keep system capable of applying a biasing force to a captured fixture mount. The equipment mounting assembly and the retention system can be configured to accommodate fixture mounts of different sizes or types.

31 Claims, 23 Drawing Sheets

(56) References Cited

U.S. PATENT DOCUMENTS

| | | | |
|---|---|---|---|
| 9,809,041 B1 | 11/2017 | Lin | |
| 10,408,493 B1* | 9/2019 | Carpenter | C04B 26/20 |
| 10,684,534 B2* | 6/2020 | Richins | F16M 13/022 |
| 2003/0150970 A1* | 8/2003 | Kuo | B25B 5/068 |
| | | | 248/346.03 |
| 2005/0052082 A1* | 3/2005 | Noro | E05F 15/695 |
| | | | 307/10.1 |
| 2005/0139745 A1* | 6/2005 | Liao | G06F 1/1601 |
| | | | 248/346.01 |
| 2006/0237616 A1* | 10/2006 | Hasenour | H02B 1/0565 |
| | | | 248/346.06 |
| 2015/0289662 A1* | 10/2015 | Iulita | A47C 9/022 |
| | | | 297/344.1 |
| 2018/0107094 A1 | 4/2018 | Yowler et al. | |
| 2019/0127084 A1 | 5/2019 | Yau | |
| 2019/0236919 A1 | 8/2019 | Mehdi et al. | |
| 2020/0240573 A1* | 7/2020 | Fischer | F16B 5/0685 |

\* cited by examiner

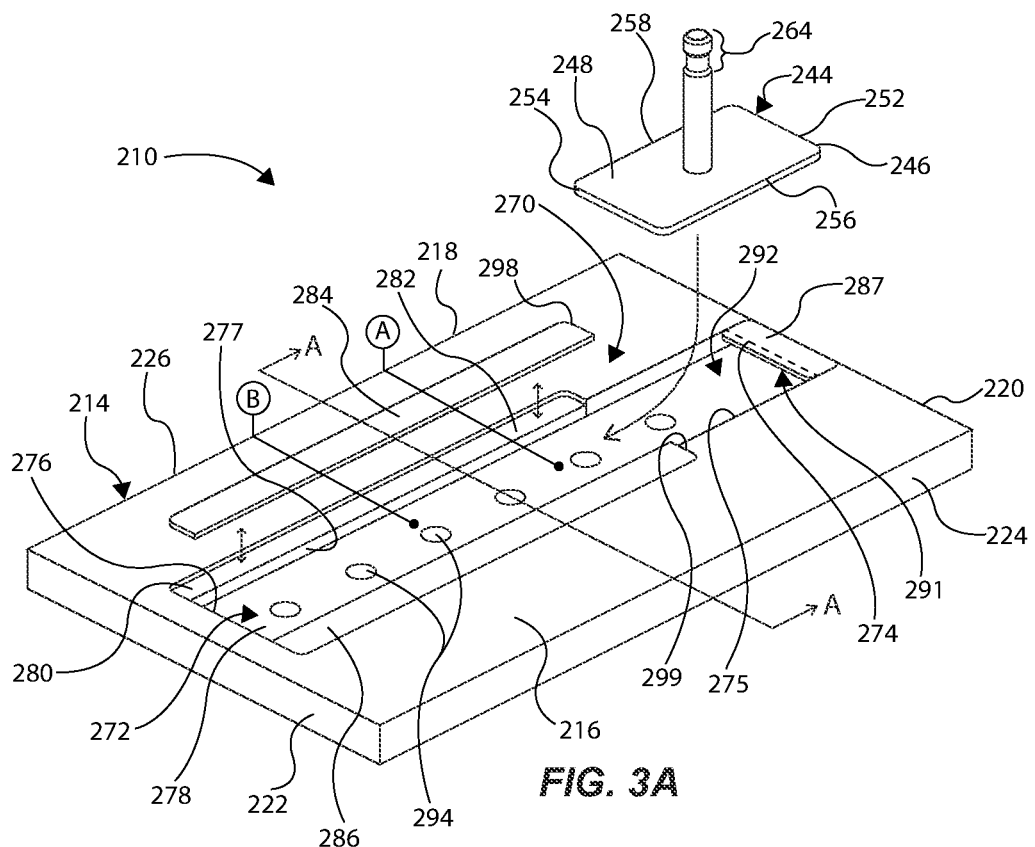
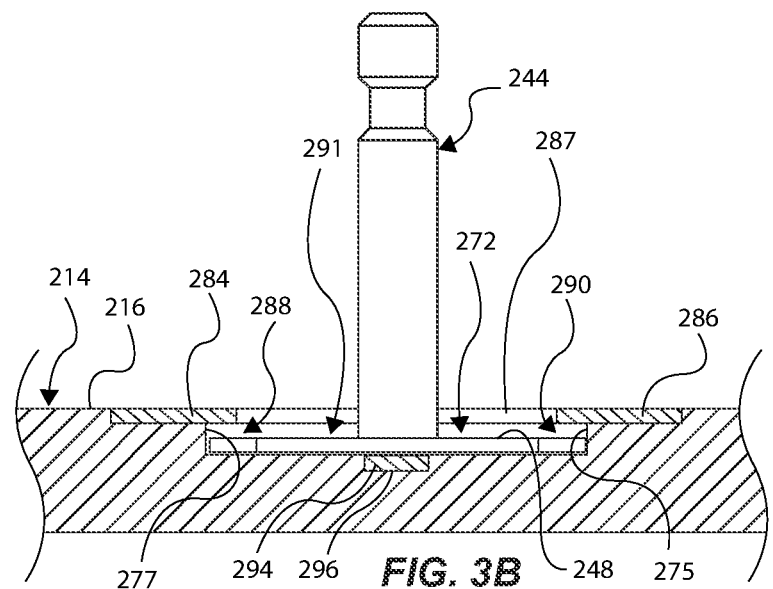
FIG. 3A
FIG. 3B

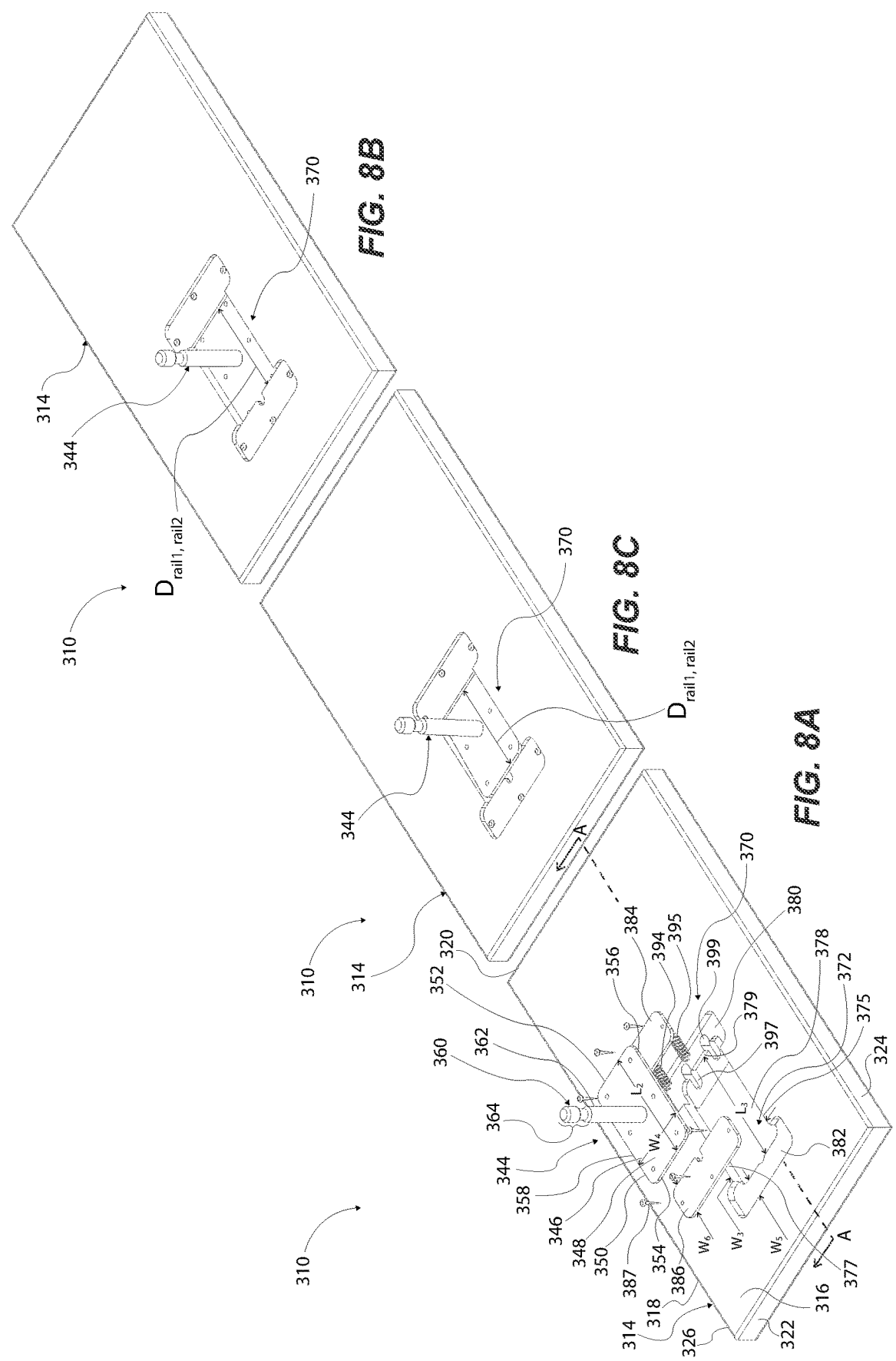

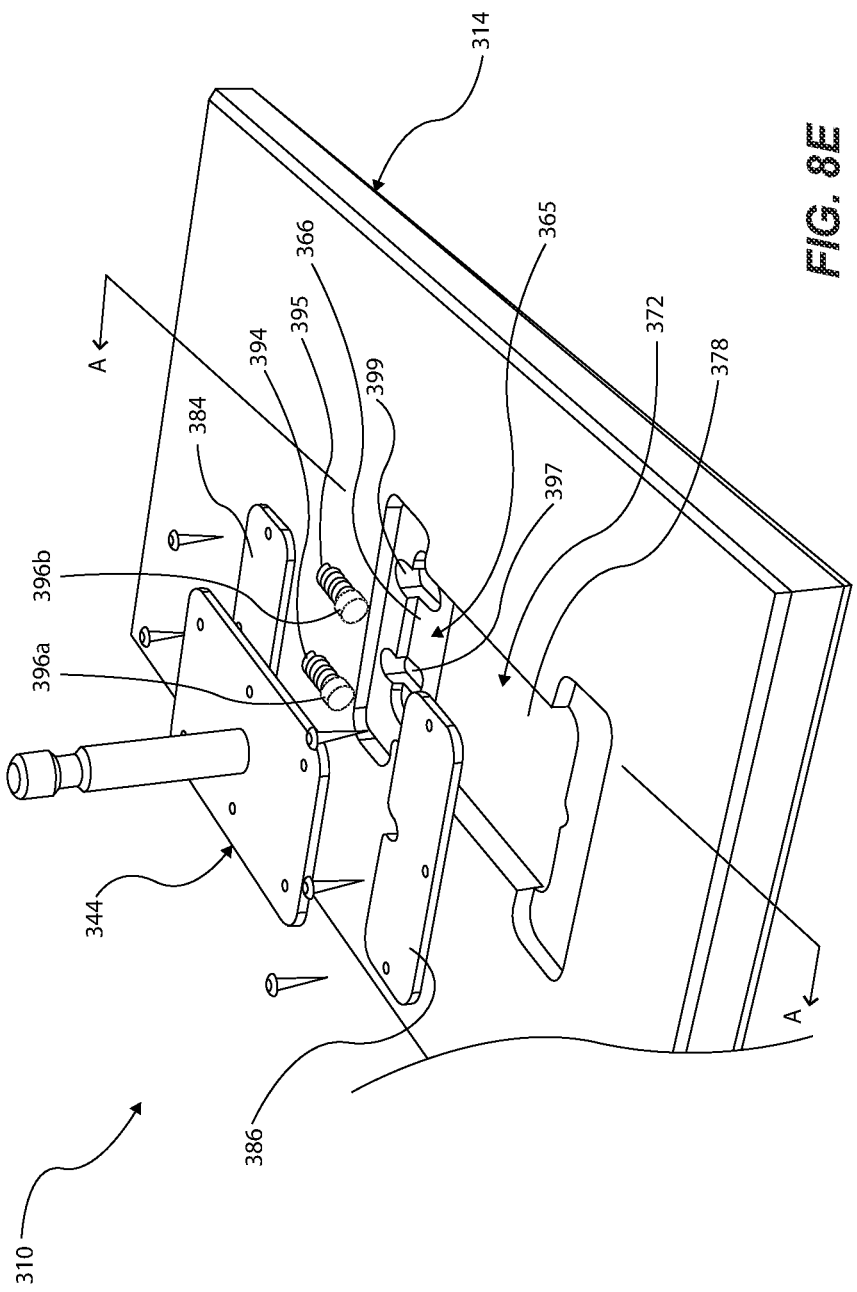

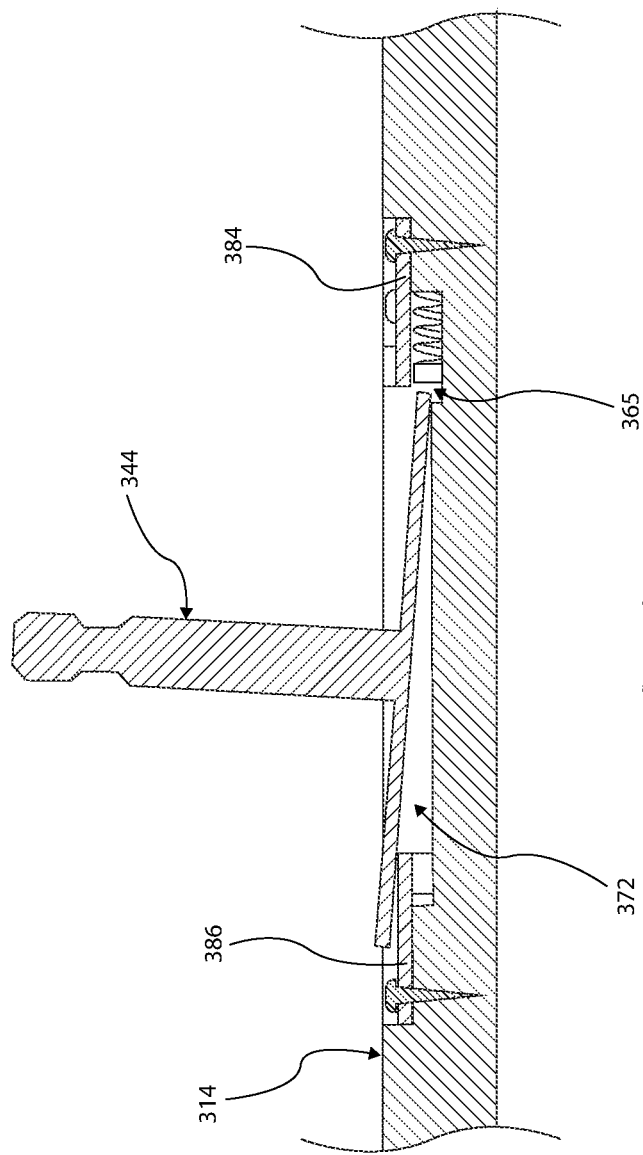

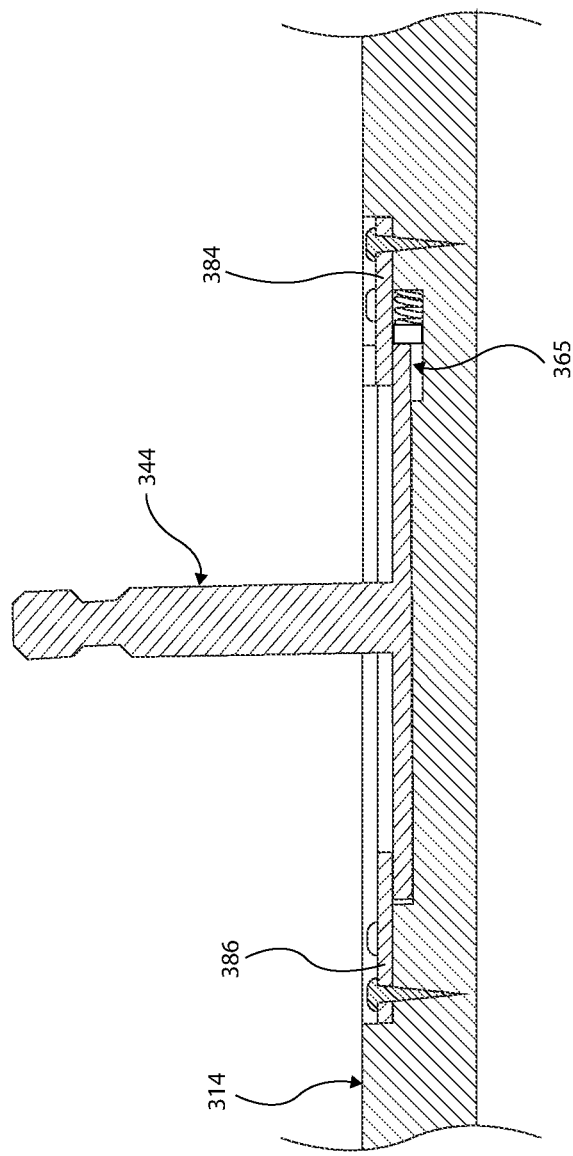

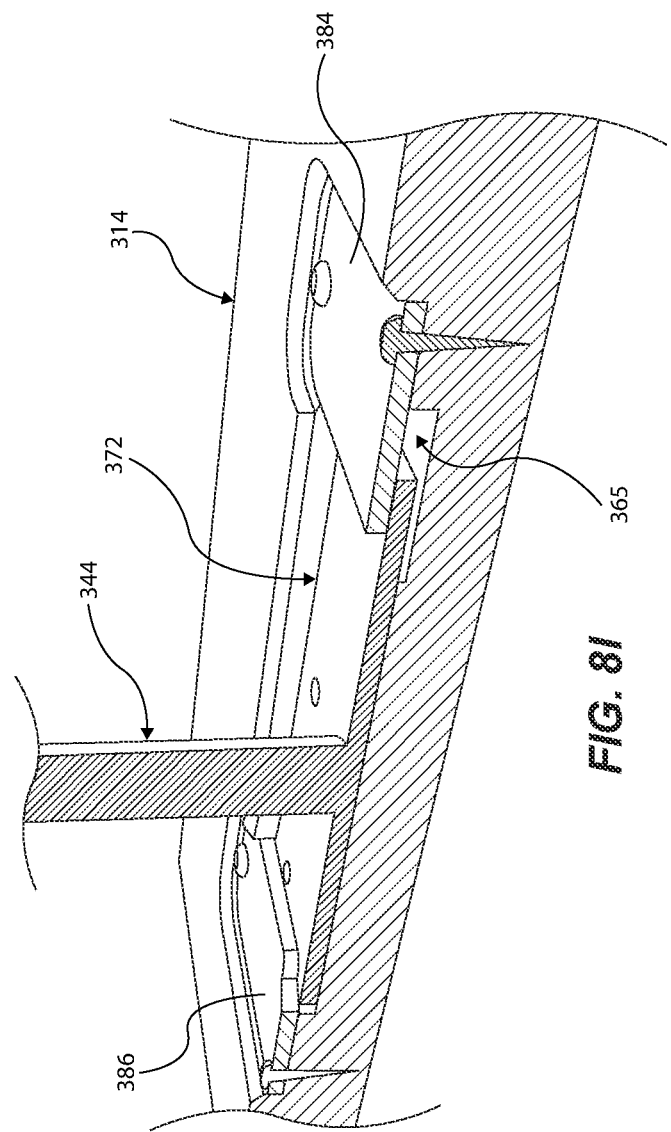

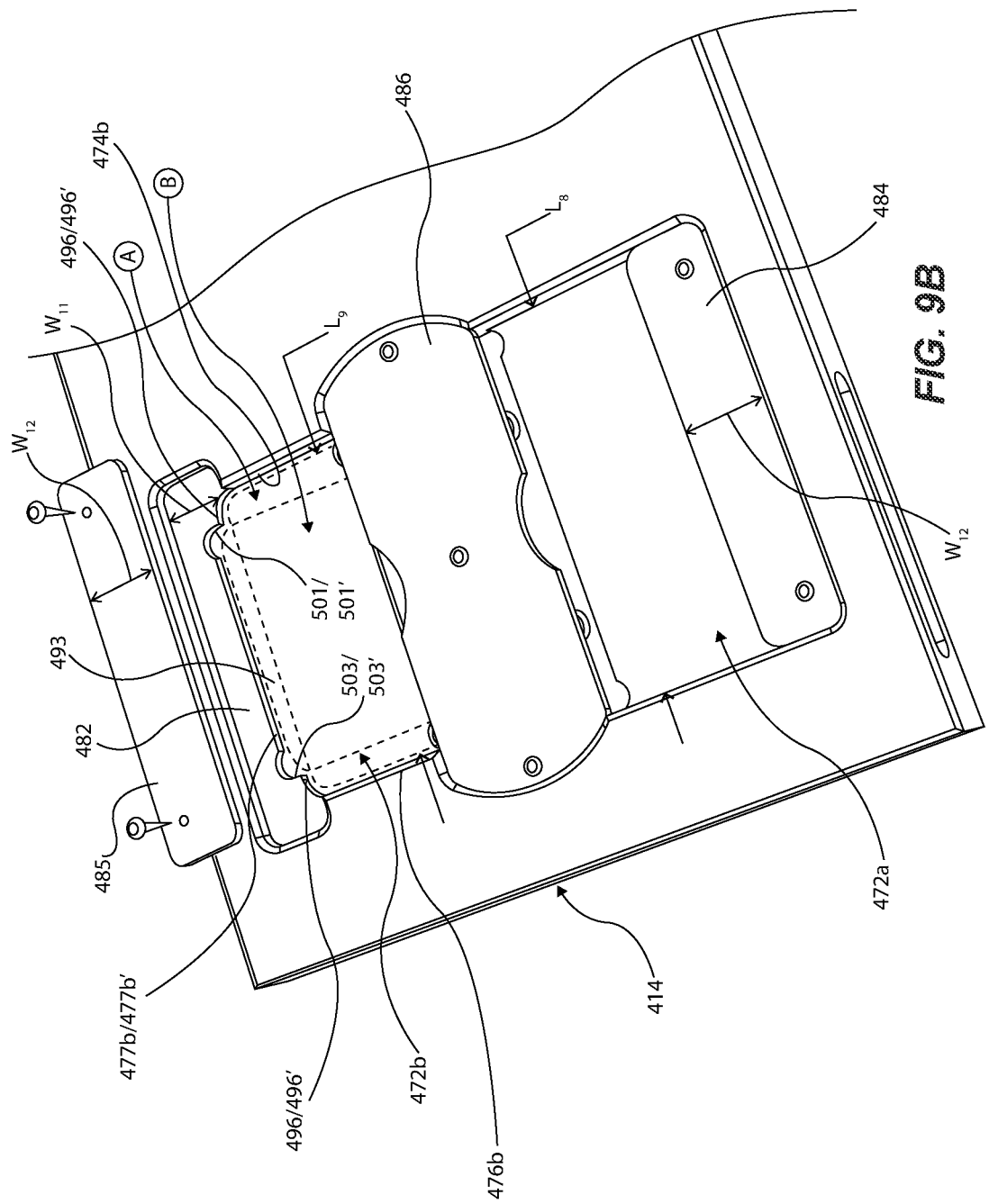

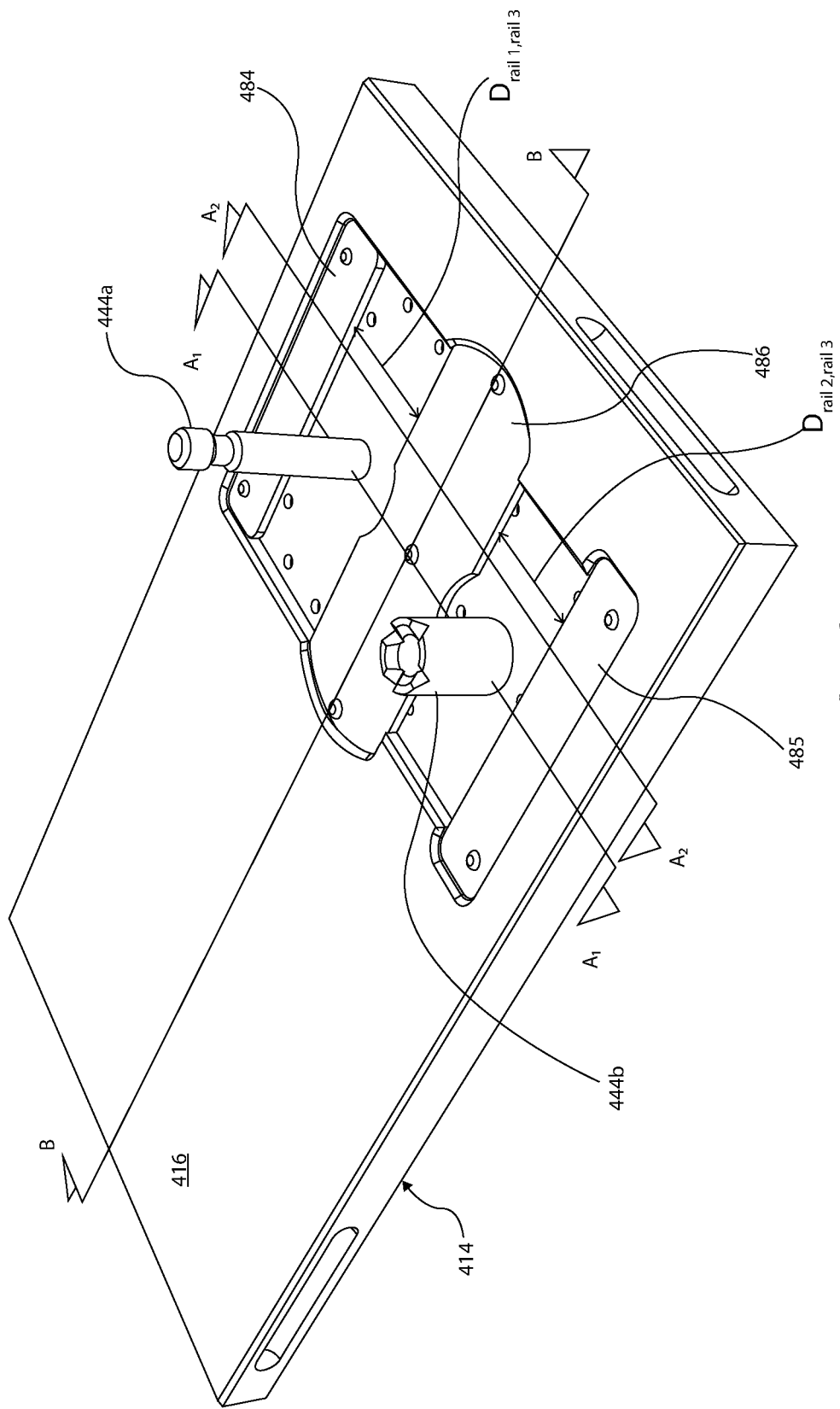

PRODUCTION EQUIPMENT SUPPORT ASSEMBLY

RELATED APPLICATIONS

This application claims the benefit of U.S. Provisional Patent Application No. 62/615,430, filed Jan. 9, 2018, and entitled, "Production Equipment Support Assembly;" and U.S. Provisional Patent Application No. 62/662,215, filed Apr. 24, 2018, and entitled, "Production Equipment Support Assembly," each of which is incorporated by reference herein in their entirety.

BACKGROUND

Motion picture and photography industries utilize many unique and specialized rigging, mounting, and support devices, assemblies and/or systems for mounting or otherwise securing camera, lighting, special effects, and other motion picture production and photography fixtures and equipment for use on a film or movie set, a stage, or in other types of production or photography settings. Many of these devices, assemblies and/or systems are small and portable, and serve to meet needs and to be used in situations that can be temporary, that can be unexpected, or that cannot be otherwise fulfilled by other equipment. One example of such an assembly is a skid plate for releasably coupling and supporting various fixtures and other equipment, such as a light fixture, wherein the skid plate and the supported light fixture can be positioned and repositioned about, for example, a motion picture production set. As is known, the skid plate can comprise an apple box and a pin plate that has been secured or mounted to the apple box, and that comprises a structure and interface configured to releasably couple the light fixture. Typically, the pin plate is mounted to the apple box using fasteners.

While mounting a pin plate to an apple box with fasteners can be carried out to construct a skid plate, there are several attendant disadvantages and inefficiencies that exist. Typically, with the use of fasteners the mounting process involves obtaining a tool, such as a power tool, capable of driving screws; selecting both a pin plate and an apple box; obtaining a plurality of screws to be used, typically those that are ¾" to 1" in length; positioning the pin plate on the apple box at the desired location; securing and/or steadying the apple box; aligning the screws with the holes in the plate portion or base plate of the pin plate, and driving in the plurality of screws, being careful not to overdrive them. As can be seen, this mounting process can be quite involved and time consuming. Indeed, it is not uncommon for this mounting process to take between 30 and 90 seconds depending upon the experience and skill of the operator, as well as the number of skid plates to be constructed or built. This can significantly slow down the production and disrupt the workflow taking place on the set or stage, particularly in the event a request is made for a specifically configured skid plate. In addition, once assembled together to form a skid plate, the pin plate and the apple box combination has a reduced, dedicated function with neither the apple box nor the pin plate being able to serve in any of its other, varied functional until the reverse process is undergone and the pin plate and apple box disassembled. The removal process is the reverse of the mounting process, and even though the reversal process can be carried out in slightly less time, this process still can take between 30-40 seconds or more to complete. Another disadvantage that comes from mounting the pin plate to the apple box using fasteners is that the specific placement of the pin plate on the apple box cannot be changed without disassembling the skid plate and remounting the pin plate in a different position, thus requiring even more operator time. Moreover, the repositioning of the pin plate about the apple box in this manner would also require the removal of any production or other equipment being supported by the skid plate. Still another disadvantage is that the mounting is somewhat destructive to the apple box as the fasteners are required to be driven into the typically wood material of the apple box. Upon their removal, the apple box is left with several holes. Over time as multiple mounting and demounting events occur, the apple box can become broken or chipped and eventually worn out. Other disadvantages to current skid plate construction practices that are not specifically discussed herein will be apparent to those skilled in the art.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIG. 3A illustrates an isometric view of an equipment mounting assembly in accordance with an example of the present disclosure;

FIG. 3B illustrates a partial cross-sectional front view of the equipment mounting assembly of FIG. 3A (with the fixture mount shown in full), taken along section A-A;

FIG. 8A illustrates an exploded isometric view of an equipment mounting assembly in accordance with another example of the present disclosure;

FIG. 8B illustrates an isometric view of the equipment mounting assembly of FIG. 8A, with the fixture mount at least partially secured to the mount support base;

FIG. 8C illustrates an isometric view of the equipment mounting assembly of FIG. 8A, with the fixture mount secured to the mount support base in a captured position;

FIG. 8E illustrates an exploded isometric view of an equipment mounting assembly of FIG. 8A, with the mount support base comprising a clearance recess;

FIG. 8G illustrates a cross-sectional view of the equipment mounting assembly of FIG. 8E, taken along lines A-A in FIG. 8E, and with the equipment mounting device assembled with the fixture mount at least partially secured to the mount support base;

FIG. 8H illustrates a cross-sectional view of the equipment mounting assembly of FIG. 8E, taken along lines A-A in FIG. 8E, and with the equipment mounting device assembled with the fixture mount fully releasably coupled or secured to the mount support base;

FIG. 8I illustrates a cross-sectional view of the equipment mounting assembly of FIG. 8E, with the equipment mounting device assembled with the fixture mount fully releasably coupled or secured to the mount support base.

FIG. 9B illustrates a partial isometric view of the equipment mounting assembly of FIG. 9A.

FIG. 9C illustrates an isometric view of the equipment mounting assembly of FIG. 9A.

Figure 1:
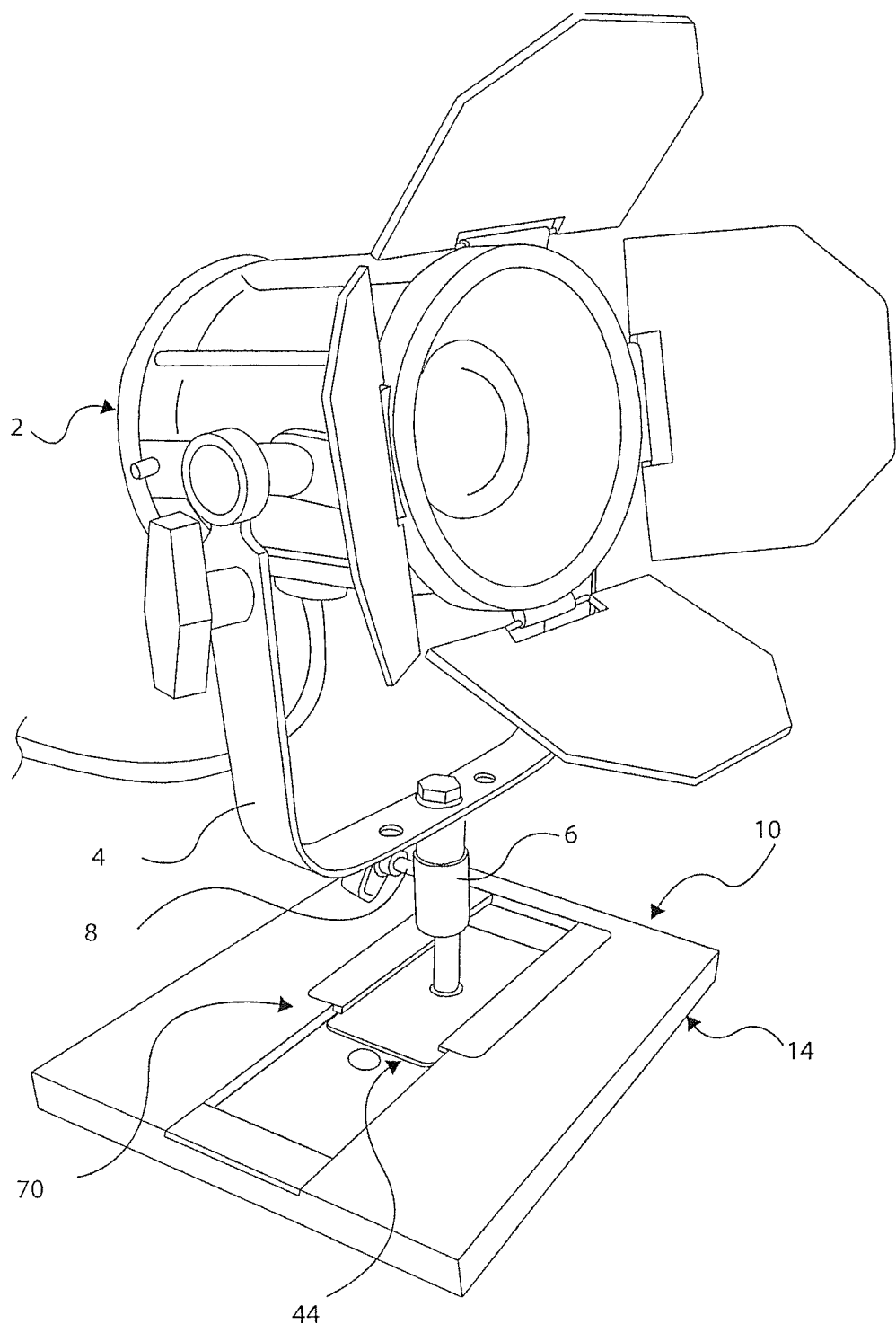
FIG. 1 illustrates a perspective view of an equipment mounting assembly in support of a lighting fixture, in accordance with one example of the present disclosure.

Reference will now be made to the examples illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

At the outset, several unique terms and phrases will be defined and discussed in order to provide a better understanding of the present technology. What are largely unique to the motion picture and photography industries, specialized rigging, mounting and support devices, assemblies and systems exist for mounting or otherwise securing camera, lighting, special effects, and other motion picture production and photography fixtures and/or equipment (generally referred to herein as production fixtures and/or equipment) for use on a film or movie set, a stage, or in other types of production or photography settings. While there are several of such specialized rigging, mounting and support devices and systems within the motion picture production industry, the present technology centers around a select few.

The term "fixture mount" is intended to generally refer to a hardware component used to interchangeably and releasably mount and secure a piece of equipment or a fixture, such as lighting, camera, special effects and other motion picture production fixtures and/or equipment, to another hardware component, such as a variety of rigging or mounting and support devices and assemblies, one of these being an equipment mount support base or just mount support base (e.g., an apple box). There are two types of standard fixture mounts and coupling interfaces. These two types are distinguished by the size (e.g., diameter) of each of the coupling interfaces. The smaller of the two coupling interfaces comprises a ⅝ inch diameter and can be referred to as a "baby"

sized coupling interface. For example, fixtures (e.g., light fixtures) that are manufactured with a ⅝ inch female receiver for attaching to a ⅝ inch mounting pin of a plate-based fixture mount are known as "baby" fixtures. The larger of the two coupling interfaces comprises a 1-⅛ inch diameter, and can be referred to as a "junior" sized coupling interface. Of course, other sizes and cross-sectional shapes (other than round) may exist, particularly as may exist within motion picture production industries of different countries, all of which are contemplated herein. Nonetheless, reference to these two coupling interface sizes, which are standard across the motion picture industry in the United States, will be made herein to set forth the present technology.

A "baby pin" can refer to a pin-type coupling component or device or structure for the fixture, the pin-type coupling having a shaft or post having a mounting terminus defining and providing a first type of coupling interface (e.g., a male-type of coupling interface) of a baby size for coupling to the corresponding coupling component of the fixture, thus facilitating the mounting of the fixture, such as baby fixtures or other equipment. A "baby receiver" can refer to a receiver-type device or structure also having a shaft or post, the difference being that the post comprises a mounting terminus defining and providing a second type of coupling interface (e.g., a female-type of coupling interface) of a baby size for mounting baby fixtures or other equipment. A "junior pin" and a "junior receiver" can refer to similarly configured devices, respectively, but that instead provide a junior sized coupling interface for mounting junior motion picture production fixtures or other equipment.

A "baby plate" can refer to and comprise a baby pin or a baby receiver affixed or otherwise secured to or integrally formed with a base plate or base plate-type device, such as a low-profile or thin plate, to provide a type of fixture mount for mounting fixtures and other equipment to an equipment mount support base. The base plate can comprise different shapes and sizes, the most common being a rounded rectangle, and can be comprised of different materials, the most common being steel. In one example, a first end of the shaft or post of the baby pin or baby receiver can be welded to the base plate, and can extend outward from an upper surface of the base plate either along a normal axis, or along an axis having an angle of inclination, each being relative to a planar orientation of the surface of the plate. A baby plate can be known by alternative names, such as a "baby nail-on," a "750 Pigeon," or simply a "nail-on" or a "nail-on plate." A "junior plate" can be similarly configured to comprise a junior pin or a junior receiver affixed or otherwise secured to a base plate, such as a low-profile or thin plate, to provide a type of fixture mount, and can be referred to by similar alternative names. Cheater plates are also common, and comprise a plate or plate-like structure having a pin extending from the surface of the plate on an angle or incline to form a type of fixture mount. All of these different types may be referred to collectively as "pin plates," and a pin plate can comprise, along with the plate or plate-like structure, a shaft or post having a mounting terminus defining a coupling interface (e.g., a male or female type coupling interface). It is noted that other types of plate-like structures or devices operable to provide a base in support of a pin or receiver (or other structure, device, etc.), that are not necessarily referred to or configured as baby or junior plates, but that can form a type of fixture mount, are contemplated, and as such, any reference to a baby plate or junior plate herein is not intended to be limiting in any way, as will be recognized by those skilled in the art.

An equipment mount support base, or just mount support base can refer generally to a type of hardware component operable to support a fixture, such as motion picture production fixtures or other equipment, objects, individuals, etc. about a surface, such as a ground or floor surface. Mount support bases are generally rigid, and have an upper mounting surface supported by or about at least one side or sidewall that extends downward from the upper mounting surface, for example, to the floor. In some industries, such as the motion picture production industry, one type of mount support base can be referred to as an "apple box." An apple box can comprise wooden (or other material) boxes or crates. For example, and for purposes of the discussion herein, apple boxes can be used to temporarily support furniture, light fixtures, light stands, camera equipment, leveling equipment, camera dolly track, etc. These can also be used to provide temporary seats, stands, workbenches, stepladders, etc. for individuals. Other uses that may not be mentioned here are further contemplated. Apple boxes can come in a variety of sizes depending upon the particular need or intended use. Moreover, different sized apple boxes comprise unique names based on the height of the apple box. Most commonly, apple boxes comprise a "full apple" or just "apple box," a "half apple," which is half of the height of a full apple box, a "quarter apple," which is one quarter the height of a full apple box, and an "eighth apple," otherwise known as a "pancake," which is typically half of the height of a quarter apple box. Apple box sizes can vary, but typically all sizes are designed to be fractions of the full apple box size. Thus, two half apple boxes equal the size of a full apple box, two quarter apple boxes equals one half apple box, and two pancakes equal one quarter apple box. It is noted that other types of equipment mount support bases other than apple boxes may be utilized with the present technology and are contemplated herein, and as such, any reference to an apple box is not intended to be limiting in any way, as will be recognized by those skilled in the art.

Originally designed for mounting fixtures, such as baby fixtures or junior fixtures (or other equipment) to floors, walls, etc., fixture mounts, such as pin plates (or other structure providing a fixture coupling having a mounting terminus and a coupling interface in combination with a base plate as discussed herein), can also be used to assemble and provide low-to-the-ground stands for such fixtures (or other equipment). Prior or existing techniques accomplish this by attaching or affixing (e.g., securing with nails, screws, or other fasteners) the pin plate type of fixture mount to an equipment mount support base, such as an apple box (e.g., a pancake type of apple box). The combination of a fixture mount, such as a pin plate, as attached to the upper mounting surface of an equipment mount support base (e.g., an apple box) can be referred to as an equipment mounting assembly. This can also be referred to as a "skid plate." The pin plate can comprise the mounting hardware for facilitating the mounting or removable coupling of fixtures or other equipment to the equipment mount support base, or apple box.

For purposes of simplifying the discussion, the term "pin plate" will be used below when describing a base plate-type of device in combination with a pin, receiver or other structure configured to provide a mounting terminus and a coupling interface, which is configured for use with an equipment mount support base, such as an apple box, to provide a skid plate. However, as mentioned above, it is to be understood that reference to a pin plate is not intended to be limiting in any way. Indeed, a pin plate can comprise a baby plate, a junior plate or a cheater plate (with a male-type (e.g., baby or junior pin) or female type (e.g., baby or junior receiver) interface) or can even generically include other similar types of combination pin/receiver and plates or plate-like devices that may or may not be described herein, but that have similar functions, and that can be employed and used in a similar manner, as will be recognized by those skilled in the art. Likewise, the term "apple box" will be used below for discussion purposes even though this is only an example subset of the generic mount support base in support of a pin plate to form a skid plate.

Pin plates (comprising baby/junior pins, baby/junior receivers, and others as discussed above) can be fastened (e.g., screwed, nailed, etc.) to various versions or types of apple boxes, which can then be used for a variety of purposes as discussed above. In doing so, the most common apple box size used is the eighth apple or pancake. For example, a baby plate can be mounted to a pancake to allow the subsequent mounting of some sort of fixture or other equipment (lighting fixtures and special effects-type equipment being most common) fitted with a receiver having a mounting terminus with a female coupling interface (e.g., a female-type receiver) designed to mate with the pin of the baby plate having a shaft and mounting terminus defining a male coupling interface (e.g., a male-type baby pin) extending from the base plate of the baby plate.

Turning now to the present technology, an initial overview of the inventive concepts are provided below and then specific examples are described in further detail later. This initial summary is intended to aid readers in understanding the examples more quickly, but is not intended to identify key features or essential features of the examples, nor is it intended to limit the scope of the claimed subject matter.

In an example, the present disclosure sets forth an equipment mounting system facilitating support of a piece of equipment, comprising a mount support base having an upper surface; a retention system supported by the mount support base, and operable to releasably capture at least one fixture mount and secure the at least one fixture mount to the mount support base, the retention system comprising a first capture channel defined at least in part by a portion of the mount support base; and a second capture channel defined at least in part by a portion of the mount support base.

In an example, the retention system can further comprise a position keep system operable to maintain a position of the fixture mount relative to the mount support base once the fixture mount is captured by and secured within the retention system.

In an example, the position keep system can comprise a biasing system associated with the first capture channel, the biasing system comprising at least one elastic component operable to provide a biasing force to the fixture mount as the fixture mount is being inserted into the retention system, and to provide a threshold biasing force between the fixture mount and the mount support base once the fixture mount is captured by and secured within the retention system, such that movement between the fixture mount and the mount support base is resisted.

In an example, the retention system can further comprise at least one bay formed, at least in part, in a surface of the mount support base, the elastic component (e.g., a spring) retained within the bay, and the bay being associated with the first capture channel.

In an example, the position keep system can further comprise a base plate interface device operable with the elastic component of the biasing system, the base plate interface device being operable to engage and interface with the base plate of the fixture mount.

In an example, the retention system can comprises a recess formed in the upper surface of the mount support base, the recess comprising a recess surface, and a perimeter wall defining a fixture mount profile; a first rail secured to the mount support base at a first position adjacent the recess, wherein a portion of the first rail extends beyond the perimeter wall of the recess, such that the portion of the first rail and a first portion of the recess surface define, at least in part, the first capture channel; a second rail secured to the mount support base at a second position adjacent the recess, wherein a portion of the second rail extends beyond the perimeter wall of the recess, such that the portion of the second rail and a second portion of the recess surface define, at least in part, the second capture channel, wherein the first and second rails are positioned so as to define an access opening in communication with the first and second capture channels.

In an example, the mount support base can further comprise a first shoulder formed in the upper surface of the mount support base adjacent the recess, the first shoulder being configured to receive and support the first rail in the first position; and a second shoulder formed in the upper surface of the mount support base adjacent the recess, the second shoulder being configured to receive and support the second rail in the second position, wherein the first and second shoulders are recessed in the upper surface of the mount support base at a given depth, such that an upper surface of each of the first and second rails is positioned in one of a position flush with the upper surface of the mount support base, or a position below the upper surface of the mount support base.

In an example, a length of the each of the first and second rails can be greater than a width of the recess.

In an example, the distance between opposing edges of the first and second rails and a resulting length of the access opening can be smaller than a length of the fixture mount, such that fixture mount cannot be removed from the retention system solely by displacing it along an axis normal to the upper surface of the mount support base.

In an example, the recess can comprise a length sized so as to facilitate movement of the fixture mount between the first and second capture channels.

In an example, the retention system can further comprise a bay formed, at least in part, in the recess surface of the recess at a first end of the recess, the bay being associated with the first capture channel; and an elastic element situated in the bay, wherein at least part of the elastic element is positioned within the first capture channel.

In an example, the first rail can operate to retain the elastic element within the bay.

In an example, the retention system can further comprise a clearance recess formed in the recess surface of the recess at a first end of the recess, the clearance recess being associated with the first capture channel.

In an example, the clearance recess can comprise a clearance recess surface positioned at a depth relative to the upper surface of the support mount greater than a depth of the recess surface relative to the support mount.

In an example, the clearance recess surface of the clearance recess can extend away from a sidewall of the recess at the first end of the recess a given distance beyond the first rail, such that an edge of the first rail and a sidewall of the clearance recess define an opening.

In an example, the retention system can further comprises a bay formed, at least in part, in the clearance recess surface of the clearance recess, and an elastic element situated in the bay, such that at least part of the elastic element is positioned within the first capture channel.

In an example, the equipment mounting system can further comprise a second recess formed in the mount support base; a second retention system associated and operable with the second recess; and a second position keep system associated and operable with the second recess, wherein the second recess is positioned at a location different from that of the first recess.

In an example, the retention system can comprise a first recess formed in the upper surface of the mount support base, the first recess comprising a recess surface, a perimeter wall, and at least one fixture mount profile; and a second recess formed in the upper surface of the mount support base, the second recess comprising a recess surface, a perimeter wall, and at least one fixture mount profile.

In an example, the first and second recesses can be positioned adjacent one another, and the retention system can further comprise an intermediate landing that defines a portion of each of the perimeter walls of the first and second recesses; a central rail operable with both of the first and second recesses, and supported by the intermediate landing; a third capture channel; and a fourth capture channel, wherein the second and fourth capture channels are defined, at least in part, by the central rail, and wherein the first and second capture channels are associated with the first recess, and wherein the third and fourth capture channels are associated with the second recess.

In an example, the first and second recesses can be positioned adjacent one another, and the retention system can further comprise an intermediate landing separating the first and second recesses, the intermediate landing defining at least part of each of the first and second recesses; a first rail secured to the mount support base at a first position adjacent the first recess, wherein a portion of the first rail extends beyond the perimeter wall of the first recess, such that the portion of the first rail and a first portion of the first recess surface of the first recess define, at least in part, the first capture channel; a second rail secured to the mount support base at a first position adjacent the second recess, wherein a portion of the second rail extends beyond the perimeter wall of the second recess, such that the portion of the second rail and a first portion of the recess surface of the second recess define, at least in part, a third capture channel; a central rail secured to the mount support base over, and supported by, the intermediate landing, wherein a first portion of the central rail extends beyond a perimeter wall of the intermediate landing, such that the first portion of the central rail and a second portion of the recess surface of the first recess define, at least in part, the second capture channel, and wherein a second portion of the central rail extends beyond the perimeter wall of the intermediate landing in a different direction, such that the second portion of the central rail and a second portion of the recess surface of the second recess define, at least in part, a fourth capture channel.

In an example, the first recess can comprise a plurality of fixture mount profiles, and can be operable to interchangeably capture a plurality of fixture mounts, at least some of the plurality of fixture mounts comprising different perimeter profiles corresponding to one of the fixture mount profiles of the first recess.

In an example, the second recess can comprise a plurality of fixture mount profiles, and can be operable to interchangeably capture a plurality of fixture mounts, at least some of the plurality of fixture mounts comprising different perimeter profiles corresponding to one of the fixture mount profiles of the second recess.

In an example, at least one of the first and second recesses can comprise a notch formed within its perimeter wall about one side, the notch facilitating the respective recess to comprise a plurality of fixture mount profiles corresponding to a plurality of different fixture mounts having different perimeter profiles that are different in both length and width dimensions.

In an example, the equipment the retention system can further comprise a first clearance recess formed in the recess surface of the first recess, the clearance recess being associated with the second capture channel, and wherein the retention system can further comprise a second clearance recess formed in the recess surface of the second recess, the clearance recess being associated with the fourth capture channel.

In an example, the first and second clearance recesses can each comprise a clearance recess surface positioned at a depth relative to the upper surface of the support mount greater than a depth of respective recess surfaces of the first and second recesses relative to the support mount.

In an example, the clearance recess surface of the first clearance recess can extend away from a first sidewall of the intermediate landing a given distance beyond the central rail, such that a first edge of the central rail and a sidewall of the clearance recess define an opening, and likewise, the clearance recess surface of the second clearance recess can extend away from a second sidewall of the intermediate landing a given distance beyond the central rail, such that a second edge of the central rail and a second sidewall of the clearance recess define a second opening.

In an example, the retention system can further comprise at least one bay (e.g., a spring bay) operable to retain an elastic member (e.g., a spring) formed in the first and second clearance recesses, through the intermediate landing, the central rail covering the bay and retaining the elastic member in place within the bay, the elastic member at least partially extending into each of the second and fourth capture channels to interface with respective fixture mounts.

The present disclosure further sets forth an equipment mounting assembly facilitating support of a piece of equipment, the equipment mount assembly comprising a mount support base having an upper surface; a fixture mount comprising a base plate and a fixture coupling extending from the base plate; a retention system supported by the mount support base, and operable to releasably capture at least one fixture mount and secure the at least one fixture mount to the mount support base, the retention system comprising a first capture channel operable to receive and secure a first edge of the base plate of a first fixture mount; and a second capture channel operable to receive and secure a second edge of the base plate of the first fixture mount.

The present disclosure further sets forth a method for rapid capture of at least one fixture mount for facilitating support of a piece of equipment about a ground or other surface, the method comprising obtaining an equipment mounting system as discussed herein, comprising a mount support base, and a retention system; obtaining a fixture mount; and capturing the fixture mount in the retention system.

In an example, the method can further comprise coupling a fixture to the fixture mount to support the fixture by the equipment mounting system.

To further describe the present technology, examples are now provided with reference to the figures. With reference to FIG. 1, illustrated is an equipment mounting assembly 10 in accordance with an example of the present disclosure. The exemplary equipment mounting assembly 10 can support a variety of motion picture production or photography fixtures or other similar equipment (referred to generally herein as production fixture(s) and collectively herein as production equipment). For example, these can be cameras, lights or lighting fixtures, etc. In the example shown, the equipment mounting assembly 10 is supportive of a light fixture 2 having a yoke 4 and a mounting terminus 6 coupled to the yoke 4, the mounting terminus 6 defining or comprising a female-type coupling interface. More specifically, the light fixture 2 comprises a baby fixture or baby light, and the mounting terminus 6 supported about the yoke 4 comprises a receiver (specifically, a baby receiver). Although FIG. 1 illustrates the equipment mounting assembly 10 as supporting a specific production fixture (a baby light), those skilled in the art will recognize that the equipment mounting assembly can support myriad types of production fixtures and production equipment, and as such, the specific type of production fixture shown is not intended to be limiting in any way.

Generally, the equipment mounting assembly 10 can comprise a mount support base 14, a fixture mount 44, and a fixture mount retention system or just retention system 70 supported by the mount support base 14 and configured to releasably couple and secure the fixture mount 44 to the mount support base 70 in a quick and efficient manner without the use of traditional fasteners and associated fastening means/methods, and without tools. Stated differently, the equipment mounting assembly 10 can comprise a fastenerless mounting of the fixture mount 44 to the mount support base 14. By fastenerless, it is meant that no fasteners are used to temporarily secure and mount the fixture mount 44 to the mount support base 14, even though the equipment mounting assembly 10 may utilize one or more fasteners to secure various components of the retention system 70 to the mount support base in a more permanent manner. The combination of the mount support base 14 in support of the retention system 70 can be referred to herein as an equipment mounting system, which system can be operable with a fixture mount to provide a complete equipment mounting assembly.

The mount support base 14 can comprise any suitable base support structure or member capable of supporting various types of production equipment, such as about the floor or other ground surface, via the fixture mount 44 configured to be operable with the mount support base 14. Examples of mount support bases include, but are not limited to, apple boxes, crates, containers, chests, frames, planks, boards, beams, and any other type of suitable structure or structural elements. In one aspect, the mount support base 14 can be portable and able to be manipulated and carried by one or more individuals, but this size constraint is not intended to be limiting in any way as, indeed, other sized mount support bases are contemplated. The mount support base 14 can comprise a solid, semi-solid or frame-like structure, and can have any desired height.

The fixture mount 44 can comprise any suitable mounting structure having a mounting terminus (not shown) defining a coupling interface (not shown), the fixture mount 44 being operable to couple a production fixture (e.g., the light fixture 2) having a corresponding mounting terminus and coupling interface to facilitate support of the production fixture about the mount support base 14 of the equipment mounting assembly 10. Examples of fixture mounts include, but are not limited to, pin-type devices (e.g., a baby pin, a junior pin, a cheater pin, etc.), receiver-type devices (e.g., a baby receiver, a junior receiver, a cheater receiver, etc.). These pin-type or receiver-type of fixture mounts can further be supported by and extend from a base plate, wherein the resulting fixture mount can be referred to as a pin-plate or receiver-plate, these being also referred to sometimes as a nail-on plate. The pin-type device or receiver-type device can be permanently joined to the base plate (e.g., via welding, etc.), or removably or releasably joined to the base plate (e.g., via a threaded interface between the two components, etc.). The base plate can comprise any configuration and/or size. For example, the base plate can be rounded, rectangular, rounded rectangular, oval, square, etc. Moreover, existing pin-plates, receiver-plates and nail-on plates may be used with the present technology, however, these typically comprise various through holes formed in their base plates for the purpose of receiving fasteners, such as nails, to be used to mount them to a mount support base, such as an apple box. Therefore, it is noted that although these existing types of fixture mounts may be used, other uniquely designed pin plates/receiver plates devoid of any holes for fasteners may also be developed and used as the present technology advantageously eliminates the requirement for fasteners, as is discussed more fully below.

It is noted that other types of fixture mount structures or devices providing a mounting terminus and associated coupling interface for mounting production fixtures and equipment are contemplated herein, and as such, any reference to a baby pin, a baby receiver, a junior pin or a junior receiver, a pin plate, a receiver plate, a nail-on plate or other specific types herein is not intended to be limiting in any way, as will be recognized by those skilled in the art.

The equipment mounting assembly 10 can further comprise a retention system 70 supported by and operable with the mount support base 14. The retention system 70 can be operable to capture, mount and secure the fixture mount 44 to the mount support base 14, namely without the use of fasteners, such as nails, screws, etc. Rather, the retention system 70 provides a quick connect/disconnect system that facilitates coupling of the fixture mount 44 to the mount support base 14 in a quick and efficient manner using uniquely designed coupling and retention components and systems that are integrally formed with the mount support base 14 and/or the fixture mount 44. In some aspects, the retention system 70 can be configured, such that the fixture mount 44, once captured and secured by the retention system 70, is movable to facilitate positioning and repositioning of the fixture mount 44 relative to the mount support base 14, all while the fixture mount 44 remains secured by the retention system 70. In other words, in some aspects, the fixture mount 44 is not required to be decoupled or disassembled or otherwise removed or separated from the mount support base 14 in order to locate it in a different position relative to the mount support base 14 after it is captured and secured by the retention system 70. The retention system 70, including various example configurations and iterations, is discussed in greater detail below.

It is contemplated that one common or prevalent use of the present technology will involve a mount support base 14 in the form of an apple box (e.g., an eighth apple, or pancake), and a fixture mount 44 in the form of a pin or receiver plate (e.g., a baby plate or baby receiver), the two forming a skid plate upon the pin or receiver plate being coupled or otherwise secured to the apple box. The term "skid plate" is generally used to refer to an apple box and a pin-plate combination. However, unlike prior skid plates, the term "skid plate," as used herein, is intended to refer to an apple box and pin or receiver plate combination, that further comprises a retention system 70, such as one of the retention systems discussed and taught herein. As such, a skid plate can refer to a subset and specific type of equipment mounting assembly 10. In the specific example illustrated in FIG. 1, the light fixture 2 is shown as being supported in a functional, upright position by the skid plate, the skid plate comprising an eighth apple or pancake type of apple box, and a baby plate type of pin plate releasably captured and secured to the apple box via the retention system 70, the baby plate comprising a base plate and a baby pin having a mounting terminus (not shown) with a male-type coupling interface configured to be received into the mounting terminus 6 of the light fixture, which is in the form of a baby receiver having a female-type coupling interface. The light fixture 2 is releasably coupled to the skid plate by coupling together the baby receiver and the baby pin, and tightening the thumb screw 8 on the light fixture 2 to secure the coupling of the baby receiver and the baby pin of the baby plate.

As can be seen, and unlike prior related skid plates, no fasteners are used or needed to releasably couple the fixture mount 44 (e.g., the baby plate) to the mount support base 14 (e.g., the pancake type of apple box). As such, the present equipment mounting assembly 10 employing a retention system 70 provides several significant advantages over prior skid plate setups. For example, the equipment mounting assembly 10 facilitates quick and efficient skid plate construction or setup, and more specifically, quick and efficient capturing and securing, as well as disengaging and releasing, of the fixture mount 44 to/from the mount support base 14. Using the retention system 70, this can be done in a matter of only a few seconds (e.g., 1-3 seconds). Prior skid plates require much greater amounts of time to be constructed or setup. Depending upon their skill level and the specific mounting means and/or method being used, it is not uncommon for operators to need between 20 and 120 seconds, or more, to fasten a fixture mount (e.g., baby plate) to a mount support base (e.g., an apple box) using fasteners. As such, the present technology can provide as significant improvement in skid plate construction or setup rates over prior skid plate construction or setup rates. Another advantage is that the need for tools (e.g., screw guns, hammers, etc.) to setup a skid plate is eliminated as all fasteners are eliminated. An attendant advantage is that by eliminating fasteners, the frequent possibility of breaking screw heads off while mounting or dismounting the fixture mount is eliminated. Another advantage is that operator skills centered around using fasteners and the tools required to drive the fasteners are no longer a factor, again, due to the fact that fasteners are eliminated. Still another advantage is that the fixture mount can be disengaged and released from the mount support base without detaching the production fixture. In those examples where the retention system facilitates moving or positioning and repositioning of the fixture mount relative to the mount support base with the fixture mount captured and secured within the retention system, an additional advantage is that this can be accomplished without disengaging the fixture mount from the mount support base. It should also be noted that even with the retention system, in most cases, depending upon the particular configuration of the equipment mounting assembly, the mount support base can be used in its myriad other ways other than as a support for production equipment (e.g., as a stand for actors, etc.). In other words, the many uses of particular mount support bases other than as a support for production equipment can be preserved. That is, the retention system does not interfere with or preclude the use of the mount support base for any traditional purpose. In a similar fashion, existing fixture mount designs are not required to be altered or modified (even though in some cases they can be, if desired), thus permitting use of the countless number of existing fixture mounts with particularly designed equipment mounting assemblies, such as those taught herein. Stated differently, an equipment mounting assembly of the present technology can comprise a design and configuration for use with existing fixture mounts, such as the many existing baby or junior plates, etc. Other advantages will be apparent from the description of the various examples set forth below. Moreover, although several advantages are recognized herein, these are not intended to be limiting as those skilled in the art will be able to identify other possible advantages.

As noted above, the discussion of FIG. 1 is intended to introduce in a general manner the present technology. As such, it is further noted that one or more of the above-described elements, features, advantages, etc. discussed with respect to FIG. 1 can be applicable to and can be found in one or more of the various example equipment mounting assemblies discussed below, as will be recognized by those skilled in the art.

Figure 2A:
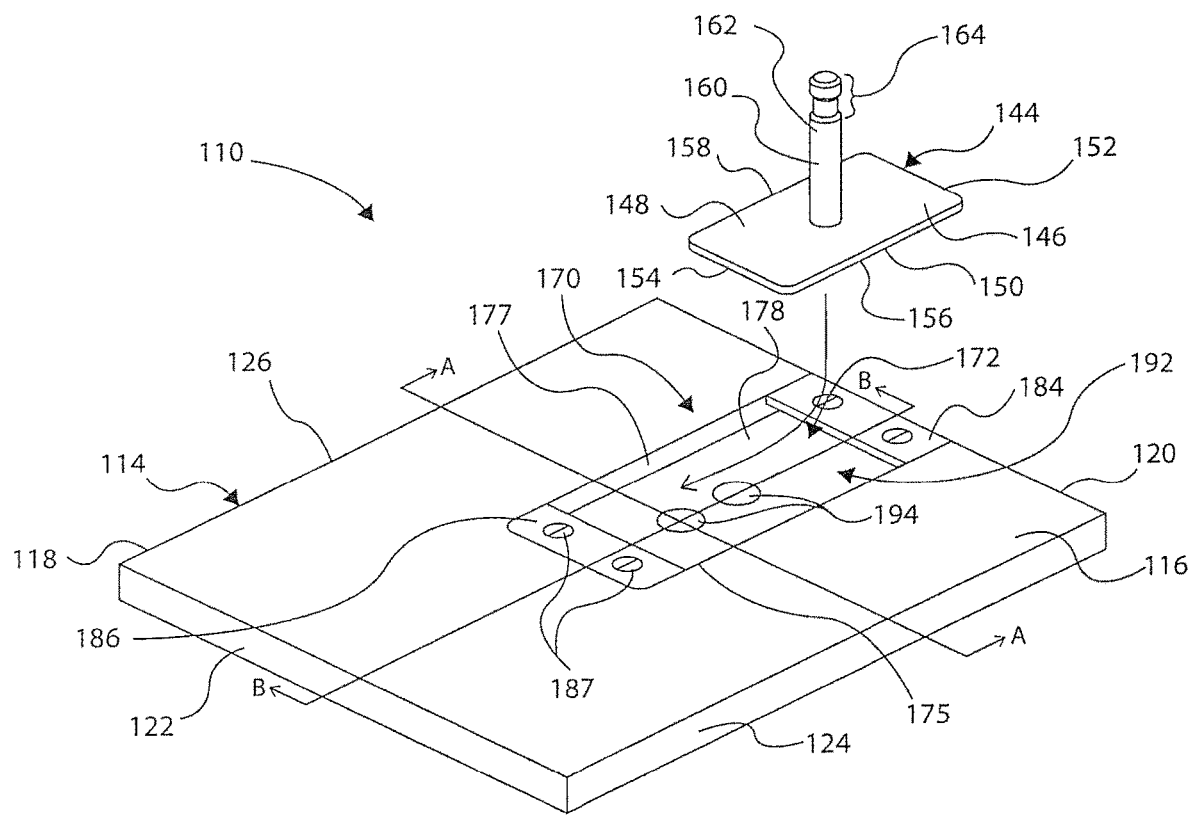
FIG. 2A illustrates an isometric view of an equipment mounting assembly in accordance with an example of the present disclosure.
Figure 2B:
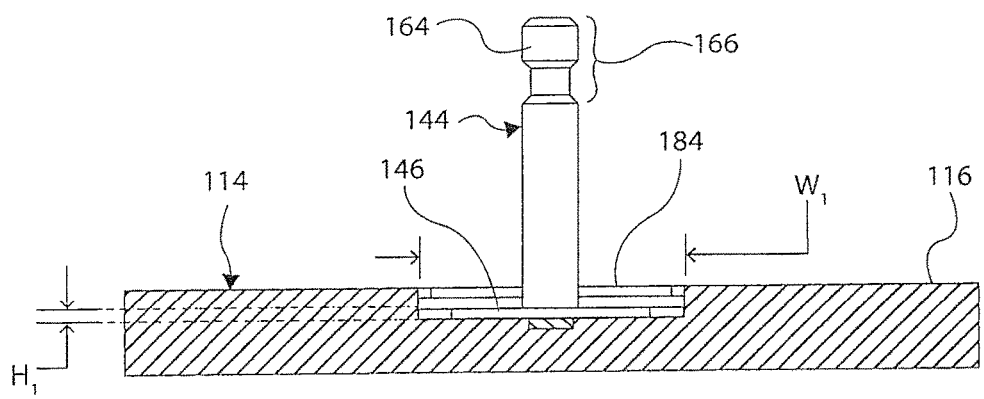
FIG. 2B illustrates a cross-sectional front view of the equipment mounting assembly of FIG. 2A (with the fixture mount shown in full), taken along section A-A, with the fixture mount captured by the retention system and secured to the mount support base.
Figure 2C:
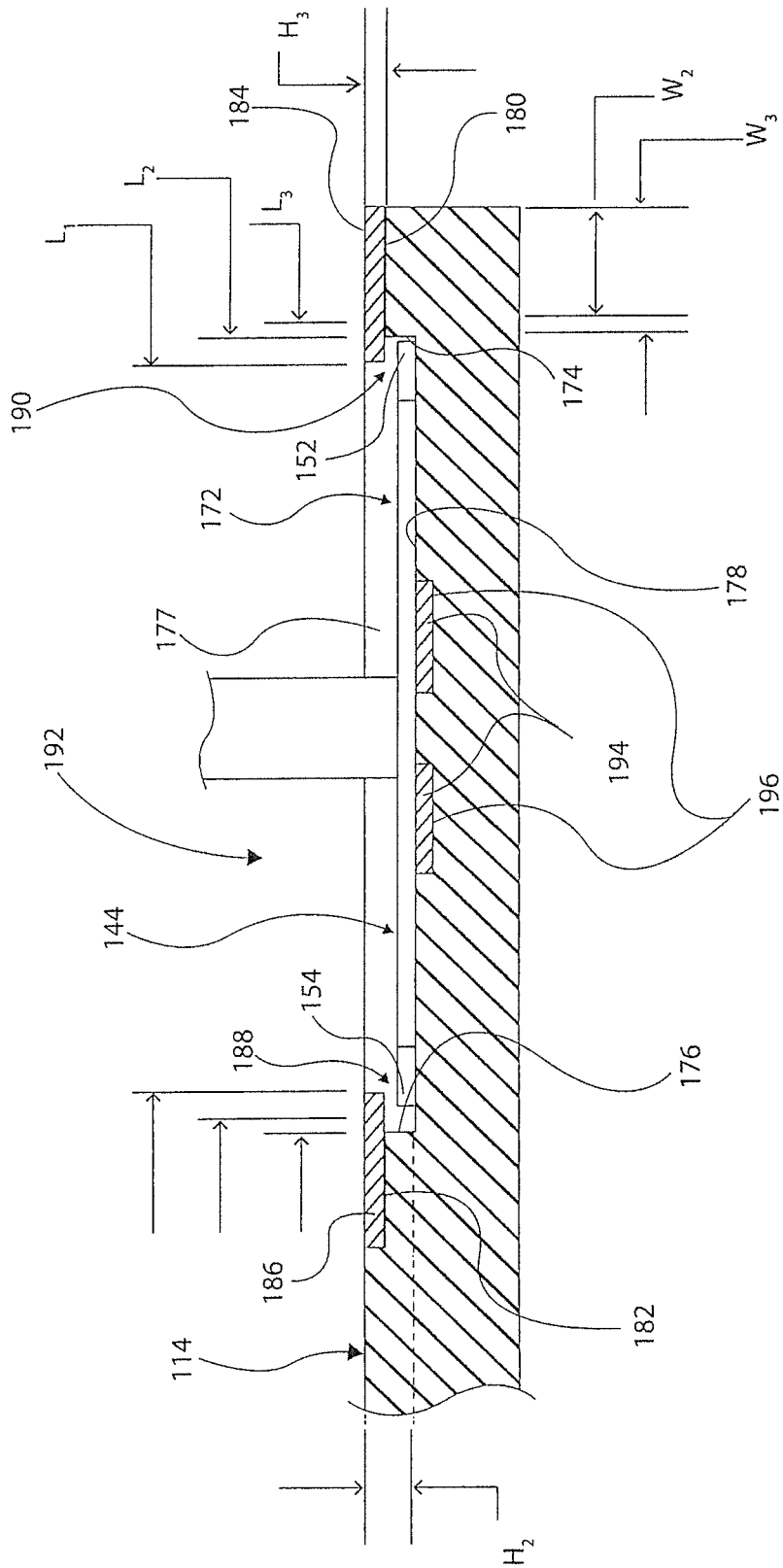
FIG. 2C illustrates a partial cross-sectional side view of the equipment mounting assembly of FIG. 2A (with the fixture mount shown in full), taken along section B-B, with the fixture mount captured by the retention system and secured to the mount support base.

Several different configurations of equipment mounting assemblies are contemplated herein, some of which are set forth below, which are provided merely as examples. These are not to be construed as limiting in any way. For purposes of discussion, the various examples illustrate a fixture mount in the form of a pin plate (such as a baby plate), and a mount support base in the form of an apple box (specifically an eighth apple or pancake), these being operable to provide a retention system. With reference to FIGS. 2A-2C, illustrated is an equipment mounting assembly 110 in accordance with an example of the present disclosure. The equipment mounting assembly 110 can comprise a mount support base 114 having an upper surface 116 and a perimeter or perimeter edge 118 defining any type of shape or configuration. In the example shown, the mount support base 114 can comprise a perimeter having a rectangular shape defining a first end 120, a second end 122, and first and second sides 124,126. As will be apparent to those skilled in the art, other types of mount support bases, such as those having different sizes, shapes and/or configurations, are contemplated for use with the present technology, as discussed above.

The equipment mounting assembly 110 can further comprise a fixture mount operable and usable with the mount support base 114 and the equipment mounting system. The fixture mount can comprise a base plate and a fixture coupling extending from and supported by the base plate, wherein the fixture coupling comprises a mounting terminus defining and comprising a coupling interface operable to engage and releasably couple a piece of equipment or a fixture of some type, such as a production fixture (not shown, but see production fixture of FIG. 1 in the form of a light fixture). In one aspect, as shown, the fixture mount 144 can be in the form of a pin plate, such as a baby plate, as is known, or any other type of pin plate. The fixture mount 144 can comprise a plate portion or base plate 146 having an upper surface 148 and a perimeter 150 defining any type of shape or configuration, such as rounded rectangular, as shown. The base plate 146 can comprise first and second ends 152,154, and first and second sides 156, 158. Extending upward from the upper surface 148 of the base plate 146, the fixture mount 144 can further comprise a pin 160 having a shaft 162. The pin 160 can comprise a mounting terminus 164 formed about a distal end of the shaft 162, the distal end comprising that end of the pin 160 that terminates in space (the end of the pin not secured to the base plate 146, but located furthest from the base plate 146). The mounting terminus 164 can define a coupling interface operable to engage and releasably couple a production fixture (not shown, but see production fixture of FIG. 1 in the form of a light fixture). In the example shown, the fixture mount 144 comprises a mounting terminus 164 having a male-type coupling interface configured to engage and releasably couple a receiver of the production fixture having a female-type coupling interface. The fixture mount 144 can be made of any material suitable for supporting production equipment, and for being secured to the mount support base 114, such as metal, carbon fiber, and others. As will be apparent to those skilled in the art, other types of fixture mounts are contemplated for use with the present technology, as discussed above.

The equipment mounting assembly 110 can further comprise a fixture mount retention system or more simply a retention system 170 operable to releasably secure the fixture mount 144, and any production fixture coupled thereto, to the mount support base 114 for the purpose of providing a support, stand, platform, etc. for the production fixture. The combination of the mount support base 114 in support of the retention system 170 can be referred to herein as an equipment mounting system, which system can be operable with a fixture mount to provide a complete equipment mounting assembly. As discussed above with respect to FIG. 1, the retention system 170 can be configured to accomplish this without requiring the use of fasteners, such as screws or nails. For example, as shown, the retention system 170 can comprise a recess 172 formed in the upper surface 116 of the mount support base 114. The recess 172 can comprise a recessed surface 178 located at a recess depth $H_2$ at least as deep as a thickness $H1$ of the base plate 146 of the fixture mount 144, such that the upper surface 148 of the base plate 146 of the fixture mount 144 is flush or below the upper surface 116 of the mount support base 114 upon the fixture mount 144 being received and seated within the recess 172. The recess 172 can be sized and configured to receive the fixture mount 144 therein, and specifically the base plate 146 of the fixture mount 144. For example, as shown, the recess 172 can comprise an elongated, rectangular configuration having or defining a first end 174 opposite a second end 176, and a first side 175 opposite a second side 177, these being sized and configured so as to define a recessed area sufficiently sized to receive therein the base plate 146 of the fixture mount 144, wherein the fixture mount 144 is caused or permitted to be seated about the recess surface 178. The recess 172 can be formed at any location within the mount support base 114. For example, as shown, the recess 172 can be located adjacent the first end 120 of the mount support base 114, with the recess 172 initiating at or near the first end 120 and extending away from the first end 120 towards the second end 122, terminating at a point or location, such that the recess 172 comprises a length less than the length of the mount support base 114. The recess 172 can be sized with a width W1 that is wider than the width W2 of the base plate 146 of the fixture mount 144, thus permitting the fixture mount 144 to fit laterally between the sidewalls of the recess 172 without binding. Likewise, the recess 172 can comprise a length $L_3$ greater than the length L2 of the base plate 146 of the fixture mount 144, thus permitting the fixture mount 144 to fit lengthwise between the first and second ends 174,176 of the recess 172.

The retention system 170 can further comprise first and second rails 184,186 coupled or otherwise joined to the mount support base 114 in a position and orientation about the recess 172 so as to at least partially define and form first and second capture channels 188,190 within the recess 172, as well as, at least partially, an access opening 192 in communication with the first and second capture channels 188,190. For example, as shown, the first rail 184 can be mounted to the mount support base 114 along the width of the recess 172 about the first end 174, and the second rail 186 can be mounted to the mount support base 114 opposite the first rail 184, and about the second end 176, each of these being oriented to extend in a lateral direction relative to the recess 172 (e.g., parallel to the first and second ends 120,122 of the mount support base 114). Those skilled in the art will recognize that the rails 184,186 could alternatively be mounted along the length of the recess 172, parallel to the sides 175,177 of the recess. In this case, the recess 172 could be configured to extend beyond the rails a sufficient distance to permit the access opening to receive the fixture mount 144 (e.g., see FIG. 3A).

In one aspect, the first and second rails 184,186 can be mounted to the upper surface 116 of the mount support base 114. In another aspect, mount support base 114 can further comprise first and second shoulders 180,182 formed in its upper surface 116 adjacent the recess 172, these being sized and configured to receive at least a portion of the first and second rails 184,186, respectively, wherein the first and second rails 184,186 are mounted to the mount support base 114 about the respective first and second shoulders 180,182. More specifically, the first and second shoulders 180,182 can intersect the walls of the recess 172 defining the first and second ends 176,174 of the recess 172. In addition, the first and second shoulders 180,182 can comprise a width W2 that is less than a width $W_3$ of the first and second rails 184,186, thus facilitating the proper positioning of the rails 184,186 relative to the recess 172. In either case, the first and second rails 184,186 can be mounted to the mount support base 114, such that a portion of each of the first and second rails extends beyond an edge of the recess 172, or in other words, such that a respective side of each of the first and second rails 184,186 overhangs an edge of and extends into the recess 172, the extended portion of the first and second rails 184,186 and at least one surface of the recess (e.g., a wall, the recess surface, both of these, etc.) defining the first and second capture channels 188,190, respectively. First and second rails 184,186 can be spaced apart from one another a distance $D_{rail1,rail2}$ that defines a distance L1 between the respective edges of the rails 184,186 that is less than a length $L_{base\ plate}$ (see L2 in FIG. 2C) of the base plate 146 of the fixture mount 144, such that the fixture mount 144 cannot be removed from the capture channels 188,190 simply by lifting up on the fixture mount 144 (e.g., along a normal axis relative to the upper surface 116 of the mount support base 114). Furthermore, the rails 184,186 can be mounted in an elevated position relative to the recess surface 178, and can comprise a thickness or height $H_{rails}$ (see H3 in FIG. 2C), wherein the depth $H_{recess}$ of the recess 172 minus the thickness or height $H_{rails}$ of the rails 184,186 (i.e., $H_{recess} - H_{rails} = H_{capture\ channels}$) can be coordinated, such that the first and capture channels 188,190 are sufficiently sized to receive and capture a portion of the base plate 146 of the fixture mount 144. For example, in one aspect, the capture channels 188,190 can be formed to comprise a height $H_{capture\ channels}$ just slightly greater than the thickness or height $H_{base\ plate}$ of the base plate 146 of the fixture mount 144. In another aspect, the capture channels 188,190 can be formed to comprise a height $H_{capture\ channels}$ between 1 and 2 times the thickness or height $H_{base\ plate}$ of the base plate 146 of the fixture mount 144. In still other aspects, this height can be even greater than twice $H_{base\ plate}$. Of course, these are only example relative sizes, and as such, are not to be limiting in any way. Based on the foregoing, a gap distance $D_{gap}$ between the upper surface 148 of the base plate 146 of the fixture mount 144 and the bottom surface of the rails 184,186 can be calculated in accordance with the following: the height of the first and second capture channels 188,190 $H_{capture\ channels}$ minus the height or thickness of the base plate 16 of the fixture mount 144 (i.e., $H_{capture\ channels} - H_{base\ plate} = D_{gap}$). The gap distance can define the amount of travel or play that exists between the fixture mount 144 and the first and second rails 184,186 along an axis normal to the recess surface 178.

The rails 184,186 can be coupled or otherwise mounted or joined to the mount support base 114 using permanent or non-permanent types of fasteners (e.g., nails, screws, nuts/bolts, welds, etc.), adhesives and any other joining means known by those skilled in the art. The type of joining means used can depend on the type of material making up the mount support base and the rails, or other factors. In the example shown, the rails 184, 186 are mounted using screws 187 inserted through apertures (not shown) formed in the rails 184,186 and driven into the mount support base 114, which can be made of wood.

In an alternative example, and as will be apparent to those skilled in the art, the rails can be formed from the material making up the mount support base 114. For example, in the case of a mount support base comprising an apple box made of wood, the recess and the rails can be formed by removing the necessary material (e.g., by routing) to form these within the wood structure of the apple box. As such, it is contemplated that some equipment mounting assemblies can comprise rails that are integrally formed into the mount support base without requiring additional hardware elements.

As discussed herein, the retention system 170 can be configured to support a production fixture. That being said, the equipment mounting assembly 110 can be configured to withstand the various forces and moments that may result from coupling a production fixture to the equipment mounting assembly 110. In one aspect, the equipment mounting assembly 110 can be configured to at least support the same type of production equipment that a prior related skid plate could support, the prior related skid plate comprising a fixture mount (e.g., a baby plate) joined to a mount support base (e.g., an apple box) using screws or other fasteners. In another aspect, the equipment mounting assembly 110 can be configured to support different types of production equipment that may not have been able to be supported prior to the present technology. For instance, some production equipment may be sufficiently heavy, such that coupling to a prior existing skid plate could, under some circumstances, potentially cause the fasteners to rip from the mount support base, thus destroying the mount support base, and potentially destroying or damaging the attached production fixture, as well as potentially injuring operators or other individuals in close proximity. Those skilled in the art will recognize the different design parameters in the equipment mounting assembly 110 that can be varied to accommodate different production equipment support scenarios.

The retention system 170 can further comprise a position keep system operable to assist in controlling and maintaining a position of the fixture mount 144 relative to the mount support base 114, and to further secure the fixture mount 144, once captured by and secured within the retention system 170. The position keep system can employ a variety of devices, systems, mechanisms, etc. for accomplishing this. Various examples are discussed herein, and shown in the drawings. In one example, the position keep system can comprise a biasing system operable to provide a sufficient biasing force (a normal force) between the fixture mount 144 and the mount support base 114, such that movement between the fixture mount 144 (as captured within the retention system 170) and the mount support base 114 is hindered or resisted, and therefore restricted to some degree or another. In one aspect, the minimum magnitude of the biasing force can be such that the fixture mount 144 is prevented from moving under its own weight (e.g., under the influence of gravity). In this case, the resistance or hindrance of the movement of the fixture mount 144 can be controlled by varying the magnitude of the biasing forces(s) generated by the position keep system. This can be accomplished through specific design of the various components of the equipment mounting assembly 110. Indeed, the position keep system can be configured, such that, once activated and the one or more biasing forces are applied, a pre-determined threshold friction force is required to be applied to the fixture mount 144 to overcome the biasing forces and a corresponding coefficient of static friction, and to cause it to move within the retention system 170. It is noted that this pre-determined threshold friction force can be applied directly, such as by an operator or an impact to the fixture mount 144, or indirectly, such as by momentum generated from abrupt movements of the equipment mounting assembly 110 (e.g., throwing the equipment mounting assembly 110, impacting the equipment mounting assembly 110 (e.g., dropping the equipment mounting assembly 110, etc.).

In one specific example, as shown, the position keep system can comprise a series of magnets 196 disposed in the recess 172 operable to apply a biasing force in the form of an attraction force on the fixture mount 144. As such, in this example, the positioning keep system can further comprise the base plate 146 of the fixture mount 144, particularly as it is made of metal and is capable of reacting to the applied magnetic biasing force. In one aspect, the magnets 196 can be disposed in respective magnet bays 196 formed in the recess surface 178, and secured therein with an adhesive or other bonding agent. The magnets 196 can be sized and configured to be seated within the magnet bays 196, such that an upper surface of the magnets 196 is flush with the recess surface 178, thereby maintaining a planar recess surface upon which the fixture mount 144 may be seated. Although two magnets 196 are shown, any number of magnets can be used to vary the biasing force and the corresponding friction forces, and these can comprise any size and configuration desired. In addition, the magnets 196 (and magnet bays 196) can be located at different positions within the recess 172. For example, the magnets can be located centrally within the recess 172 along a mid-line, as shown. Alternatively they may be located in different or other locations, such as within quadrants of the recess 172. In yet another alternative, they may be located about and supported within the walls of the recess. In any event, the magnets 196 are intended to interact with the fixture mount 144, and particularly one made of metal and having a magnetic attraction, such as a pin plate. This interaction comprises applying a biasing force in the form of an attraction force to the fixture mount 144 for the purpose of biasing, via a generated magnetic field, the fixture mount 144 against the mount support base 114, and in some cases also against one or more components of the retention system 170. In order to sufficiently interact with the fixture mount 144, the magnets 196 can be strategically configured, located and positioned, meaning that the magnetic force applied by the magnets 196 is suitable to act on the fixture mount 144. The magnets 196 can comprise or be comprised of any suitable material, as will be recognized by those skilled in the art. For example, the magnets can comprise those that provide their own magnetic field, such as those that are made with ferromagnetic or ferrimagnetic materials.

Figure 2D:
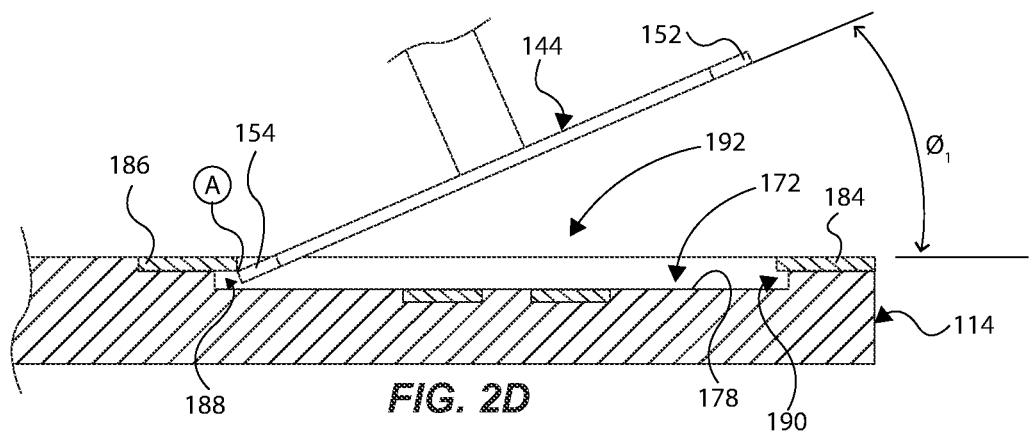
FIG. 2D illustrates a partial cross-sectional side view of the equipment mounting assembly of FIG. 2A (with the fixture mount shown in full), with the fixture mount in a first engagement position relative the mount support base.
Figure 2E:
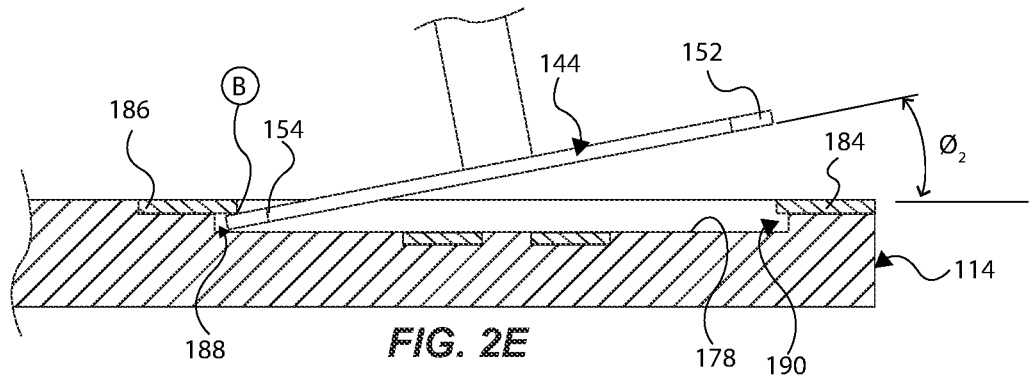
FIG. 2E illustrates a partial cross-sectional side view of the equipment mounting assembly of FIG. 2A (with the fixture mount shown in full), with the fixture mount in a second engagement position relative the mount support base.
Figure 2F:
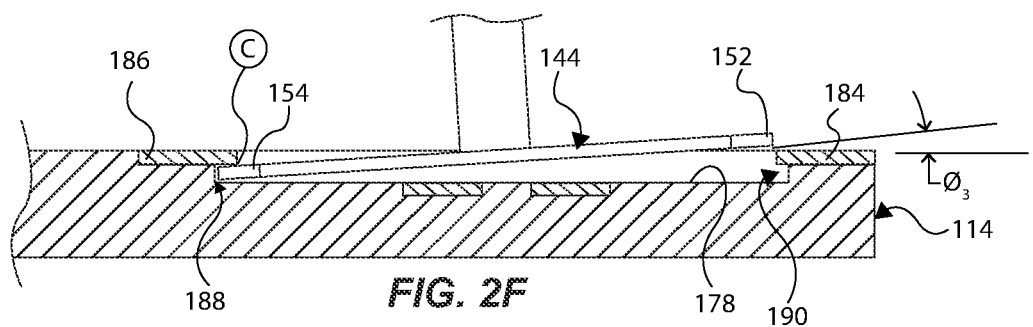
FIG. 2F illustrates a partial cross-sectional side view of the equipment mounting assembly of FIG. 2A (with the fixture mount shown in full), with the fixture mount in a third engagement position relative the mount support base.
Figure 2G:
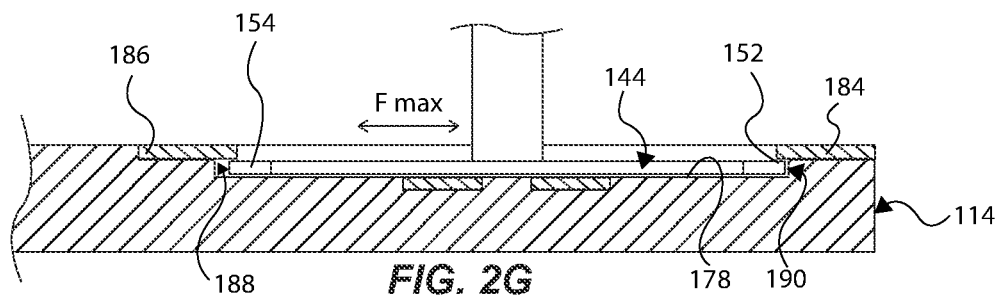
FIG. 2G illustrates a partial cross-sectional side view of the equipment mounting assembly of FIG. 2A (with the fixture mount shown in full), with the fixture mount in a fourth engagement position relative the mount support base.

In operation, the equipment mounting assembly 110 can be assembled and put into use to support production equipment by securing the fixture mount 144 to the mount support base 114 via the retention system 170 (and then coupling a production fixture (not shown, but see FIG. 1) to the fixture mount 144). With the example equipment mounting assembly 110 shown, this can be accomplished by inserting the fixture mount 144 through the access opening 192, and causing the base plate 146, and particularly different portions of the base plate 146 (e.g., different edge portions) to be captured by the rails 184,186 and secured within the capture channels 188,190, the access opening 192 being in communication with the capture channels 188,190. In the present case, because the access opening 192 is sized to be smaller than the base plate 146 in order to be able to secure the fixture mount 144 in the retention system 170 without it inadvertently releasing, the fixture mount 144 can be obtained and rotated about a lateral axis so that it is oriented on an incline relative to the mount support base 114 (referred to herein as an access angle $\theta_1$) just prior to being inserted through the access opening 192. With the fixture mount 144 oriented on an access angle $\theta_1$, the second end 154, for example, of the base plate 146 can be inserted initially through the access opening 192 until coming in contact with the recess surface 178, the second end 154 subsequently being inserted into the capture channel 188, for example, as far as possible until the upper surface 148 of the base plate 146 comes in contact with the second rail 186 at point A (see FIG. 2D, point A). Once in this position, the fixture mount 144 can be rotated downward toward the mount support base 114, thereby decreasing the access angle to a new access angle $\theta_2$, wherein the second end 154 of the base plate 146 is able to be inserted further into the capture channel 188 causing the second rail 186 to slide along the upper surface 148 of the base plate 146 until contact of the second rail 186 with the upper surface 148 reaches point B (see FIG. 2E, point B), thus limiting any further progression. In this position, the fixture mount 144 can be again rotated downward toward the mount support base 114, thereby further decreasing the access angle to a new access angle $\theta_3$, wherein the second end 154 of the base plate 146 is able to be inserted even further into the capture channel 188, again causing the second rail 186 to slide along the upper surface 148 of the base plate 146 until contact of the second rail 186 with the upper surface 148 reaches point C (see FIG. 2F, point C), which is just prior to when the first end 152 is able to clear the first rail 184. As can be seen, as the fixture mount 144 is rotated, it travels along an arcuate path. In addition, as the access angle θ is reduced and the second end 154 caused to progress further into the capture channel 188, the first end 152 of the base plate 146 is brought toward the first rail 184. Further rotation of the fixture mount 144 and decrease of the access angle θ will permit the first end 152 to clear and move past the first rail 184, wherein the fixture mount 144 can subsequently be fully inserted into the recess 172 and caused to be seated about the recess surface 178. Insertion of the fixture mount 144 can also be accomplished by bringing both the second end 154 of the base plate 148 of the fixture mount 144 in contact with the recessed surface 178, and the bottom surface of the base plate in contact with the first rail 184, and then sliding the second end 154 of the base plate 148 along the recessed surface 178 and the bottom surface of the base plate 148 along the first rail 184 until the first end 152 of the base plate 148 clears the first rail 184 and drops into the recess 172. Or, some combination of the above-described insertion steps can be utilized, as will be appreciated.

Once in this position and seated within the recess 172, the fixture mount 144 can then be slid along the recess surface 178 toward the first end 174 of the recess 172 a sufficient distance to insert the first end 152 of the base plate 146 into the capture channel 190, thereby capturing the first end 152 in the capture channel 190, and fully securing the fixture mount 144 to the mount support base 114. In doing so, the retention system 170 is configured so as to maintain the second end 154 of the base plate 146 of the fixture mount 144 within the capture channel 188. The capture channel 190 can be sized to be smaller than the capture channel 188. This can be accomplished by configuring the retention system 170, such that the overhang distance of the rail 184 is less than the overhang distance of the rail 186. Stated differently, the shoulder 180 supporting the rail 184 can be wider than the shoulder 182 supporting the rail 186, thereby decreasing the overhang of the rail 184 and making capture channel 190 smaller or less deep (in the translation direction (e.g., along an x-axis as viewed in FIGS. 2D-2G)) than the capture channel 188. With the retention system 170 thus configured, the fixture mount 144 is caused to be removable from only one direction, and only about its first end 152. In its secured position, the equipment mounting assembly 110 is setup or formed, and ready to receive and support a production fixture. It is noted that although the above-recited process is described in a step-wise manner, that this is not intended to be limiting, but merely to assist in the understanding of the process. In practice, it is likely that the above-recited process will be carried out in a single motion.

As the fixture plate 144 is being inserted, the position keep system, if present, in the form of a biasing system comprising the magnets 196 activates to exert a biasing force on the fixture mount 144 (a normal biasing force, or a force along a normal vector), and particularly the base plate 146, the biasing force acting to attract the fixture mount 144. Once the fixture mount 144 is fully seated against the recess surface 178, the position keep system is fully activated to apply its greatest magnitude of biasing force on the fixture mount 144. Therefore, in order to move the fixture mount in any direction once it is retained within the retention system 170, such as to cause the first end 152 of the base plate 146 to be captured within the capture channel 190 to fully secure the fixture mount 144, this biasing force, and the coefficient of static friction or surface forces $\mu_s$ that oppose relative motion, must be overcome. Generally speaking, static friction forces must be overcome by an applied force before an object can move. The maximum possible static friction force between two surfaces before movement begins is the product of the coefficient of static friction and the normal force $F_n$, namely, $F_{max} = \mu_s F_n$. When the objects are static with no relative movement between them, the friction force can have any value from zero up to $F_{max}$. Any friction force smaller than $F_{max}$ attempting to move or slide one surface over the other is opposed by a frictional force of equal magnitude and opposite in direction, wherein the objects remain static. Any force larger than $F_{max}$ functions to overcome the force of static friction, thus causing relative movement or sliding to occur. In this case, the normal force $F_n$ between the fixture mount 144 and the mount support base 114 comprises the biasing force, and will be higher than it otherwise would be due to the presence of the magnetic attraction forces (the biasing force) being applied to the fixture mount 144 by the position keep system. Therefore, the friction force $F_{max}$ needed to initiate movement of the fixture mount 144 will be higher than it otherwise would be without the position keep system. $F_{max}$ can depend upon a variety of factors, as will be apparent to those skilled in the art.

Along with assisting in maintaining a select, desired position of the fixture mount 144 relative to the mount support base 114, the position keep system can further function to comprise a sufficient $F_{max}$ to prevent the fixture mount 114 from inadvertent or unintended movement within the retention system 170. Stated differently, any potential play that may otherwise exist within the retention system 170 is not a factor and rendered ineffective. Indeed, even though the capture channels 188,190 and the recess 172 provide limited gaps between them and the fixture mount 144, the position keep system functions to maintain the fixture mount 144 in a static state pressed against the mount support base 114 until movement (e.g., translation and rotation for removal purposes) is desired by the operator.

To release the fixture mount 144 from the mount support base 114, the above-recited steps for engagement can be reversed. As can be seen, the recess 172, and the associated capture channels 188,190 are sized and configured to permit a calculated amount of bi-directional translational movement of the fixture mount 144 once it is fully seated about the recess surface 178.

With reference to FIGS. 3A-3B, illustrated is an equipment mounting assembly 210 in accordance with an example of the present disclosure. The equipment mounting assembly 210 is similar in many respects to the equipment mounting assembly 110 of FIGS. 1A-1G. As such, to avoid unnecessary repetition, it is intended that the above description of equipment mounting assembly 110 be referred to for an understanding and disclosure of like or similar elements and like or similar configurations and functions as pertaining to equipment mounting assembly 210. Those skilled in the art will recognize the like or similar elements and functions and can refer to the discussion of FIGS. 1A-1G for support of these. Therefore, the above-discussion of FIGS. 1A-1G is intended to provide additional support for the equipment mounting assembly 210, and any claims directed thereto. Any differences between equipment mounting assembly 110 and equipment mounting assembly 210 will be apparent from the discussion below.

The equipment mounting assembly 210 can comprise a mount support base 214, a fixture mount 244, and a fixture mount retention system or more simply a retention system 270. The combination of the mount support base 214 in support of the retention system 270 can be referred to herein as an equipment mounting system, which system can be operable with a fixture mount to provide a complete equipment mounting assembly. As will be discussed below, unlike the equipment mounting assembly 110 of FIGS. 2A-2G, the equipment mounting assembly 210 shown in FIGS. 3A-3B facilitates selective positioning and repositioning of the fixture mount 244 relative to the mount support base 214 once the fixture mount 244 is captured within and secured by the retention system 170, thus facilitating support of a fixture, such as a production fixture (e.g., light) (not shown, but see FIG. 1) in a plurality of selectable support positions. The various support positions can be selected and modified as often as needed or desired without releasing and removing the fixture mount 244 from the mount support base 214, and without having to decouple the supported production fixture. This is discussed in greater detail below.

The mount support base 214 is similar to the mount support base 114 differing only in size (particularly the length). The mount support base 214 can comprise an upper surface 216 and a perimeter or perimeter edge 218 defining any type of shape or configuration. In the example shown, the mount support base 214 can comprise a perimeter having a rectangular shape defining a first end 220, a second end 222, and first and second sides 224,226. Again, as will be apparent to those skilled in the art, other types of mount support bases, such as those having different sizes, shapes and/or configurations, are contemplated for use with the present technology, as discussed above.

The fixture mount 244, shown as the same type of pin plate as that in FIG. 2A, can comprise, as discussed herein, a base plate 246 having an upper surface 248 and a perimeter 250. The base plate 246 can comprise first and second ends 252,254, and first and second sides 256, 258. Extending upward from the upper surface 248 of the base plate 246, the fixture mount 244 can further comprise a fixture coupling or fixture coupling component in the form of a pin 260 having a shaft 262. The pin 260 can comprise a mounting terminus 264 formed about a distal end of the shaft 262, the mounting terminus 264 defining a coupling interface.

The retention system 270, as discussed herein, can comprise a recess 272 formed in the upper surface 216 of the mount support base 214. The recess 272 can comprise a recessed surface 278. The recess 272 can be sized and configured to receive the fixture mount 244 therein, and to facilitate or provide for the positioning of the fixture mount 244 at various support positions along the length of the recess 272. For example, as shown, the recess 272 can comprise an elongate, rectangular configuration having or defining a first end 274 opposite a second end 276, and a first side 275 opposite a second side 277, these being sized and configured so as to define a recessed area sufficiently sized to receive therein the base plate 246 of the fixture mount 244. The recess 272, as shown, can extend along most of the length of the mount support base 214, and can comprise a length that is at least as long as the base plate 246 of the fixture mount 244. For example, as shown, the end 274 of the recess 272 can be located adjacent the first end 220 of the mount support base 214, with the recess 272 initiating at or near the first end 220 and extending away from the first end 220 towards the second end 222 of the mount support base 214, terminating at a location that is adjacent the second end 222 of the mount support base 214, thus facilitating a wide array of available support positions depending upon the size (e.g., length) of the base plate 246 of the fixture mount 244 relative to the size (e.g., length) of the recess 272. In some aspects, the recess 272 and the base plate 246 can comprise corresponding sizes that facilitate a translation distance of the fixture mount 244 that is at least 0.25 times the size of the base plate 246 of the fixture mount 244 as measured in the translation direction once the fixture mount 244 is secured within the retention system 270. Nonetheless, this is not intended to be limiting in any way. Another way of looking at this is that the equipment mounting assembly 210 can be configured, such that the mounting terminus 264 of the fixture mount 244 is positionable in a plurality of positions within the retention system 270, no matter the configuration of the mount support base 214, the fixture mount 244, or the retention system 270, such as the elements of the recess 272 and the fixture mount 244. Essentially, it is intended that the plurality of support positions be related to the mounting terminus 264, as it is this structure that releasably couples to the production fixture, and ultimately it is the position of the production fixture that is of principal concern.

In the example shown, the fixture mount 244 is caused or permitted to be seated about the recess surface 278, and to slide in a bi-directional manner within the recess 272 once captured and secured by the retention system 270 between the first and second ends 274,276 of the recess 272. Based on the size of the base plate 246 of the fixture mount 244 along its length from the first end 252 to the second end 254 (the size measured along what will be the translation direction of the fixture mount 244), the fixture mount 244 can travel in a bi-directional manner within the recess 272 a distance that is about 2.5 times the length of the base plate 246 (the length of the recess 272 being about 3.5 times the length of the base plate 246).

The retention system 270 can further comprise first and second rails 284,286 coupled or otherwise joined to the mount support base 214 in a position and orientation about the recess 272 so as to at least partially define and form first and second capture channels 288,290 within the recess 272, as well as, at least partially, an access opening 292 in communication with the first and second capture channels 288,290. For example, as shown, the first rail 284 can be mounted to the mount support base 214 along the length of the recess 272, and specifically about a first side 275 of the recess, and the second rail 286 can be mounted to the mount support base 214 opposite the first rail 284 along the length of the recess 272, and about the second side 277 of the recess 272.

The first and second rails 284,286 can be mounted to the upper surface 216 of the mount support base 214. In another aspect, mount support base 214 can further comprise first and second shoulders 280,282 formed in its upper surface 216 adjacent the recess 272, these being sized and configured to receive at least a portion of the first and second rails 284,286, respectively, wherein the first and second rails 284,286 are mounted to the mount support base 214 about the respective first and second shoulders 280,282, these being configured and located as shown. The first and second rails 284,286 can be mounted to the mount support base 214, such that a portion of each of the first and second rails 284,286 extends beyond an edge of the recess 272, or in other words, such that a respective side of each of the first and second rails 284,286 overhangs an edge of and extends into the recess 272, the extended portion of the first and second rails 284,286 and at least one surface of the recess (e.g., a wall, the recess surface, both of these, etc.) defining the first and second capture channels 288,290, respectively, each sufficiently sized to receive and capture a portion of the base plate 146 of the fixture mount 144.

First and second rails 284,286 can each comprise respective first ends 298, 299 spaced apart from the first end 274 of the recess 272 a distance so as to define an access opening 292 into the recess 272. In one aspect, the first ends 298,299 of the rails 284,286 can be located a distance from the first end 274 of the recess 272 that measures the same as the length of the base plate 246 of the fixture mount 244, thus defining an access opening 292 that can receive the fixture mount 244 along a normal axis. In another aspect, the first ends 289,299 of the rails 284,286 can be located a distance from the first end 274 of the recess 272 that measures less than the length of the base plate 246 of the fixture mount 244, thus defining an access opening 292 that can receive the fixture mount 244 in a similar manner as described above with respect to the equipment mounting assembly 110 of FIGS. 2A-2G where the fixture mount 244 can be oriented on an access angle and progressively inserted into the recess 272 and the capture channels 288,290 to clear an edge of the recess 272 about the first end 274.

The retention system 270 can further comprise a third rail 287 mounted to the mount support base 214 along a width of the recess 272, and about the first end 274, the third rail 287 functioning to also secure a portion of the base plate 246 of the fixture mount 244 to assist in securing the fixture mount 244 to the mount support base 214, again without fasteners. The third rail 287 can be mounted to the mount support base 214 in a similar manner as the first and second rails 284,286 (e.g., within a shoulder), such that a portion (e.g., the side and corresponding edge) of the third rail 287 extends beyond the edge of the recess 272 about the first end 274 and into the recess 272, thus defining, in part, a third capture channel 291 extending along the first end 274 of the recess 272 and oriented orthogonal to the first and second capture channels 288,290, the first, second and third rails 284,286,287 defining the access opening, the access opening 292 being sized smaller than the base plate of the fixture mount 244, such that the fixture mount 244 cannot be directly received into the recess 272 through the access opening 292. In the example shown, the rails 284,286,287 are made of metal, and are mounted to the mount support base 214 using an adhesive. In this example, the rails 284,286, and particularly the first and second ends 298,299 of the rails 284,286, can be caused to function together in a similar manner as the second rail 186 of the equipment mounting assembly 110 shown in FIGS. 2A-2C, with the third rail 287 functioning in a similar manner as the first rail 184 of the equipment mounting assembly 110 of those figures. Indeed, the first and second ends 298,299 of the first and second rails 284,286 can be located a distance from the third rail 287 that measures less than the length of the base plate 246 of the fixture mount 244, thus defining an access opening 292 that can receive the fixture mount 244 in a similar manner as described above with respect to the equipment mounting assembly 110 of FIGS. 2A-2G. In a similar manner as discussed above with reference to those figures, the fixture mount 244 can be oriented on an access angle and progressively inserted into the recess 272 and the capture channels 288,290 until it is able to clear an edge of the third rail 287. Once the fixture mount 244 is inserted far enough into the recess 272 and the first and second capture channels 288,290 to clear the third rail 287, the fixture mount 244 can be fully seated within the recess 272 against the recess surface 278. Once seated, the fixture mount 244 can be moved in a direction towards the first end 274 to cause a portion of the base plate 246, namely a first end 252 of the base plate 246, to be inserted into and captured by the third capture channel 291 with other or different portions of the base plate 246, namely the second end 254 and the sides 256,258, captured by the first and second capture channels 288,290. The access opening 292 can be sized smaller than the base plate 246 of the fixture mount 244 in the lengthwise direction (the recess 272 being slightly larger along the width), such that the fixture mount 244, once secured within the retention system 270, cannot be removed from the capture channels 288,290,291 simply by lifting up on the fixture mount 244 (e.g., along a normal axis relative to the upper surface 216 of the mount support base 214). The first, second and third capture channels 288,290,291 are sufficiently sized to receive and capture different portions of the base plate 246 of the fixture mount 244, and to function in a similar manner as other capture channels discussed herein.

The retention system 270 can further comprise a position keep system. The position keep system can, as shown, comprise similar elements, be configured similar to, and can function similar to, the position keep system of equipment mounting assembly 110 described above, and shown in FIGS. 2A-2G. Here, the position keep system can comprise a plurality of magnets 294 seated within corresponding magnet bays 296. The magnets 294 can be located within the recess 272 along a central axis, as shown. The position keep system can comprise any number of magnets 294, and the magnets 294 can be spaced apart from one another, as needed or desired, for example, such that at least two of such magnets 294 are applying a biasing force to the base plate 246 of the fixture mount 244 at any given time as the fixture mount 244 is positioned and repositioned within the retention system 279. A more or less dense cluster of magnets can be used, as will be apparent to those skilled in the art.

In operation, once the fixture mount 244 is secured to the mount support base 214 within the retention system 270, the fixture mount 244 can be caused to move in a bi-directional manner and positioned in any one of an infinite number of positions relative to the mount support base 214, constrained in part by the configuration and size of the recess 272, such as the elongate rectangular recess shown having first and second ends 220,220 and first and second sides 275,277. Position A and position B represent two of such positions along the mount support base 214. The fixture mount 244 can be caused to maintain a selected position through application of the position keep system. The position of the fixture mount 244 can be changed by overcoming the friction force generated within the retention system 270, such as by pushing on a part of the fixture mount 244 with sufficient force.

Figure 4A:
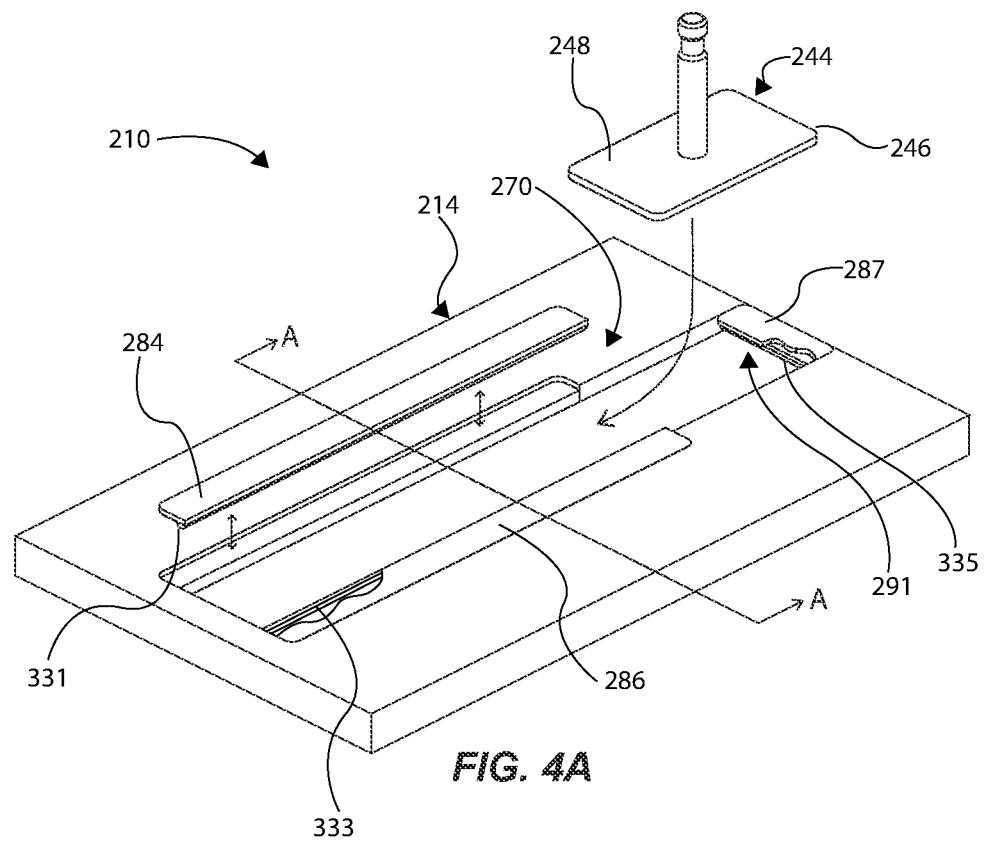
FIG. 4A illustrates an isometric view of the equipment mounting assembly of FIG. 3A comprising an alternative position keep system in accordance with an example of the present disclosure.
Figure 4B:
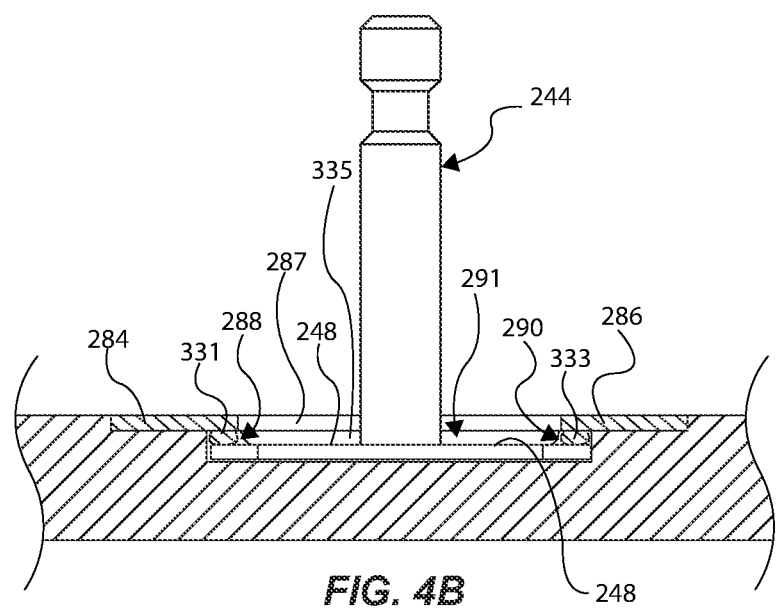
FIG. 4B illustrates a partial cross-sectional front view of the equipment mounting assembly of FIG. 4A (with the fixture mount shown in full), taken along section A-A.

FIGS. 4A-4B illustrate an alternative exemplary position keeping system as part of the retention system 270. In this example, the position keeping system comprises a plurality of elastic elements configured to apply a biasing force to the fixture mount 244 upon the fixture mount 244 being captured and secured to the mount support base 214 via the retention system 270. The elastic elements can comprise a pre-determined modulus of elasticity (i.e., the inherent elastic properties of a material as a resistance to deformation under an applied load). In one example, the elastic elements can comprise a plurality of elastomers (e.g., rubber) or elastomeric members 331,333,335. The plurality of elastomeric members 331,333,335 can be joined to the underside of the first, second and/or third rails 284,286,287, respectively, at strategic locations, such that they extend downward into the respective capture channels 288,290,291, thus being configured to apply a biasing force to the fixture mount 244. Indeed, the elastomeric members 331,333,335 can be sized and configured, such that they are compressed and elastically deformed to achieve a degree of elasticity upon the fixture mount 244 being captured and secured to the mount support base 214, wherein the biasing force is applied to the fixture mount 244 to facilitate maintenance of a selected position of the fixture mount 244 relative to the mount support base 214. In one aspect, the plurality of elastomeric members 331,333,335 can comprise elongate configurations that span substantially between the ends of the rails. In another aspect, the plurality of elastomeric members 331, 333,335 can comprise a series of individual members on each rail. The elastomeric members 331,333,335 can be joined to the rails using an adhesive. The retention system 270 can therefore comprise a resulting first coefficient of static friction $\mu_{s1}$ between the elastomeric members 331,333, 335 and the first, second and/or third rails 284,286,287, and a second coefficient of static friction $\mu_{s2}$ between the fixture mount 244 and the mount support base 214. In order to overcome the static friction and cause the fixture mount 244 to move or slide within the retention system 270, the $F_{max}$ of the retention system must be exceeded, $F_{max}$ being the product of the normal force acting on the fixture mount 244 and the greater of the first and second coefficients of static friction.

Figure 5A:
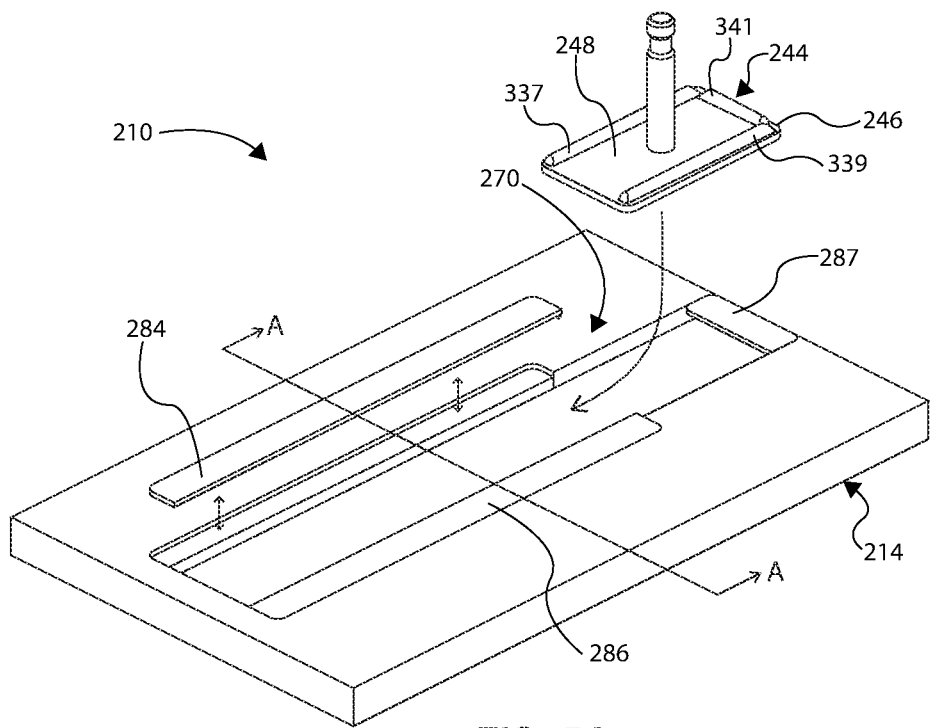
FIG. 5A illustrates an isometric view of the equipment mounting assembly of FIG. 3A comprising still another alternative position keep system in accordance with an example of the present disclosure.
Figure 5B:
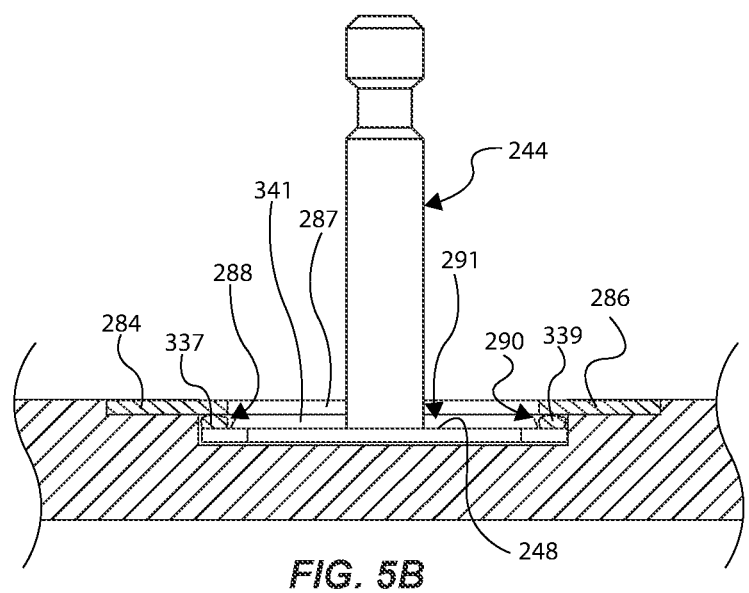
FIG. 5B illustrates a partial cross-sectional front view of the equipment mounting assembly of FIG. 5A (with the fixture mount shown in full), taken along section A-A.

FIGS. 5A and 5B illustrate an alternative exemplary position keeping system as part of the retention system 270. The position keeping system can comprise a plurality of elastic elements configured to apply a biasing force to the fixture mount 244 upon the fixture mount 244 being captured and secured to the mount support base 214 via the retention system 270, similar to those shown in FIGS. 4A and 4B. However, in this example, the elastic elements can comprise a plurality of elastomeric members 337,339,341 that can be joined to the upper surface 248 of the fixture mount 244, such as by using adhesives. The elastomeric members 337,339,341 can be located at strategic locations about the upper surface 248, such that they extend upward into the respective capture channels 288,290,291 to contact an underside of the rails 284,286, 287, respectively, upon the fixture mount 244 being captured and secured within the retention system, wherein they are compressed and elastically deformed to apply the biasing force to the fixture mount 244, thereby facilitating maintenance of a selected position of the fixture mount 244 relative to the mount support base 214.

Figure 6A:
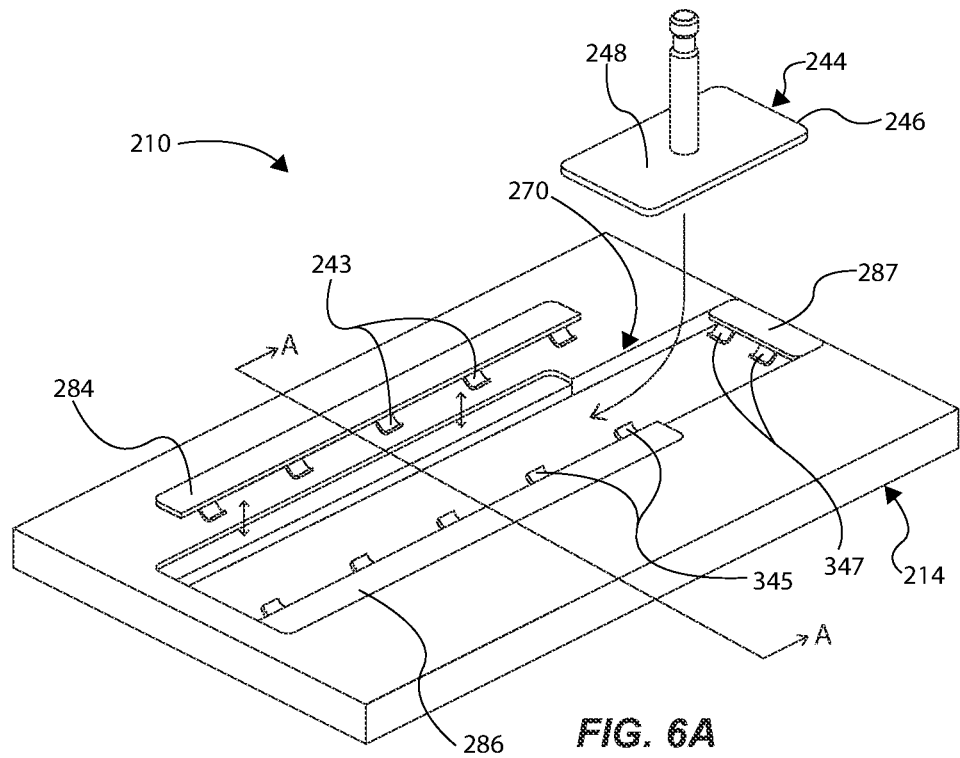
FIG. 6A illustrates an isometric view of the equipment mounting assembly of FIG. 3A comprising still another alternative position keep system in accordance with an example of the present disclosure.
Figure 6B:
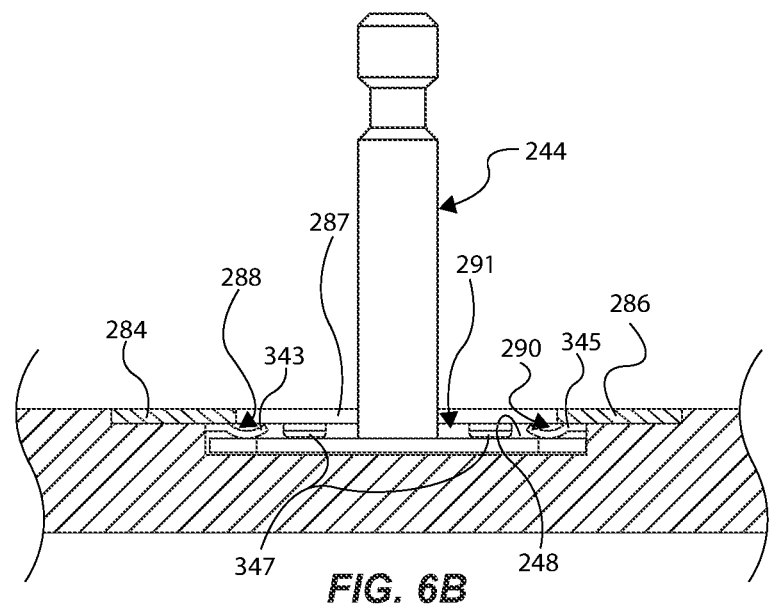
FIG. 6B illustrates a partial cross-sectional front view of the equipment mounting assembly of FIG. 6A (with the fixture mount shown in full), taken along section A-A.

FIGS. 6A-6B illustrate still another alternative exemplary position keeping system as part of the retention system 270. In this example, the position keeping system comprises a plurality of spring elements configured to apply a biasing force to the fixture mount 244 upon the fixture mount 244 being captured and secured to the mount support base 214 via the retention system 270. The spring elements can comprise a pre-determined spring constant, and the retention system 270 can comprise a resulting coefficient of static friction $\mu_s$. In one example, the spring elements can comprise a plurality of leaf-type spring members 343,345,347, such as shown. The plurality of spring members 343,345, 347 can be coupled or otherwise joined or secured to the underside of the first, second and/or third rails 284,286,287, respectively, at strategic locations, such that they extend downward into the respective capture channels 288,290,291, thus being positioned and configured to apply a biasing force to the fixture mount 244. Indeed, the spring members 343,345,347 can be sized and configured, such that they are compressed and elastically deflected a degree to apply the corresponding biasing force once the fixture mount 244 is captured and secured to the mount support base 214 within the retention system 270, wherein the biasing force is applied to the fixture mount 244 to facilitate maintenance of a selected position of the fixture mount 244 relative to the mount support base 214. The retention system 270 can therefore comprise a resulting first coefficient of static friction $\mu_{s1}$ between the spring members 343,345,347 and the first, second and/or third rails 284,286,287, and a second coefficient of static friction $\mu_{s2}$ between the fixture mount 244 and the mount support base 214.

In one aspect, the plurality of spring members 343,345, 347 can comprise a series of individual members on each rail, as shown. In another aspect, the plurality of spring members 343,345,347 can each comprise an elongate configuration that span substantially between the ends of the rails. The spring members 343,345,347 can be configured to permit the passage of the fixture mount 244 as it is captured within the retention system, this action functioning to also deflect the various spring members 343,345,347 as movement of the fixture mount 244 progresses. For example, the spring members 343,345,347 can each comprise a free segment (or free end) extending from a fixed segment (or fixed end) joined to the respective rails 284,286,287, the free segment comprising a curved configuration, such that as the fixture mount 244, and particularly its base plate 246, is captured, the edge of the base plate 246 clears the upturned edge or end of the free segment and contacts the underside of the curved underside of the free segment, wherein the base plate 246 deflects the free segment, and wherein a biasing force is applied. This process is continued until the fixture mount 244 is fully captured and seated within the retention system 270. In order to overcome the static friction and cause the fixture mount 244 to move or slide within the retention system 270, the $F_{max}$ of the retention system must be exceeded, $F_{max}$ being the product of the normal force acting on the fixture mount 244 and the greater of the first and second coefficients of static friction. Those skilled in the art will recognize that other configurations of spring members are contemplated, and therefore, those shown and discussed herein are not intended to be limiting in any way.

Figure 7A:
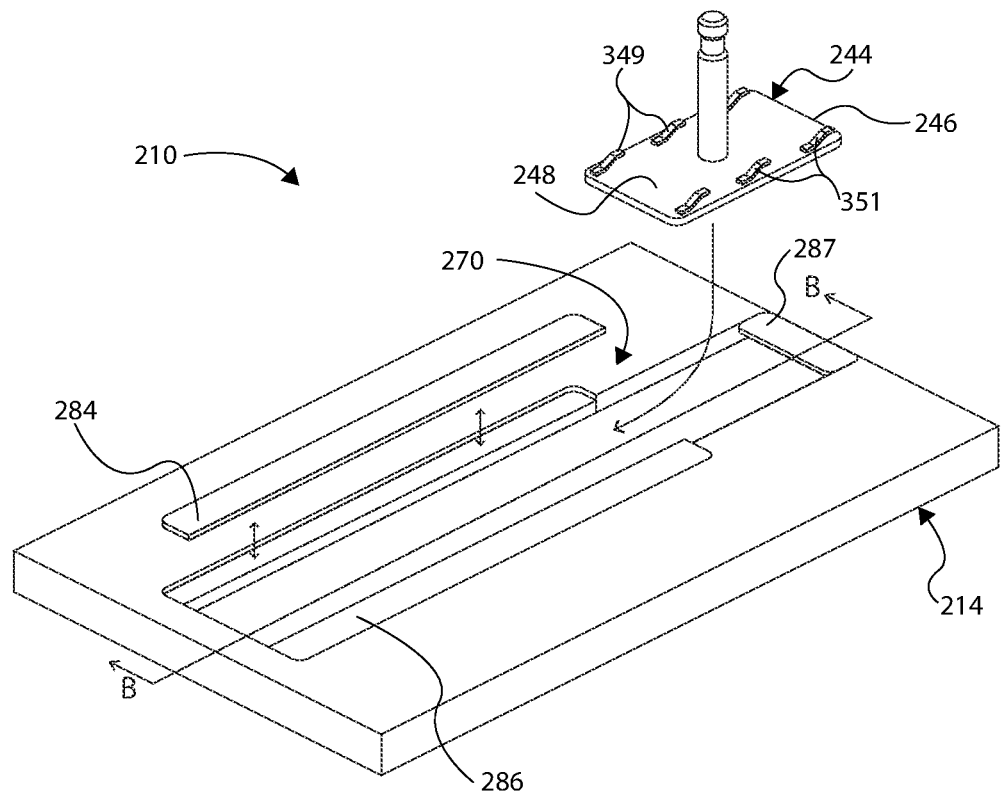
FIG. 7A illustrates an isometric view of the equipment mounting assembly of FIG. 3A comprising still another alternative position keep system in accordance with an example of the present disclosure.
Figure 7B:
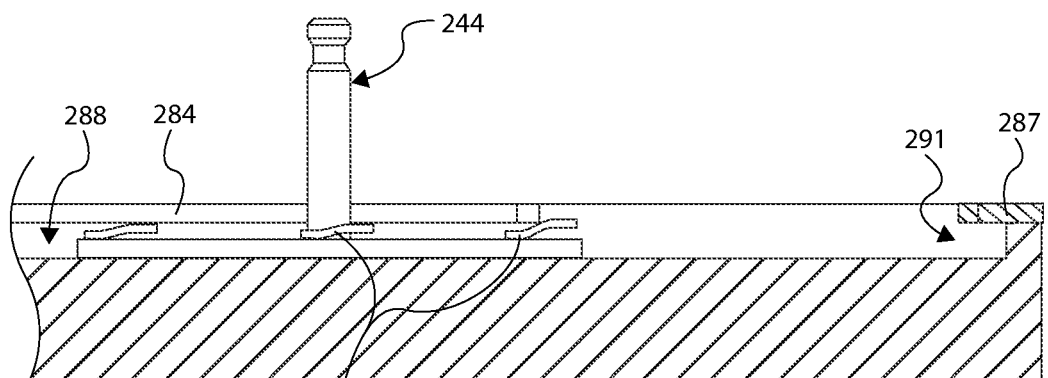
FIG. 7B illustrates a partial cross-sectional side view of the equipment mounting assembly of FIG. 7A (with the fixture mount shown in full), taken along section B-B.
Figure 8D:
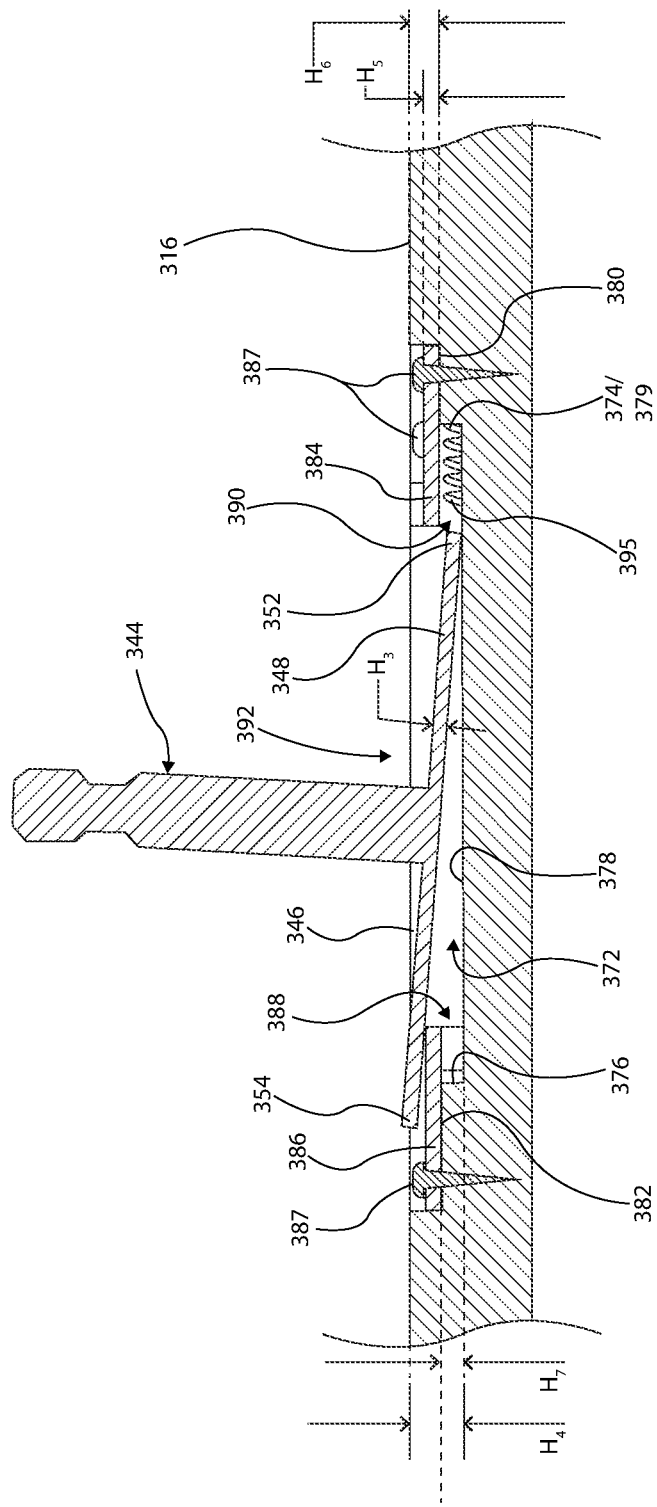
FIG. 8D illustrates a cross-sectional view of the equipment mounting assembly of FIG. 8A, taken along lines A-A in FIG. 8A.
Figure 8F:
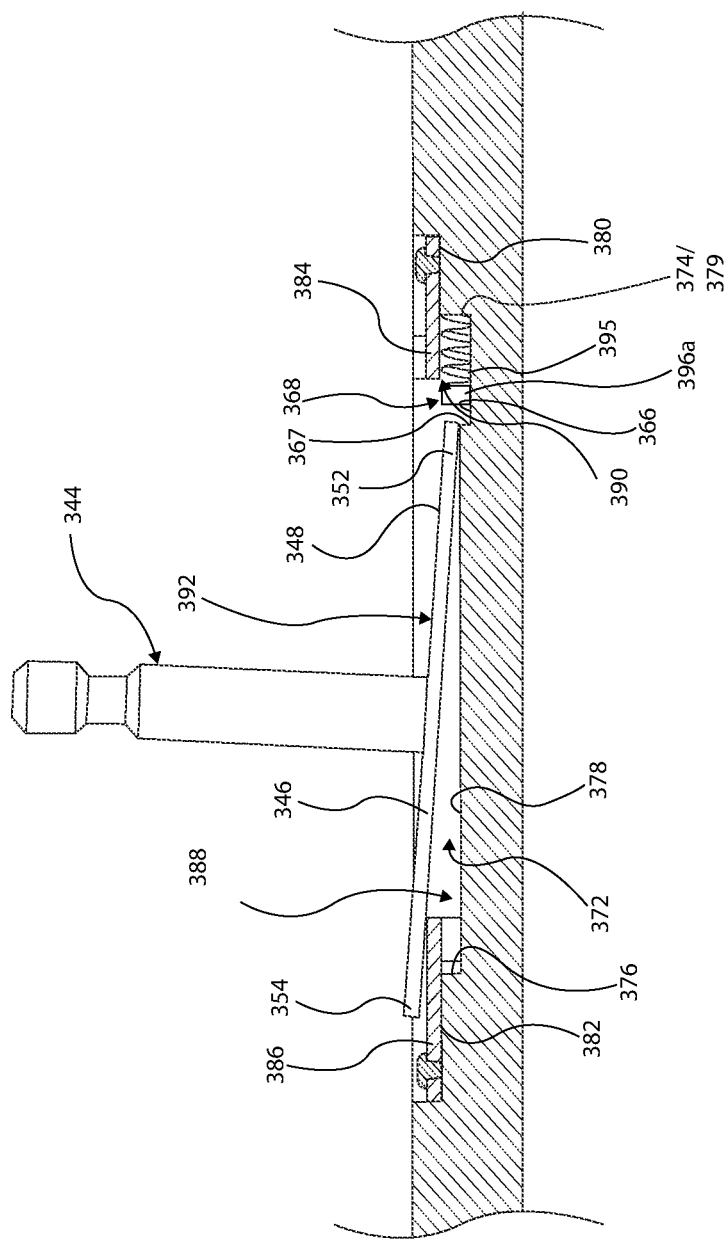
FIG. 8F illustrates a cross-sectional view of the equipment mounting assembly of FIG. 8E, taken along lines A-A in FIG. 8E, and with the equipment mounting device assembled with the fixture mount at least partially secured to the mount support base.

FIGS. 7A and 7B illustrate an alternative exemplary position keeping system as part of the retention system 270. The position keeping system can comprise a plurality of spring elements configured to apply a biasing force to the fixture mount 244 upon the fixture mount 244 being captured and secured to the mount support base 214 via the retention system 270, similar to those shown in FIGS. 6A and 6B. However, in this example, the spring elements can comprise a plurality of leaf-type spring members 349,351 that can be coupled or otherwise secured or joined to the upper surface 248 of the base plate 246 of the fixture mount 244, such as by welding. The spring members 349,351 can be located at strategic locations about the upper surface 248, such that they extend upward into the respective capture channels (see capture channel 291)(capture channels 288, 290 not shown, but see FIG. 3B) to contact an underside of the rails 284,286, 287, respectively, once the fixture mount 244 is captured and secured within the retention system, wherein the spring members 349,351 are compressed and elastically deflected a degree to apply the biasing force to the fixture mount 244, thereby facilitating maintenance of a selected position of the fixture mount 244 relative to the mount support base 214. The spring members 349,351 can comprise a free segment extending upward from a fixed segment joined to the upper surface of the base plate 246 of the fixture mount 244. As the fixture mount 244 is inserted into the access opening and caused to engage the first, second and/or third rails 284,286,287, the free ends of the spring members 349,351 are deflected by the rails, wherein a biasing force is applied.

Other types of biasing elements that can be incorporated into the retention system 270 will be apparent to those skilled in the art. As such, those discussed herein are not intended to be limiting in any way.

With reference to FIGS. 8A-8D, illustrated is an equipment mounting assembly 310 in accordance with an example of the present disclosure. The equipment mounting assembly 310 is similar in many respects to the equipment mounting assemblies 110 and 210 of FIGS. 1A-7B. As such, to avoid unnecessary repetition, it is intended that the above description of equipment mounting assembly 110 and 210 be referred to for an understanding and disclosure of like or similar elements and like or similar configurations and functions as pertaining to equipment mounting assembly 310. Those skilled in the art will recognize the like or similar elements and functions and can refer to the discussion of FIGS. 1A-7B for support of these. Therefore, the above-discussion of FIGS. 1A-7B is intended to provide additional support for the equipment mounting assembly 310, and any claims directed thereto. Any differences between equipment mounting assembly 310 and equipment mounting assembly 110 and/or 210 will be apparent from the discussion below.

The equipment mounting assembly 310 can comprise a mount support base 314 having an upper surface 316 and a perimeter or perimeter edge 318 defining any type of shape or configuration. In the example shown, the mount support base 314 can comprise a perimeter having a rectangular shape defining a first end 320, a second end 322, and first and second sides 324,326. As will be apparent to those skilled in the art, other types of mount support bases, such as those having different sizes, shapes and/or configurations, are contemplated for use with the present technology, as discussed above.

The equipment mounting assembly 310 can further comprise one or more fixture mounts operable and usable with the mount support base 310 to make or form an equipment mounting system. The one or more fixture mounts can comprise a base plate and a fixture coupling extending from and supported by the base plate, wherein the fixture coupling comprises a mounting terminus defining and comprising a coupling interface operable to engage and releasably couple a piece of equipment or a fixture of some type, such as a production fixture (not shown, but see production fixture of FIG. 1 in the form of a light fixture). In one aspect, as shown, the fixture mount 344 can be in the form of a pin plate, such as a baby plate, as is known, or any other type of pin plate. The fixture mount 344 can comprise a plate portion or base plate 346 having an upper surface 348 and a perimeter 350 defining any type of shape or configuration, such as rounded rectangular, as shown. The base plate 346 can comprise first and second ends 352,354, and first and second sides 356, 358. Extending upward from the upper surface 348 of the base plate 346, the fixture mount 344 can further comprise the fixture coupling in the form of a pin 360 having a shaft 362. The pin 360 can comprise a mounting terminus 364 formed about a distal end of the shaft 362, the distal end comprising that end of the pin 360 that terminates in space (the end of the pin not secured to the base plate 346, but located furthest from the base plate 346). The mounting terminus 364 can define a coupling interface operable to engage and releasably couple a production fixture (not shown, but see production fixture of FIG. 1 in the form of a light fixture). In the example shown, the fixture mount 344 comprises a mounting terminus 364 having a male-type coupling interface configured to engage and releasably couple a receiver of the production fixture having a female-type coupling interface. The fixture mount 344 can be made of any material suitable for supporting production equipment, and for being secured to the mount support base 314, such as metal, carbon fiber, and others. As will be apparent to those skilled in the art, other types of fixture mounts are contemplated for use with the present technology, as discussed above.

The equipment mounting assembly 310 can further comprise a fixture mount retention system or more simply a retention system 370 supported by and operable with the mount support base 314. The combination of the mount support base 314 in support of the retention system 370 can be referred to herein as an equipment mounting system, which system can be operable with the fixture mount to provide a complete equipment mounting assembly. The retention system 370 can be operable to releasably secure the fixture mount 344, and any production fixture coupled thereto, to the mount support base 314 for the purpose of providing a support, stand, platform, etc. for the production fixture. As discussed above with respect to FIG. 1, the retention system 370 can be configured to accomplish this without requiring the use of fasteners, such as screws or nails through the fixture mount 344 (although standard fixture mounts can be used, including those having holes formed therein for receiving a fastener). For example, as shown, the retention system 370 can comprise a recess 372 formed in the upper surface 316 of the mount support base 314. The recess 372 can comprise a fixture mount profile (a perimeter outline and configuration corresponding to a perimeter outline and configuration of a fixture mount, and particularly the base plate of the fixture mount, to be captured in the retention system 370) and a recessed surface 378 located at a recess depth $H_4$ having a depth at least as deep as (e.g., in the example shown the depth $H_4$ being greater than) a thickness $H_3$ of the base plate 346 of the fixture mount 344, such that the upper surface 348 of the base plate 346 of the fixture mount 344 is below the upper surface 316 of the mount support base 314 upon the fixture mount 344 being received within the retention system 370, seated within the recess 372. The recess 372 can be sized and configured to receive the fixture mount 344 therein, and specifically the base plate 346 of the fixture mount 344. For example, as shown, the recess 372 can comprise an elongated, rectangular configuration having or defining a first end 374 opposite a second end 376, and a first side 375 opposite a second side 377, these being sized and configured so as to define a recessed area sufficiently sized to receive therein the base plate 346 of the fixture mount 344, wherein the fixture mount 344 is caused or permitted to be seated about the recess surface 378. The recess 372 can be formed at any location within the mount support base 314. For example, as shown, the recess 372 can be located more towards the second end 322 of the mount support base 314. The recess 372 can comprise a length less than the length of the mount support base 314. The recess 372 can be sized with a width $W_3$ that is wider than the width $W_4$ of the base plate 346 of the fixture mount 344, thus permitting the fixture mount 344 to fit laterally between the sidewalls of the recess 372 without binding. Likewise, the recess 372 can comprise a length $L_3$ greater than the length L2 of the base plate 346 of the fixture mount 344, thus permitting the fixture mount 344 to fit lengthwise between the first and second ends 374,376 of the recess 372.

The retention system 370 can further comprise first and second rails 384,386 coupled or otherwise joined to the mount support base 314 in a position and orientation adjacent or about the recess 372 so as to at least partially define and form first and second capture channels 388,390 within the recess 372, as well as, at least partially, an access opening 392 in communication with the first and second capture channels 388,390. For example, as shown, the first rail 384 can be mounted to the mount support base 314 at a first position along the width of the recess 372 about or adjacent the first end 374, and the second rail 386 can be mounted to the mount support base 314 at a second position opposite the first rail 384, and about and adjacent the second end 376, each of these being oriented to extend in a lateral direction relative to the recess 372 (e.g., parallel to the first and second ends 320,322 of the mount support base 314). Those skilled in the art will recognize that the rails 384,386 could alternatively be mounted along the length of the recess 372, parallel to the sides 375,377 of the recess. In this case, the recess 372 could be configured to extend beyond the rails a sufficient distance to permit the access opening to receive the fixture mount 344 (e.g., see FIG. 3A).

The first and second rails 384,386 can be mounted to the mount support base 314. In one aspect, mount support base 314 can further comprise first and second shoulders 380,382 formed in its upper surface 316 adjacent the recess 372, these being sized and configured to receive at least a portion of the first and second rails 384,386, respectively, wherein the first and second rails 384,386 are mounted to the mount support base 314 about the respective first and second shoulders 380,382. More specifically, the first and second shoulders 380,382 can intersect the walls of the recess 372 defining the first and second ends 376,374 of the recess 372. In addition, the first and second shoulders 380,382 can comprise a width $W_5$ that is less than a width $W_6$ of the first and second rails 384,386, thus facilitating the proper positioning of the rails 384,386 relative to the recess 372. In either case, the first and second rails 384,386 can be mounted to the mount support base 314, such that a portion of each of the first and second rails extends beyond an edge of the recess 372, or in other words, such that a respective side of each of the first and second rails 384,386 overhangs an edge of and extends into the recess 372. The extended portion of the first and second rails 384,386 and at least one surface of the recess 372 (e.g., a wall, the recess surface, both of these, etc.) can define, at least in part, the first and second capture channels 388,390, respectively. First and second rails 384,386 can be spaced apart from one another a distance $D_{rail1,rail2}$ that defines a distance between them (between the respective edges extending beyond the edges of the recess 372) that is less than a length L2 of the base plate 346 of the fixture mount 344, such that the fixture mount 344 cannot be removed from the capture channels 388,390 simply by lifting up on the fixture mount 344 (e.g., along a normal axis relative to the upper surface 316 of the mount support base 314) once inserted and into the retention system 370. Furthermore, the rails 384,386 can be mounted in an elevated position relative to the recess surface 378, and can comprise a thickness or height $H_5$ (see FIG. 8D). The shoulders 380, 382 can comprise a depth $H_6$ (see FIG. 8D). The depth or height $H_6$ of the shoulder 380,382, as measured from the upper surface 316 of the mount support base 314, can be greater than the thickness $H_5$ of the rails 384,386. This differential can be configured to facilitate support of the rails 384,386 below the upper surface 316 of the mount support base 314. More specifically, the shoulders 380,382 can be formed and configured to comprise a sufficient depth as measured from the upper surface 316 of the mount support base 314, such that an uppermost surface of each of the rails 384,386 is located below the upper surface 316 of the mount support base 314 when the rails 384,386 are installed and secured to the mount support base 314 about the shoulders 380,382, respectively. The distance between the upper surface 316 of the mount support base 314 and the uppermost surface of the rails 384,386 can be calculated or configured to be any distance, and in some examples, the countersunk distance of the rails 384,386 from the upper surface 316 will facilitate an uppermost surface of the fasteners 387 to be flush with or below the upper surface 316 of the mount support base 314 so that they do not protrude up beyond the upper surface 316 of the mount support base 314. This provides several advantages, including eliminating the need or desire to countersink the fasteners 387 in the rails 384,386 as is done with respect to the equipment mounting assemblies 110 and 210 discussed above, which can save on manufacturing costs as compared to those examples in which the fasteners are countersunk into the rails.

The depth $H_4$ of the recess 372 minus the height $H_6$ of the shoulders 380,382 can equal the height $H_7$ of the capture channels 388, 390 (i.e., $H_4-H_6=H_7$). The height $H_7$ of the capture channels 388, 390 can be coordinated, such that the first and capture channels 388,390 are sufficiently sized to receive and capture a portion of the base plate 346 of the fixture mount 344. For example, in one aspect, the capture channels 388,390 can be formed to comprise a height $H_7$ just slightly greater than the thickness or height $H_3$ of the base plate 346 of the fixture mount 344. In another aspect, the capture channels 388,390 can be formed to comprise a height $H_7$ between 1 and 2 times the thickness or height $H_3$ of the base plate 346 of the fixture mount 344. In still other aspects, this height can be even greater than twice $H_3$. Of course, these are only example relative sizes, and as such, are not to be limiting in any way. Based on the foregoing, a gap distance $D_{gap}$ between the upper surface 348 of the base plate 346 of the fixture mount 344 and the bottom surface of the rails 384,386 (with the fixture mount 344 secured within the retention system 370) can be calculated in accordance with the following: the height of one or each of the first and second capture channels 388,390 $H_7$ minus the height or thickness $H_3$ of the base plate 346 of the fixture mount 344 (i.e., $H_7-H_3=D_{gap}$). The gap distance can define the amount or distance of travel or play that exists between the fixture mount 344 and the first and second rails 384,386 along an axis normal to the recess surface 378.

The rails 384,386 can be coupled or otherwise mounted or joined to the mount support base 314 using permanent or non-permanent types of fasteners (e.g., nails, screws, nuts/bolts, welds, etc.), adhesives or any other joining means known by those skilled in the art. The type of joining means used can depend on the type of material making up the mount support base and the rails, or other factors. In the example shown, the rails 384, 386 are mounted using screws 387 inserted through apertures formed in the rails 384,386 and driven into the mount support base 314, which can be made of wood.

In an alternative example, and as will be apparent to those skilled in the art, the rails 384,386 can be formed from the material making up the mount support base 314. For example, in the case of a mount support base comprising an apple box made of wood, the recess and the rails can be formed by removing the necessary material (e.g., by routing) to form these within the wood structure of the apple box. As such, it is contemplated that some equipment mounting assemblies can comprise rails that are integrally formed into the mount support base without requiring additional hardware elements.

As discussed herein, the retention system 370 can be configured to support a fixture or other equipment. That being said, the equipment mounting assembly 310 can be configured to withstand the various forces and moments that may result from coupling a production fixture to the equipment mounting assembly 310. In one aspect, the equipment mounting assembly 310 can be configured to at least support the same type of production equipment that a prior related skid plate could support, the prior related skid plate comprising a fixture mount (e.g., a baby plate) joined to a mount support base (e.g., an apple box) using screws or other fasteners. In another aspect, the equipment mounting assembly 310 can be configured to support different types of production equipment that may not have been able to be supported prior to the present technology. For instance, some production equipment may be sufficiently heavy, such that coupling to a prior existing skid plate could, under some circumstances, potentially cause the fasteners to rip from the mount support base, thus destroying the mount support base, and potentially destroying or damaging the attached production fixture, as well as potentially injuring operators or other individuals in close proximity. Those skilled in the art will recognize the different design parameters in the equipment mounting assembly 310 that can be varied to accommodate different production equipment support scenarios.

The retention system 370 can further comprise a position keep system operable to assist in controlling and maintaining a position of the fixture mount 344 relative to the mount support base, and to further secure the fixture mount 344, once captured by and secured within the retention system 370. The position keep system can employ a variety of devices, systems, mechanisms, etc. for accomplishing this. Various examples are discussed herein, and shown in the drawings. In one example, the position keep system can comprise a biasing system operable to provide a sufficient biasing force between the fixture mount 344 and the mount support base 314, such that movement between the fixture mount 344 (as captured within the retention system 370) and the mount support base 314 is hindered or resisted, and therefore restricted to some degree or another. In one aspect, the minimum magnitude of the biasing force can be such that the fixture mount 344 is prevented from moving under its own weight (e.g., under the influence of gravity). In this case, the resistance or hindrance of the movement of the fixture mount 344 can be controlled by varying the magnitude of the biasing forces(s) generated by the position keep system. This can be accomplished through specific design of the various components of the equipment mounting assembly 310. Indeed, the position keep system can be configured, such that, once activated and the one or more biasing forces are applied, a pre-determined threshold force is required to be applied to the fixture mount 344 to overcome the biasing forces and a corresponding coefficient of static friction, and to cause it to move within the retention system 370. It is noted that this pre-determined threshold force can be applied directly, such as by an operator.

In one aspect, the biasing system of the position keep system can comprise one or more elastic elements operable and configured to store and release energy, and to apply a biasing force to the fixture mount 344. The elastic elements can be supported about one or both of the fixture mount 344 or the mount support base 314, such that the biasing force is applied between the fixture mount 314 and the mount support base 314. In one specific example, as shown, the biasing system of the position keep system can comprise one or more springs (e.g., see first and second springs 394 and 395) disposed in the recess 372, the one or more springs being operable to apply or exert a biasing force on the fixture mount 344. In one aspect, the first and second springs 394,395 can be disposed in respective first and second bays (e.g., see spring bays 397,399) formed at least partially in the shoulder 380 and the recess surface 378. The first and second springs 394, 395 can be secured within the respective first and second spring bays 397,399 by the first rail 384. In some examples, the first and second springs 394,395 can be inserted into their respective spring bays 397,399 and the first rail 384 can then be coupled to the mount support base 314, wherein the first and second springs 394,395 are prevented from being removed from the spring bays 397,399 due to the first rail 384 being positioned about the spring bays 397,399 so as to limit movement of the first and second springs 394,395. More specifically, the first and second spring bays 397,398 can comprise a recess operable to receive the first and second springs 394,395, respectively. The spring bays 397,398 can be sized and configured such that a lower spring support surface of the spring bays 397,398 is formed or positioned below the recessed surface 378. The height or depth of the first and second spring bays 397,399, as measured from the recessed surface 378 (i.e., the recessed distance of the lower spring support surface from the recessed surface 378) can vary. In some examples, the height or depth of the spring bays 397,398, as measured from the recessed surface 378, can be less than a diameter of the first and second springs 394,395, such that at least a portion of the first and second springs 394,395, upon being received and seated within the spring bays 397,399, respectively, extend upward from the first and second spring bays 397,399, respectively, and above or beyond the recessed surface 378. In addition, the spring bays 397,399 can comprise a length that extends to receive the first and second springs 394,395, respectively, such that the first and second springs 394,395 are oriented in a prone or horizontal manner (i.e., they are oriented such that they are laying on their side, and can extend and retract in a plane parallel to a plane defined by the recessed surface 378 of the recess 372) once received in the respective spring bays 397,399. In this position, the first and second springs 394,395 are configured and operable to apply or exert a force against a sidewall of the base plate 346 of the fixture mount 344 about the first end 352 of the base plate 346. Moreover, the spring bays 397,399 can be located and configured such that they extend, or that they are at least partially formed, between the shoulder 380 and the recess 372. The ratio of the portion of the spring bays 397,399 that extends into the recessed portion and the portion that extends into the shoulder 380 can vary. This can depend upon the type of springs used. Essentially, the spring bays 397,399 can be operable to receive the springs 394,395, respectively, and to facilitate their compression and expansion respective longitudinal axes (the long axes of the springs extending in a direction parallel to a direction of travel). In addition, the spring bays 397,399 can position at least a portion of the springs 394,395 (e.g., a distal end of the springs 394,395) within the capture channel 390 upon the first rail 384 being secured in place about the mount support base 314, as discussed herein. More specifically, the spring bays 397,399 can be configured such that the springs 394, 395 can compress against the shoulder 380, and such that distal ends of the springs 394,395 (the free, moving ends opposite the ends in contact with the shoulder 380 extending at least partially into the capture channel 390, and that are intended to come in contact with and engage the fixture mount 344) can travel back and forth within the capture channel 390 a given distance, wherein the springs 394,395 are caused to store and release energy. The spring bays 397,399 can further be configured to laterally constrain the springs 397,390. Indeed, the spring bays 397,399 can be configured to comprise a recess just slightly wider than the diameter of the springs, such that the walls of the spring bays 397,399 are adjacent the springs 394,395, respectively, thus operating to constrain the springs 394,395 in the lateral direction. In the example shown, the springs 394,395 can travel within the capture channel 390 from an extended position (where no energy is stored) to a compressed position (wherein the springs store energy). In one non-limiting example, the spring bays 397,399 and the springs 394,395 can be configured, such that, upon compression of the springs 394,395 by the fixture mount 344, the distal ends of the springs 394,395 travel a distance that at least reaches a sidewall 379 defining the first end 374 of the recess 372 before the springs 394,395 bottom out. Stated differently, the spring bays 397,399 and the springs 394,395 can be configured, such that the fixture mount 344 can be inserted into the capture channel 390 and forced against the springs 394,395, thus overcoming the biasing force and compressing the springs 394,395, and brought, at least temporarily or initially, into a position where the base plate 346 of the fixture mount 344 is adjacent and in contact with the sidewall 379 of the first end 374 of the recess without the springs 394,395 first bottoming out.

The position keep system can further comprise a base plate interface device configured to be supported about the distal ends of the springs 394,395, and configured to engage and interface with the base plate 346 of the fixture mount 344. The base plate interface device can comprise end caps, bumpers, or other similar structural components. In one example shown in FIG. 8E, the base plate interface device can comprise end caps 396a, 396b having an outer interface surface adapted to engage or come in contact with the base plate 346 of the fixture mount 344 as it is being inserted into the capture channel 390. The end caps 396a, 396b can provide a more robust and consistent surface for the edge of the base plate 346 to come into contact with to prevent slippage. The end caps 396a, 396b can also be formed of a different material, such as a softer material, so as to prevent scratching or scuffing of the base plate 346. In another aspect, the outer interface surface of the end caps 396a, 396b can comprise a channel formed therein configured and adapted to receive the edge of the base plate 346 as it is being inserted into the capture channel 390. This can help with both the initial alignment and continued alignment of the springs 394,395 with the base plate 346 while the fixture mount 344 is being inserted into the retention system 370 and while it is in its captured position within the retention system 370 about the mount support base 314. The base plate interface device can comprise a material different from the elastic element upon which it is supported. In one example, the base plate interface device can comprise a rubber or other compliant or semi-compliant material. Other types of materials that could be used, and the many different possible configurations that can be employed, will be apparent to those skilled in the art.

In operation, the equipment mounting assembly 310 can be assembled and put into use to support production equipment by securing the fixture mount 344 to the mount support base 314 via the retention system 370 (and then coupling a production fixture (not shown, but see FIG. 1) to the fixture mount 344). With the example equipment mounting assembly 310 shown, this can be accomplished by inserting the fixture mount 344 through the access opening 392, and causing the base plate 346, and particularly different portions of the base plate 346 (e.g., different edge portions) to be captured by the rails 384,386 and secured within the capture channels 388,390, the access opening 392 being in communication with the capture channels 388,390. In the present case, because the access opening 392 is sized to be smaller than the base plate 346 in order to be able to secure the fixture mount 344 in the retention system 370 without it inadvertently releasing or disengaging, the fixture mount 344 can be obtained and rotated about a lateral axis extending between the sides 356,358 of the base plate 346 of the fixture mount 344 so that it is oriented on an incline relative to the mount support base 314 (referred to herein as an access angle) just prior to being inserted through the access opening 392. With the fixture mount 344 oriented on an access angle $\theta_1$, the first end 352, for example, of the base plate 346 can be inserted initially through the access opening 392 until coming in contact with the recess surface 378, the first end 352 subsequently being inserted into the capture channel 390, for example, as far as possible until the upper surface 348 of the base plate 346 comes in contact with the first rail 384. Once in this position, the fixture mount 344 can be rotated downward toward the mount support base 314, thereby decreasing the access angle to a new access angle $\theta_2$, wherein the first end 352 of the base plate 346 is able to be inserted further into the capture channel 390 causing the first rail 384 to slide along the upper surface 348 of the base plate 346 until contact of the first rail 384 with the upper surface 348 reaches a further point, thus limiting any further progression. In this position, the fixture mount 344 can be again rotated downward toward the mount support base 314, thereby further decreasing the access angle to a new access angle $\theta_3$, wherein the first end 352 of the base plate 346 is able to be inserted even further into the capture channel 390, again causing the first rail 384 to slide along the upper surface 348 of the base plate 346 until contact of the first rail 384 with the upper surface 348 reaches a still further point, which is just prior to when the second end 354 of the base plate 346 is able to clear the second rail 386. As can be seen, as the fixture mount 344 is rotated, it travels along an arcuate path. In addition, as the access angle $\theta$ is reduced and the first end 352 of the base plate 346 is caused to progress further into the capture channel 390, the second end 354 of the base plate 346 is brought toward the second rail 386 until the base plate 346 eventually comes to rest on the second rail 386 (see FIGS. 8B and 8D). Further insertion of the first end 352 of the base plate 346 into the capture channel 390 and further rotation of the fixture mount 344 and decrease of the access angle $\theta$ will permit the second end 354 to clear and move past the second rail 386, wherein the fixture mount 344 can subsequently be fully inserted into the recess 372 and caused to be seated about the recess surface 378. Insertion of the fixture mount 344 can also be accomplished by bringing both the first end 352 of the base plate 346 of the fixture mount 344 in contact with the recessed surface 378, and the second end 354 of the base plate 346 in contact with the second rail 386 (see FIGS. 8B and 8D), and then sliding the first end 352 of the base plate 346 along the recessed surface 378 and the second end 354 (particularly a bottom surface of the base plate 346) along the second rail 386 until the second end 354 of the base plate 346 clears the second rail 386 and drops into the recess 372. Or, some combination of the above-described insertion steps can be utilized, as will be appreciated. Again, this will likely be carried out by the user with little thought to the specific insertion steps or process described.

Once the fixture mount 344 is initially seated in the recess 372 with the base plate 346 against the recessed surface 378, the fixture mount 344 can then be caused to slide along the recess surface 378 toward the second end 376 of the recess 372 a sufficient distance to insert the second end 354 of the base plate 346 into the capture channel 388, thereby capturing the second end 354 in the capture channel 388, and fully securing the fixture mount 344 to the mount support base 314 (this being the ultimate capture position)(see FIG. 8C). Upon doing so, the retention system 370 can be configured so as to maintain the first end 352 of the base plate 346 of the fixture mount 344 within the capture channel 390.

The capture channel 388 can be sized to be smaller than the capture channel 390. This can be accomplished by configuring the retention system 370, such that the overhang distance of the second rail 386 is less than the overhang distance of the first rail 384. This can be done either by causing the second shoulder 382 supporting the second rail 386 to be wider than the first shoulder 380 supporting the first rail 384, thereby decreasing the overhang of the second rail 386 and making capture channel 388 smaller or less deep (in the translation direction (e.g., along an x-axis as viewed in FIG. 8D)) than the capture channel 390. With the retention system 370 thus configured, the fixture mount 344 is caused to be removable from only one direction, and only about its second end 354. In its secured position, the equipment mounting assembly 310 is setup or formed, and ready to receive and support a production fixture. It is noted that although the above-recited process is described in a stepwise manner, that this is not intended to be limiting, but merely to assist in the understanding of the process. In practice, it is likely that the above-recited process will be carried out in a single motion.

As the fixture plate 344 is being inserted into the recess 370 and the capture channels 388,390, the position keep system, in the form of a biasing system comprising the springs 394,395 in the example shown, functions to exert a biasing force on the fixture mount 344, and particularly the base plate 146. Specifically, as the second end 352 of the base plate 346 of the fixture mount 344 is inserted into the capture channel 390, the second end 352 can be brought into contact with the springs 394,395. Further insertion progression of the fixture mount 344, and particularly the base plate 346, into the capture channel 390 can be carried out by exerting a sufficient force on the fixture mount 344 so as to overcome the biasing or spring force exerted by the springs 394,395. As the biasing or spring force is overcome, the springs 394,395 will compress, sliding within their respective spring bays 397,399, wherein potential energy is stored within the springs 394,395. The minimum amount of insertion of the base plate 346 into the capture channel 390 and the minimum displacement distance of the springs 394,305 will depend upon the configuration of the capture channels 388,390 and the opening 392, such that further insertion of the base plate 346 into the capture channel 390 can cease when the second end 354 of the base plate 346 is able to clear the second rail 386 to allow the fixture mount 344 to be fully seated within the recess 372 with the base plate fully seated against the recess surface 378. With the fixture mount 344 in this position, the position keep system can be caused to release its stored potential energy to exert or apply a magnitude of force on the fixture mount 344 to cause the fixture mount 344 to slide along the recessed surface 378 until the second end 354 of the base plate 346 is inserted into the capture channel 388, with the second end 354 ultimately coming to rest against, and being positioned about, the second end 376 of the recess 372. As can be seen, the recess 372, and the associated capture channels 388,390 are sized and configured to permit a calculated amount of bi-directional translational movement of the fixture mount 344 once it is fully seated about the recess surface 378. With the second end 354 of the base plate 346 engaging the second end 376 of the recess, the fixture mount 344 is retained in a captured position about the mount support base 314 by the retention system 370, with both the first end 352 and the second end 354 retained within the capture channels 390, 388, respectively. The fixture mount 344 can be held in this position by the position keep system, in this example the springs 394,395, wherein the springs 394,395 function to maintain a constant biasing or spring force on the fixture mount 344 that forces the fixture mount 344 against the second side 376 of the recess 372 of the mount support base 314. This constant biasing force is made possible due to the configuration of the retention system 370 where the elastic element, the springs 394,395 in this example, is allowed to only partially expand. In other words, with the fixture mount 344 in a captured position (the first and second ends 352,354 secured within the capture channels 390,388, respectively) the springs 394,395 are at least partially compressed, such that they maintain a constant exerted biasing force on the fixture mount 344, thus holding the fixture mount 344 in place in its proper captured position.

Along with assisting in maintaining a select, desired capture position of the fixture mount 344 relative to the mount support base 314, the position keep system can further function to comprise a sufficient biasing force to prevent the fixture mount 314 from inadvertent or unintended movement within the retention system 370 that would cause or permit the fixture mount 314 to inadvertently release and disengage from the mount support base 314. Stated differently, the biasing or spring force applied to the fixture mount 344 can be of such a sufficient magnitude so as to require a significant amount of force to be applied to the fixture mount 344 against the springs 394,395 to overcome the biasing or spring force. In the present example, springs 394,395 can comprise a spring constant tuned to meet the demands of the intended use of the equipment mounting assembly 310. The particular number of springs, type of spring, and associated spring constant suitable for an intended purpose can be calculated by those skilled in the art. Suffice it to say that any number of springs, any type of spring, and any degree of magnitude desired or needed is contemplated herein. It is noted that even though the capture channels 388,390 and the recess 372 provide limited gaps between them and the fixture mount 344, the position keep system functions to maintain the fixture mount 344 in a static state pressed against the mount support base 314 until movement (e.g., translation and rotation for removal purposes) is desired by the operator.

To release the fixture mount 344 from the mount support base 314, the above-recited steps for insertion and engagement can be reversed.

It is noted that although two springs are shown, this is not intended to be limiting in any way as any number of springs may be used. In addition, although the springs are shown as comprising coil springs, those skilled in the art will recognize that other types of springs or other elastomeric members can be used. It is still further noted that the position keep system could instead comprise elastomeric elements (e.g., springs) implemented about the second end 376 of the recess 372 and the second shoulder 382 to travel or move within the capture channel 388, and that function in a similar manner as discussed above with respect to the springs 394,395. It is still further noted that the position keep system could comprise additional elastomeric elements (e.g., additional springs) implemented about the second end 376 of the recess 372 and the second shoulder 382 in a similar manner and that comprise a similar function as discussed with respect to the springs 394,395. In this case, the fixture mount 344 could be caused to float between the elastomeric elements, which could operate to apply or exert opposing biasing forces on the fixture mount 344. Still further, in another example, the position keep system, including the biasing system, any bays, and any elastic components, could be associated only with the second end 376.

With reference to FIGS. 8A-8I, the equipment mounting assembly 310, and particularly the retention system 370, can further comprise a secondary or clearance recess 365 (FIGS. 8E-8I) formed within the mount support base 314, and specifically the recess 372, about the first end 379 of the recess 372, to at least partially define the capture channel 390. The clearance recess 365 can comprise, or be at least partially defined by, the sidewall 379 that extends down from the first shoulder 380 at the first end 374 of the recess 372. The sidewall can extend downward beyond the recessed surface 378, or rather a plane parallel to and at the recessed surface 378. The clearance recess 365 can further comprise, or can be at least partially defined by, a recess surface 366 that extends away from the sidewall 379 in a direction into the recess 372 (e.g., the recess surface 366 can be orthogonal to the sidewall 379. The clearance recess 365 can still further comprise, or can be at least partially defined by, a sidewall 367 that extends upward and away from the recess surface 366 (e.g., the sidewall 367 can be orthogonal to the recess surface 366). The sidewall 367 can transition or intersect with the recessed surface 378 to form or define an edge of the clearance recess 365, or an edge of the recess 372, or both. As such, the sidewall 367 can form a stepdown from the recessed surface 378 of the recess 372 to the recess surface 366 of the clearance recess 365. The clearance recess 365 can be considered to be a part of the recess 372, and thus can be thought of as a secondary recess in one aspect, or in another aspect, the recess 372 can be considered to comprise a multi-height or multi-level recessed surface. Or, the clearance recess 365 can be considered as a separate structural component and feature of the mount support base 314.

The first and second spring bays 397,399 can be formed in the mount support base 314 in a similar manner as described above, except in this example, they can be formed or located within the clearance recess 365. The spring bays 397,399 can receive and support the first and second springs 394,395, respectively, such that the springs 394,395 extend upward into the clearance recess 365. The height differential between the recessed surface 378 of the recess 372 and the recess surface 366 of the clearance recess 365, or in other words, the depth of the recess surface 366 of the clearance recess 365 as measured from the recessed surface 378 of the recess 372 (i.e., the depth or height of the sidewall 367) can be configured so that the springs 394,395 also extend above the recessed surface 378, wherein they are positioned to be engaged by the fixture mount 344 in a similar manner as discussed above.

The clearance recess 365 further defines, at least in part, an opening 368. The first rail 384 can be secured to the shoulder 380 in a similar manner as discussed above, and can comprise a portion or edge that is configured to extend beyond the shoulder 380 to at least partially define a capture channel 390, also as described above. The overhanging edge of the first rail 384 can further define the opening 368, along with the clearance recess 365. It is through this opening 368 that the first end 352 of the base plate 346 of the fixture mount 344 is received into the capture channel 390.

With the addition of the clearance recess 365, it is noted that the height of the capture channel 388 formed about the second end 376 of the recess 372 can be reduced as compared to the height of the capture channel 388 shown in FIGS. 8A-8D, which reduces the amount of play or travel of the base plate 346 and the fixture mount 344 once in the captured position as the height of the capture channel 388 (i.e., the height of the capture channel 388 as measured between the bottom surface of the second rail 386 and the recessed surface 378) is closer to the height or thickness of the base plate 346 than as depicted in FIGS. 8A-8D. The height of the capture channel 388 shown in FIGS. 8A-8D and discussed above, was required to be the same height as the capture channel 390 also shown in FIGS. 8A-8D, and this height was required to be sufficient to permit insertion of the fixture mount 344 into the recess 372. Although the height of the capture channels 388,390 shown in FIGS. 8A-8D is minimized, they are required to be sufficiently high so as to facilitate insertion of the fixture mount 344 into the recess 372 so that the base plate 346 could be inserted into the capture channels 388,390 and the fixture mount 344 captured by the retention system 370 about the mount support base 314. And, it should also be noted that the height of the capture channels 388,390 shown in FIGS. 8A-8D is the same. Again, with the addition of the clearance recess 365 as shown in FIGS. 8E-8I, the capture channel 388 can comprise a height that is less than the height of the capture channel 390, and that is only slightly less than the height or thickness of the base plate 346 of the fixture mount 344. As such, the height of the capture channel 388 can be different from the height of the capture channel 390, with the clearance recess 365 being sized and configured so as to facilitate insertion of the fixture mount 344 into the recess 372 to be captured by the retention system 370 in a similar manner as described above. Indeed, the width of the clearance recess 365, the depth of the clearance recess 365 as measured from the recessed surface 378 of the recess 372, the size of the opening 368 formed between the first rail 384 and the edge of the clearance recess 365 where the recessed surface 378 and the sidewall 367 intersect, the dimensions of the fixture mount 344, the size of the opening 392 spanning between the overhanging edges of the first and second rails 386,388, etc. can be calculated and configured to facilitate insertion of the fixture mount 344 into the retention system 370 to be releasably coupled to the mount support base 314, as taught herein.

In operation, as the first end 352 of the base plate 346 is initially inserted through the opening 368 into the capture channel 390 (see FIGS. 8F and 8G), the clearance recess 365, being below the recess 372, permits the first end 352 to be further inserted (e.g., slid) into the capture channel 390 a sufficient distance, such that the second end 354 of the base plate 346 clears the second rail 386 prior to the first end 352 of the base plate getting bound between the first rail 384 and the recess surface 366 of the clearance recess 365, or the recessed surface 378 of the recess 372, or both. As discussed above, once the second end 354 of the base support 346 of the fixture mount 344 clears the second rail 386, the fixture mount 344 can be received into the recess 372, and the base plate 346 seated against the recessed surface 378. Once in this position, the fixture mount 344 can be slid into its final captured position with the first and second ends 352 and 354 retained within respective capture channels 388,390 (see FIGS. 8H and 8I). The position keep system shown in FIGS. 8E-8I, although located within the clearance recess 365, can function similarly as discussed above to exert a biasing force on the fixture mount 344. In the captured position, the base plate 346 of the fixture mount 344 is supported about the recessed surface 378, and also extends over the edge defined by the intersection of the recessed surface 378 and the sidewall 367 and into the clearance recess 365, where the clearance recess 365, and particularly the recess surface 366, along with the sidewall 379 and the first rail 384 define the capture channel 390. In the example shown, the clearance recess 365 comprises a length that is a little more than one quarter of the length of the recessed surface 378. As such, the fixture plate 344, once captured within the retention system 370, is prevented from rotating about the same lateral axis that it was rotated about while being inserted into the retention system 370 (i.e., the fixture mount 344 is prevented from rocking).

In one aspect, the clearance recess 365 can be configured, such that the second end 354 of the base plate 346 of the fixture mount 344 clears the second rail 386 just prior to the first end 352 of the base plate 346 of the fixture mount 344 getting bound. By doing this, the height of the capture channel 388 can be minimized, and can be as close to the height of the base plate 346 as possible. Moreover, this allows the length of the recessed surface 378 of the recess 372 to be maximized as this is still the surface that receives and supports the fixture mount 344 once in its captured position within the retention system 370. As can be seen, the clearance recess 365 facilitates the positioning of the base plate 346 of the fixture mount 344 within the capture channels 388,390, with the upper surface 348 of the base plate 346 being just slightly below or offset from the first and second rails 384,386, as compared to the position of the base plate 346 relative to the first and second rails 384,386 shown in FIGS. 8A-8D. As a result, movement of the fixture mount 314 relative to the mount support base 314 is reduced over the design shown in FIGS. 8A-8D due to the tighter tolerances that exist between the mount support base 314 and the fixture mount 344 in the example shown in FIGS. 8E-8I.

With reference to FIGS. 9A-9F, illustrated is an equipment mounting assembly 410 in accordance with an example of the present disclosure. The equipment mounting assembly 410 is similar in many respects to the equipment mounting assemblies 110, 210 and 310 of FIGS. 1A-8I. As such, it is intended that the above description of equipment mounting assemblies 110, 210 and 310 be referred to for an understanding and disclosure of like or similar elements and like or similar configurations and functions as pertaining to equipment mounting assembly 410. Those skilled in the art will recognize the like or similar elements and functions of the equipment mounting assembly 410, and can refer to the discussion of FIGS. 1A-8I for support of these, where applicable. Therefore, in addition to the discussion below, the above-discussion as pertaining to FIGS. 1A-8I is intended to provide support for the equipment mounting assembly 410, and any claims directed thereto, for like or similar elements, configurations and functions of such. Differences between equipment mounting assembly 410 and equipment mounting assemblies 110, 210 and/or 310 will be apparent from the discussion below.

The equipment mounting assembly 410 can comprise a mount support base 414 having an upper surface 416 and a perimeter or perimeter edge 418 defining any type of shape or configuration. In the example shown, the mount support base 414 can comprise a perimeter having a rectangular shape defining a first end 420, a second end 422, and first and second sides 424,426. As will be apparent to those skilled in the art, other types of mount support bases, such as those having different sizes, shapes and/or configurations, are contemplated for use with the present technology, as discussed above. For example, the mount support base 414 can comprise a perimeter having a round or circular shape, or any other shape. The mount support base 414 can also comprise different thicknesses or heights.

The equipment mounting assembly 410 can further comprise one or more fixture mounts operable and usable with the mount support base to make or form an equipment mounting system. The one or more fixture mounts can comprise a base plate and a fixture coupling extending from and supported by the base plate, wherein the fixture coupling comprises a mounting terminus defining and comprising a coupling interface operable to engage and releasably couple a piece of equipment or a fixture of some type, such as a production fixture (not shown, but see production fixture of FIG. 1 in the form of a light fixture). In the example shown, the equipment mounting assembly can comprise a first fixture mount 444a, which can be releasably secured or releasably mounted (these meaning that the fixture mount is not fastened to the mount support base, but secured thereto using a quick release type of system, such as the retention system discussed herein) to the mount support base 414. In one aspect, the first fixture mount 444a can be in the form of a pin plate, such as a baby plate, as is known, or any other type of pin plate, or plate-based fixture mount (e.g., the first fixture mount 444a could also be a receiver plate). The first fixture mount 444a can comprise a plate portion or base plate 446a having an upper surface 448a and a perimeter 450a defining any type of shape or configuration, such as rounded rectangular, as shown. The base plate 446a can comprise first and second ends 452a,454a, and first and second sides 456a, 458a. Extending upward from the upper surface 448a of the base plate 446a, the first fixture mount 444a can further comprise a fixture coupling or fixture coupling component in the form of a pin 460a having a shaft 462a. The pin 460a can comprise a mounting terminus 464a formed about a distal end of the shaft 462a, the distal end comprising that end of the pin 460a that terminates in space (the end of the pin 460a not secured to the base plate 446a, but located furthest from the base plate 446a). In the example shown, the first fixture mount 444a comprises a mounting terminus 464a of one type having a male-type coupling interface configured to engage and releasably couple a fixture coupling or a coupling component (e.g., a receiver) of the production fixture having a female-type coupling interface operable to engage and interface with and couple to the pin 460a of the fixture mount 444a, thereby securing the fixture to the mount support base 414 via the fixture mount 444a. The first fixture mount 444a can be made of any material suitable for supporting a fixture or other equipment, and for being secured to the mount support base 414a, such as metal, carbon fiber, and others. As will be apparent to those skilled in the art, other types of fixture mounts are contemplated for use with the present technology, as discussed herein.

The equipment mounting assembly 410 can further comprise a second fixture mount 444b operable to be releasably secured to the mount support base 414. In one aspect, the second fixture mount 444b can comprise the same type of mount as the first fixture mount 444a. In another aspect, the second fixture mount 444b can be different from the first fixture mount 444a in one or more ways, such as a different type of fixture mount, a different size fixture mount, or a combination of these. In the example shown, the second fixture mount 444b comprises a different type of fixture mount than that of the first fixture mount 444a. In addition, the base plate 446b of the second fixture mount 444b is smaller in size (e.g., smaller in width, in length, in thickness or any combination of these) than the base plate 446a of the first fixture mount 444a. The second fixture mount 444b can comprise a plate portion or base plate 446b having an upper surface 448b and a perimeter 450b defining any type of shape or configuration, such as rounded rectangular, as shown. The base plate 446b can comprise first and second ends 452b,454b, and first and second sides 456b, 458b. Extending upward from the upper surface 448b of the base plate 446b, the second fixture mount 444b can further comprise a pin 460b having a shaft 462b. The pin 460b can comprise a mounting terminus 464b formed about a distal end of the shaft 462b, the distal end comprising that end of the pin 460b that terminates in space (the end of the pin not secured to the base plate 446b, but located furthest from the base plate 446b). The mounting terminus 464b can comprise and define a coupling interface operable to engage and releasably couple a piece of equipment or a fixture of some type, such as a production fixture (not shown, but see production fixture of FIG. 1 in the form of a light fixture). In the example shown, the second fixture mount 444b comprises a mounting terminus 464b having a female-type coupling interface configured to engage and releasably couple a coupling component (e.g., a pin) of the production fixture having a male-type coupling interface. The second fixture mount 444b can be made of any material suitable for supporting production equipment, and for being secured to the mount support base 414b, such as metal, carbon fiber, and others. As will be apparent to those skilled in the art, other types of fixture mounts are contemplated for use with the present technology, as discussed herein.

The equipment mounting assembly 410 can further comprise a fixture mount retention system or more simply a retention system 470 supported by and operable with the mount support base 414. The combination of the mount support base 414 in support of the retention system 470 can be referred to herein as an equipment mounting system, which system can be operable with a fixture mount to provide a complete equipment mounting assembly. The retention system 470 can be operable to releasably secure the first fixture mount 444a or the second fixture mount 444b, or both, and any associated piece or pieces of equipment or fixture or fixtures coupled thereto, respectively, to the mount support base 414 for the purpose of providing a support, stand, platform, etc. for the piece(s) of equipment or fixture(s). As discussed above with respect to FIG. 1, the retention system 470 can be configured to accomplish this without requiring the use of fasteners, such as screws or nails, through the first or second fixture mounts 444a, 444b (although standard fixture mounts can be used, including those having holes formed therein designed for receiving a fastener). For example, as shown, the retention system 470 can comprise a first recess 472a formed in the upper surface 416 of the mount support base 414, and a second recess 472b, also formed in the upper surface 416 of the mount support base 414, each extending into the mount support base 414, such that the first and second recesses 472a and 472b each comprise a depth that can be the same or different. Specifically, the first recess 472a can comprise a recessed surface 478a located at a recess depth $H_8$ having a depth at least as deep as a thickness $H_9$ of the base plate 446a of the first fixture mount 444a. In the example shown, the recess depth $H_8$ of the first recess 472a is greater than the thickness $H_9$ of the base plate 446a of the first fixture mount 444a, such that the upper surface 448a of the base plate 446a of the first fixture mount 444a is below the upper surface 416 of the mount support base 414 upon the first fixture mount 444a being received within the retention system 470, and seated within the first recess 472a against or onto the recessed surface 478a. The first recess 472a can be sized and configured to receive the first fixture mount 444a therein, and specifically the base plate 446a of the first fixture mount 444a. For example, as shown, the first recess 472a can comprise an elongated, rectangular configuration having or defining a first end 474a opposite a second end 476a, and a first side 475a opposite a second side 477a, these being sized and configured so as to define a recessed area sufficiently sized to receive therein the base plate 446a of the first fixture mount 444a, wherein the first fixture mount 444a is caused or permitted to be seated about and against or onto the recess surface 478a. The first recess 472a can be sized with a width W7 that is wider than the width W8 of the base plate 446a of the first fixture mount 444a, thus permitting the first fixture mount 444 to fit laterally between the sidewalls of the first recess 472a without binding. Likewise, the first recess 472a can comprise a length L4 greater than the length $L_5$ of the base plate 446a of the first fixture mount 444a, thus permitting the first fixture mount 444a to fit lengthwise between the first and second ends 474a,476a of the first recess 472a.

Similarly, the second recess 472b can comprise a recessed surface 478b located at a recess depth $H_{10}$ having a depth at least as deep as a thickness $H_{11}$ of the base plate 446b of the first fixture mount 444b. In the example shown, the recess depth $H_{10}$ of the second recess 472b is greater than the thickness $H_{11}$ of the base plate 446b of the second fixture mount 444b, such that the upper surface 448b of the base plate 446b of the second fixture mount 444b is below the upper surface 416 of the mount support base 414 upon the second fixture mount 444b being received within the retention system 470, and seated within the second recess 472b against or onto the recessed surface 478b. The second recess 472b can be sized and configured to receive the first second mount 444b therein, and specifically the base plate 446b of the second fixture mount 444b. For example, as shown, the second recess 472b can comprise an elongated, rectangular configuration having or defining a first end 474b opposite a second end 476b, and a first side 475b opposite a second side 477b, these being sized and configured so as to define a recessed area sufficiently sized to receive therein the base plate 446b of the second fixture mount 444b, wherein the second fixture mount 444b is caused or permitted to be seated about and against or onto the recess surface 478b. The second recess 472b can be sized with a width $W_9$ that is wider than the width $W_{10}$ of the base plate 446b of the second fixture mount 444b, thus permitting the second fixture mount 444b to fit laterally between the sidewalls of the second recess 472b without binding. Likewise, the second recess 472b can comprise a length L6 greater than the length L7 of the base plate 446b of the second fixture mount 444b, thus permitting the second fixture mount 444b to fit lengthwise between the first and second ends 474b, 476b of the second recess 472b.

No matter the shape, size and/or configuration of the respective base plates of the first and second fixture mounts 444a and 444b, the first and second recesses 472a and 472b, respectively, can be formed so as to correspond in shape, size and/or configuration to receive the respective base plates of the first and second fixture mounts 444a and 444b therein. This will generally entail the first and second recesses 472a and 472b being at least slightly larger in size than the respective base plates of the first and second fixture mounts 444a and 444b, such that the first and second fixture mounts 444a and 444b can be inserted into and removed from the first and second recesses 472a and 472b, respectively, as intended.

In this example, the first and second recesses 472a, 472b can be formed adjacent one another (e.g., be positioned in a side by side position relative to one another), and can, as a pair, be formed at any location within the mount support base 414. The first and second recesses 472a, 472b can comprise a length less than the length of the mount support base 414. In another example, the first and second recesses 472a and 472b can be formed in the mount support base 414 altogether separate from one another.

Furthermore, one or both of first and second recesses 472a, 472b can be sized and configured to receive different fixture mounts having base plates of different sizes. In other words, and for example, one or both of the first and second recesses 472a and 472b can be sized and configured to receive a first fixture mount having a base plate of a first size, and a second fixture mount having a base plate of a second size different from the first size). For instance, the first recess 472a can be sized and configured to receive different fixture mounts having different sized base plates, with the second recess 472b being sized and configured only to receive fixture mounts having base plates of the same size. Likewise, in another example, the first recess 472a can be sized and configured only to receive fixture mounts having base plates of the same size, with the second recess 472b being sized and configured to receive different fixture mounts having different sized base plates. In still another example, both or each of the first and second recesses 472a and 472b can be sized and configured to receive different fixture mounts having different sized base plates. In the example shown, each of the first and second recesses 472a and 472b are sized and configured to receive fixture mounts having base plates of at least two different sizes. This is discussed in greater detail below.

The retention system 470 can further comprise first, second and third rails 484,485, 486 coupled or otherwise joined to the mount support base 414. The first rail 484 can be joined or coupled to the mount support base 414 in a position and orientation about the first recess 472a, so as to at least partially define and form capture channel 488 within the first recess 472a. The second rail 485 can be joined or coupled to the mount support base 414 in a position and orientation about the second recess 472b, so as to at least partially define and form capture channel 489 within the second recess 472b. The third rail 486 (which can also be referred to as a central or common rail) can be sized and configured, such that it can be joined or coupled to the mount support base 414 about, and such that it is operable with, both the first and second recesses 472a, 472b, so as to at least partially define and form inner or center capture channels 490 and 491, with capture channel 490 being within the first recess 472a opposite (i.e., at an opposing side of) the end or outer capture channel 488, and with inner or center capture channel 491 being within the second recess 472b opposite (i.e., at an opposing side of) the end or outer capture channel 489. As such, the third rail 486 comprises a rail common to a plurality of recesses (first and second recesses 472a and 472b in the example shown), and that is operable to capture and secure a plurality of fixture mounts within their respective recesses as the third rail 486 defines, at least in part, a plurality of respective capture channels. Moreover, the first and third rails 484, 486 are configured to extend into the first recesses 472a in a direction toward one another, and to at least partially define an access opening 492 in communication with the capture channels 488,490. Similarly, the second and third rails 485, 486 are configured to extend into the second recess 472b in a direction toward one another, and to at least partially define an access opening 493 in communication with the capture channels 489, 491. For example, as shown, the first rail 484 can be mounted to the mount support base 414 along at least part of (or all of) the length of the first recess 472a about or on the first side 475a with one side or edge protruding into the first recess 472a. The second rail 485 can be mounted to the mount support base 414 along at least part of (or all of) the length of the second recess 472b about or on the second side 477b with one side or edge protruding into the second recess 472b. The third rail 486 can be mounted to the mount support base 414 between the first and second recesses 472a, 472b, with one side or edge protruding into the first recess 472a and an opposing or other side or edge protruding into the second recess 472b. Each of the first, second and third rails 484, 485, and 486 can be oriented to extend in a lengthwise direction relative to the first and second recesses 472a, 472b (e.g., parallel to the first and second sides 424,426 of the mount support base 414). Those skilled in the art will recognize that the first, second and third rails 484, 485, 486 could alternatively be mounted along the width of the first and second recesses 472a, 472b, parallel to the ends 474a, 474b, 476a, 476b, respectively, of the recesses 472a, 472b, and the configuration of the retention system 470 altered to accommodate this. The first and second recesses 472a, 472b can be configured to extend beyond the rails a sufficient distance to permit the access openings 492, 493, respectively, to receive the first and second fixture mounts 444a, 444b (e.g., see FIGS. 9D and 9E). In another example, the first, second and third rails 484,485,486 can each comprise a plurality of smaller length rails that do not extend a full length of the recesses, respectively. Or, each capture channel can be defined at least in part by a plurality of individual smaller rails along the length of the recess.

The first, second and third rails 484,485, 486 can be mounted to the mount support base 414 in a number of different ways and positions. In one aspect, the mount support base 414 can further comprise first and second shoulders 480, 482 formed in its upper surface 416. The first shoulder 480 can be adjacent or juxtaposed with the first recess 472a, and the second shoulder 482 can be adjacent or juxtaposed with the second recess 472b, these being sized and configured to receive and support (have seated thereon) at least a portion of the first and second rails 484, 485, respectively, wherein the first and second rails 484, 485 can be mounted to the mount support base 414 about the respective first and second shoulders 480, 482. More specifically, the first shoulder 480 can intersect the wall of the first recess 472a defining the side 475a. The second shoulder 482 can intersect the wall of the second recess 472b defining the side 477b. In addition, the first and second shoulders 480, 482 can comprise a width $W_{11}$ that is less than a width $W_{12}$ of the first and second rails 484, 485, respectively, thus facilitating the proper positioning of the rails 484, 485 relative to the first and second recesses 472a and 472b, respectively, and thus facilitating at least a portion of the rails 484, 485 to be able to extend into the first and second recesses 472a, 472b, respectively, to help define the capture channels 488 and 489, respectively.

The mount support base 414 can further comprise an intermediate landing 481 having an upper surface 483 operable and configured to receive and to have seated thereon the third rail 486. The upper surface 483 of the intermediate landing 481 can comprise or be positioned at the same depth from the surface 416 of the mount support base 414 as both the first and second shoulders 480,482, thus positioning these in the same plane relative to one another. The intermediate landing 481, and specifically the upper surface 483, can be adjacent or juxtaposed with the first recess 472a on one side, and the second recess 472b on the other side. The upper surface 483 can intersect the wall of the first recess 472a defining the side 477a, and the upper surface 483 can also intersect the wall of the second recess 472b defining the side 475b. Stated differently, the intermediate landing 481 can make up or define at least some of the walls of the first and second recesses 472a, 472b at the sides 477a and 475b. As shown, the intermediate landing 481 is segmented into three different segments (see first, second and third segments 479a, 479b, and 479c, respectively), these being separated from one another by slots or channels, which lead to, or which are in communication with, first and second spring bays 497 and 499, which are discussed in greater detail below. The intermediate landing 481 comprises a width that is less than a width of the intermediate third rail 486, such that when the third rail 486 is mounted to the upper surface 483 of the intermediate landing 481, one edge of the third rail 486 extends away from the intermediate landing 481 into the first recess 472a and a second edge of the third rail 486 extends away from the landing into the second recess 472b, thus at least partially forming or defining the capture channels 490 and 491, respectively. Indeed, in each case, the first, second and third rails 484, 485, and 486 can be mounted to the mount support base 414, such that a portion of each of the first, second and third rails 484, 485, and 486 extends beyond an edge of the recess it is associated with (both recesses 472a,472b in the case of the third rail 486), or in other words, such that a respective side or edge of each of the first, second and third rails 484, 485, 486 overhangs an edge of and extends into one of the recesses 472a, 472b (again, both recesses 472a,472b in the case of the third rail 486). The extended portion of the first rail 484 and at least one surface of the first recess 472a (e.g., a wall, the recess surface, both of these) can define, at least in part, the capture channel 488. Likewise, the extended portion of the second rail 485 and at least one surface of the second recess 472b (e.g., a wall, the recess surface, both of these) can define, at least in part, the capture channel 489. Likewise, the extended portion of the third rail 486 into the first recess 472a and at least one of the surfaces of the first recess 472a can define, at least in part, the capture channel 490, and the extended portion of the third rail 486 into the second recess 472b and at least one of the surfaces of the second recess 42b can define, at least in part, the capture channel 491.

Again, it is not intended to be limiting in any way that the retention system 470 comprise first and second recesses 472a and 472b that share a common rail, namely third rail 486. Indeed, those skilled in the art will recognize, and it is contemplated herein, that the first and second recesses 472a,472b can be separate from one another, such that they each comprise their own rails. Stated another way, the third rail 486 could be two separate rails, one operable with the first recess 472a, and the other operable with the second recess 472b, the first and second recesses 472a,472b being located anywhere about the mount support base 414. For example, FIGS. 8A-8I illustrate a retention system 370 having a single recess formed in the mount support base 314. The retention system 370 could comprise a second, similarly configured recess formed at another location on the mount support base 314, and this could illustrate the concept contemplated and discussed above regarding the retention system 470 comprising first and second recesses that do not share one or more common components, but that are separate from one another, but each configured in a way so as to function as first and second recesses 472a,472b.

First and third rails 484, 486 can be spaced apart from one another a distance $D_{rail1,rail3}$ that defines a distance between them (between the respective edges extending beyond the edges of and into the first recess 472a) that is less than a width W of the base plate 446 of the first fixture mount 444a, such that the first fixture mount 444a cannot be removed from the capture channels 488, 490 simply by lifting up on the first fixture mount 444a (e.g., along a normal axis relative to the upper surface 416 of the mount support base 414) once inserted into and retained in the retention system 470. Likewise, the second and third rails 485, 486 can be spaced apart from one another a distance $D_{rail2,rail3}$ that defines a distance between them (between the respective edges extending beyond the edges of and into the second recess 472a) that is less than a width W of the base plate 446 of the second fixture mount 444b, such that the second fixture mount 444b cannot be removed from the capture channels 489, 491 simply by lifting up on the second fixture mount 444b.

Figure 9A:
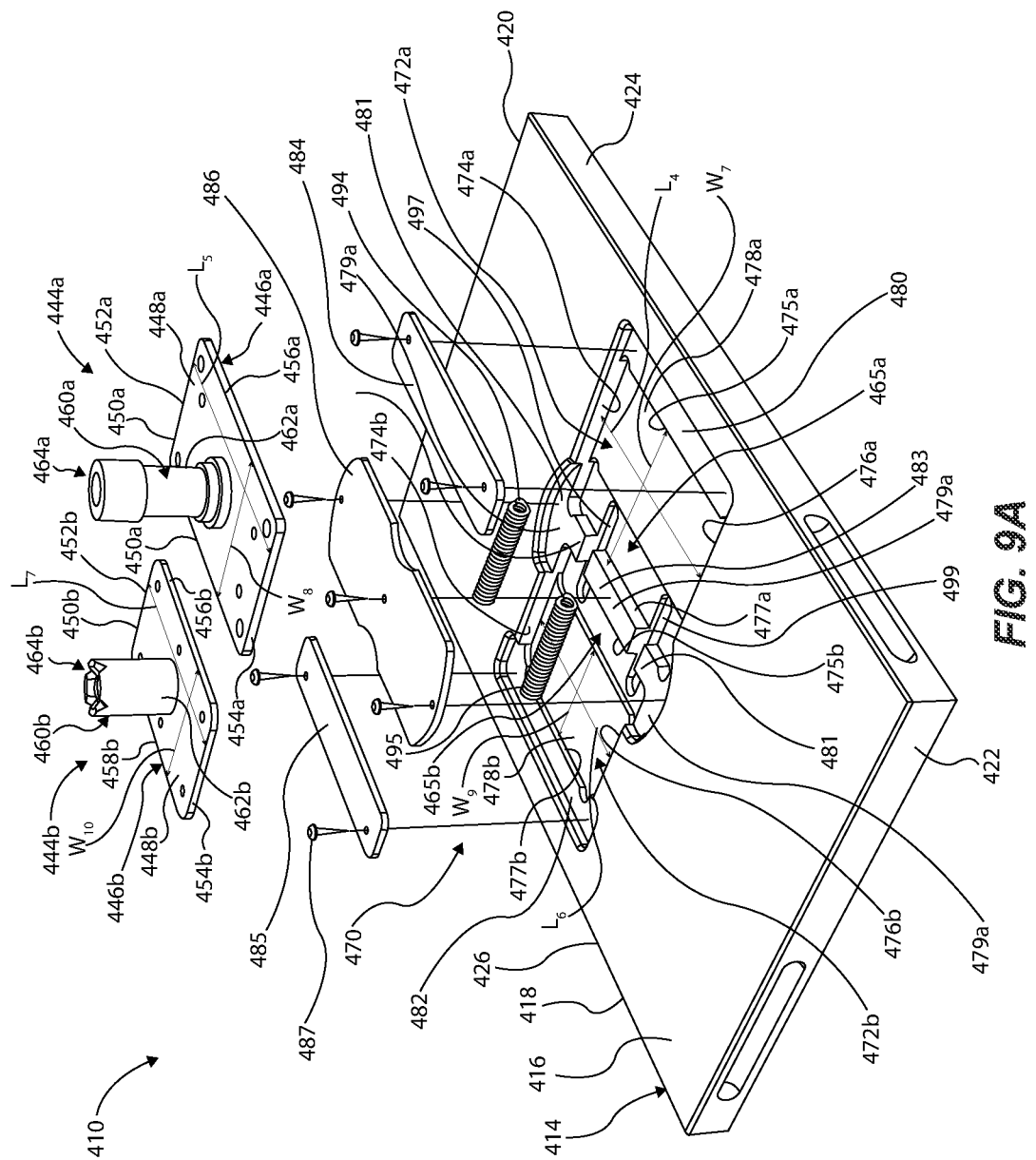
FIG. 9A illustrates an exploded isometric view of an equipment mounting assembly in accordance with another example of the present disclosure.
Figure 9D:
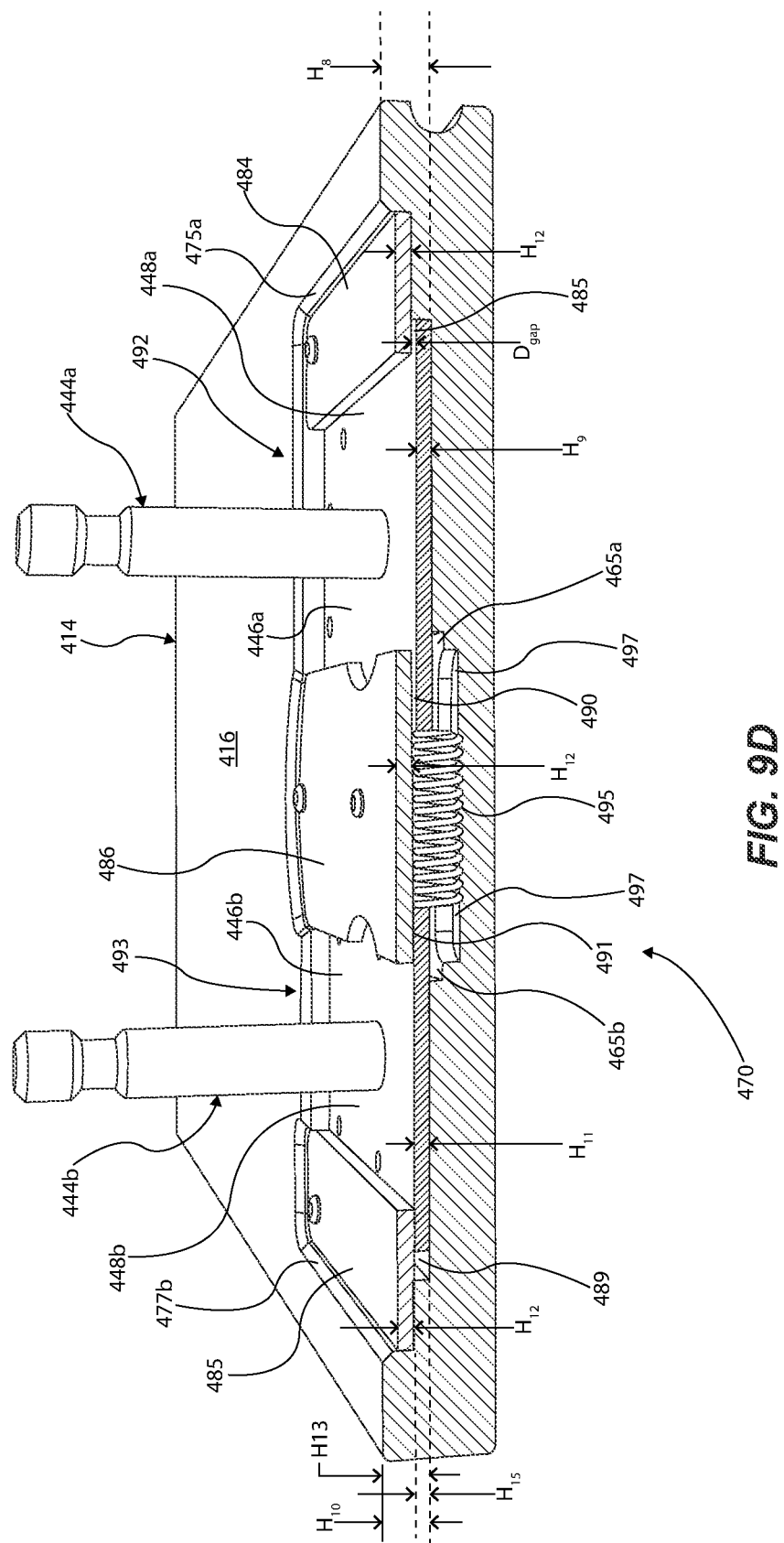
FIG. 9D illustrates a cross-sectional front isometric view of the equipment mounting assembly of FIG. 9A, taken along lines A2-A2 in FIG. 9C.
Figure 9E:
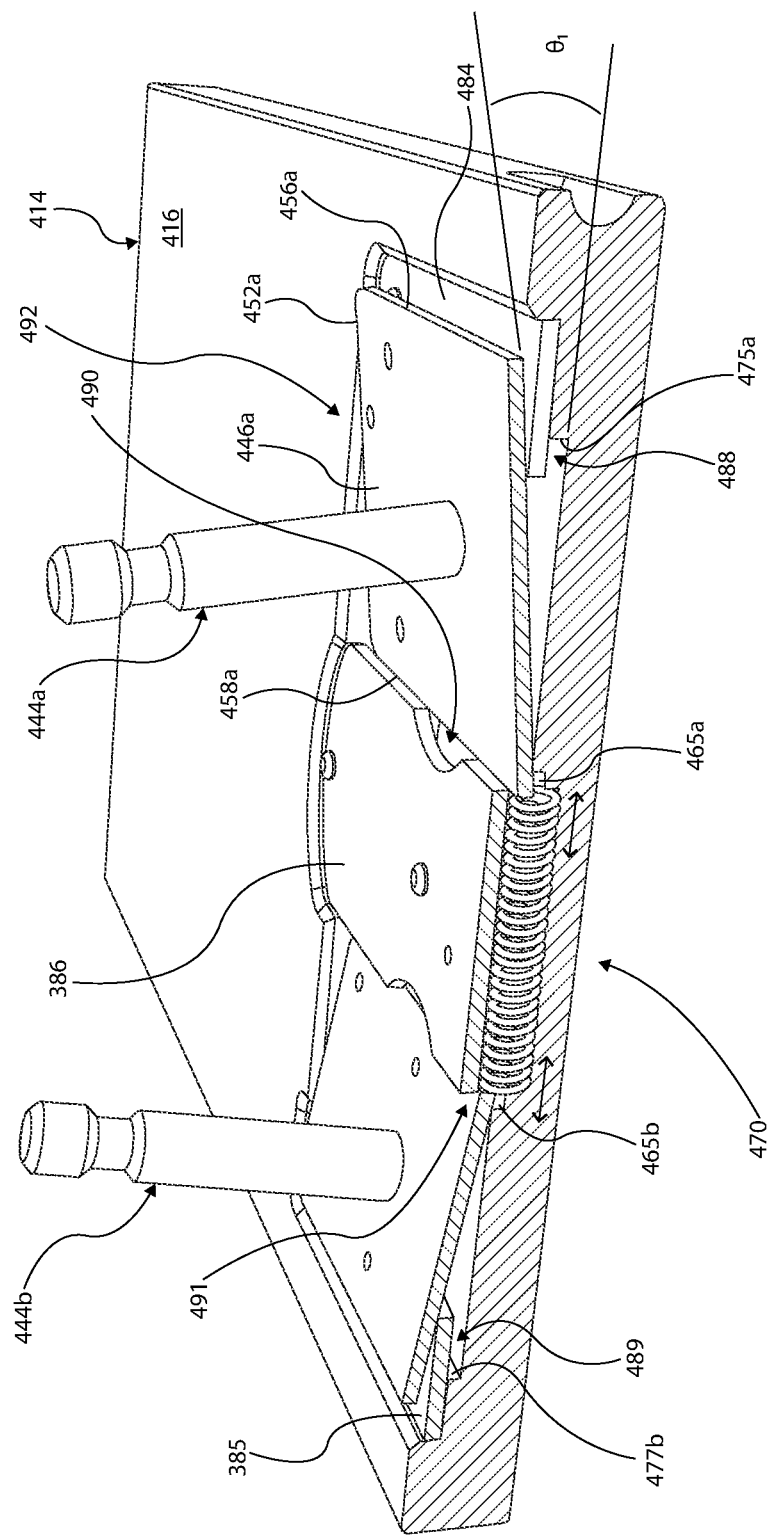
FIG. 9E illustrates a cross-sectional isometric view of the equipment mounting assembly of FIG. 9A, taken along lines A2-A2 in FIG. 9C.
Figure 9F:
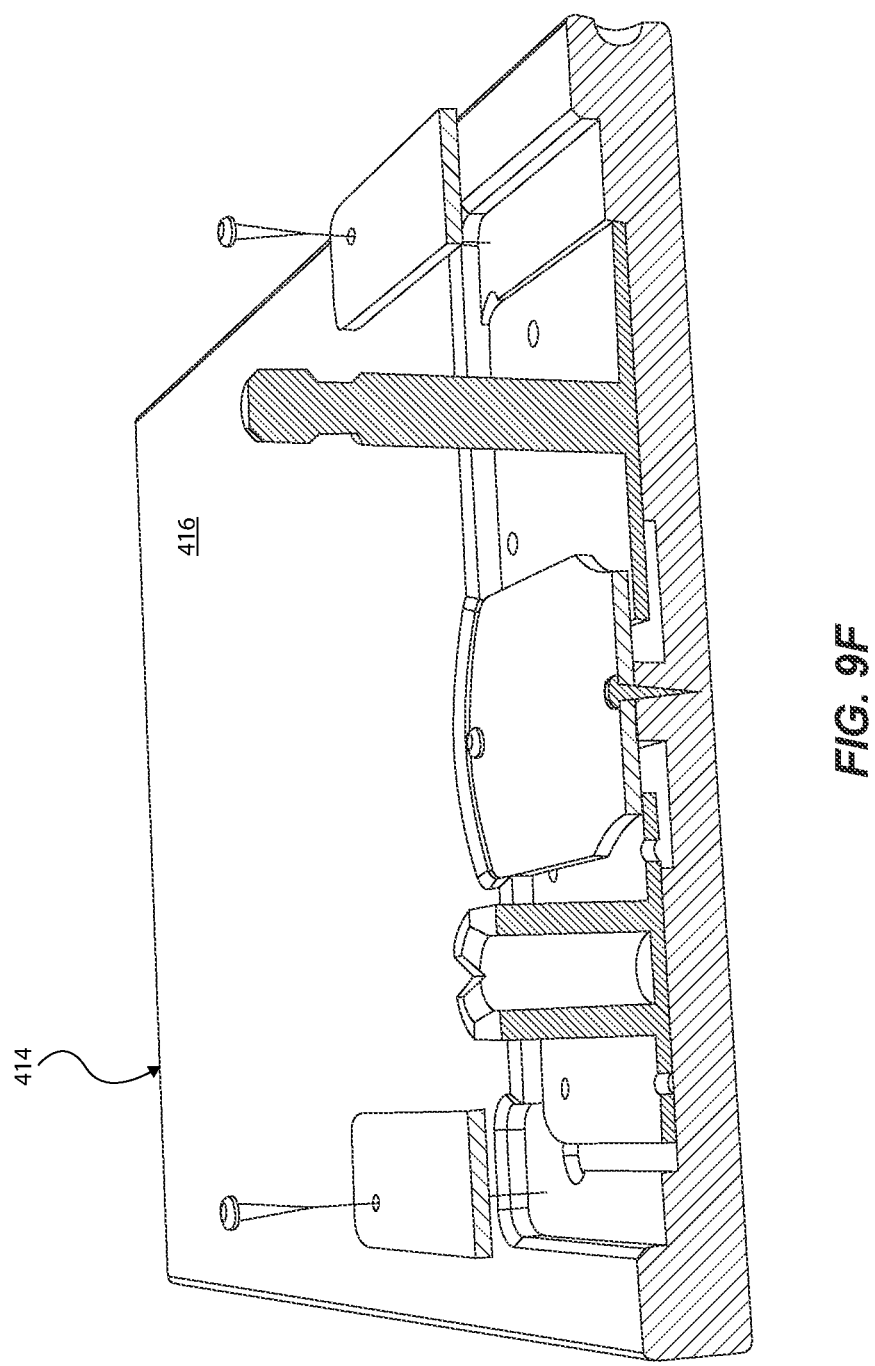
FIG. 9F illustrates a cross-sectional isometric view of the equipment mounting assembly of FIG. 9A, taken along lines A1-A1 in FIG. 9C.
Figure 9G:
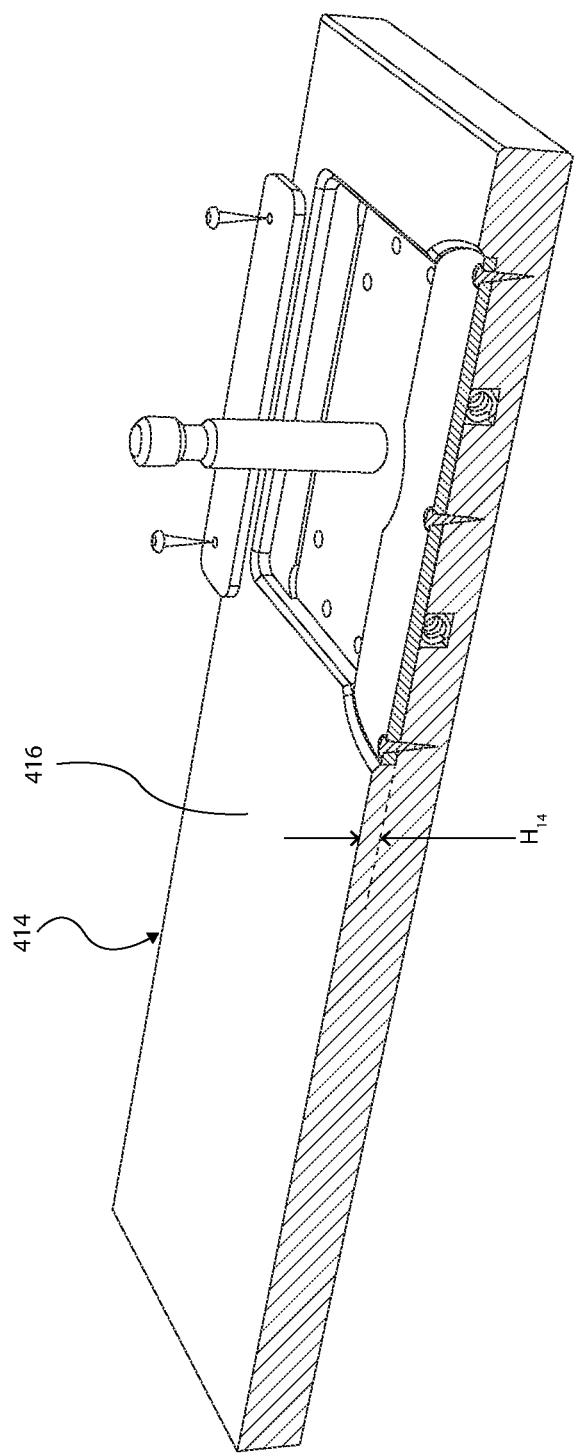
FIG. 9G illustrates a cross-sectional isometric view of the equipment mounting assembly of FIG. 9A, taken along lines B-B in FIG. 9C.

Furthermore, the first, second and third rails 484, 485, 486 can be mounted in an elevated position relative to the first and second recess surfaces 478a and 478b, respectively, and can comprise a thickness or height $H_{rails}$ that can be the same or different from one another (e.g., see $H_{12}$ in FIG. 9D, this being the same for each of the first, second, and third rails 484, 485, and 486, respectively). The shoulders 480, 482 can comprise a depth or height $H_{13}$, and the landing 481 can comprise a depth or height $H_{14}$, which can be the same or different. In the example shown, the depth or height of the shoulders and the landing 481 are the same (see $H_{13}$ in FIG. 9D and $H_{14}$ in FIG. 9G). The depth or height $H_{13}$ of the shoulders 480, 482, and the depth or height $H_{14}$ of the landing 481, as measured from the upper surface 416 of the mount support base 414, can be greater than the thickness or height $H_{12}$ of the first, second and third rails 484, 485, 486. This differential can be configured to facilitate support of the rails 484, 485, 486 below the upper surface 416 of the mount support base 414. More specifically, the shoulders 480,482 and the landing 481 can be formed and configured to comprise a sufficient depth as measured from the upper surface 416 of the mount support base 414, such that an uppermost surface of each of the rails 484, 485, 486 is located below the upper surface 416 of the mount support base 414 when the first, second and third rails 484, 485, 486 are installed and secured within the retention system 470 to the mount support base 414 about the shoulders 480, 482, and the landing 481, respectively. The distance between the upper surface 416 of the mount support base 414 and the uppermost surface of the first, second and third rails 484, 486 can be calculated or configured to be any distance, and in some examples, the countersunk distance of the first, second and third rails 484, 486 from the upper surface 416 can be configured to facilitate an uppermost surface of the first, second and third rails 484, 486, or alternatively the first, second and third rails 484, 486 and any fasteners 487 used to secure the rails to the mount support base 414, to be flush with or below the upper surface 416 of the mount support base 414 so that they do not protrude up beyond the upper surface 416 of the mount support base 414. This provides several advantages, including eliminating the need or desire to countersink the fasteners 487 in the first, second and third rails 484, 485, 486 as is done with respect to the equipment mounting assemblies 110 and 210 discussed above, which can save on manufacturing costs as compared to those examples in which the fasteners are countersunk into the rails.

The depth $H_8$ of the first recess 472a relative to the upper surface 416 of the support mount base 414 minus the depth or height $H_{13}$ of the shoulder 480 and height $H_{14}$ of the landing 481 (assuming these are the same) relative to the upper surface 416 of the support mount base 414 can equal the height of the capture channels 488, 490 (i.e., $H_{10}-H_{13}=H_{15}$). In some examples, the height or depth of the shoulder 480 can be zero [units] (e.g., inches or millimeters), or in other words at the same height or on the same plane as the upper surface 416 of the mount support base 414 (e.g., in another example where the rails are configured to be mounted or otherwise secured to the upper surface 416, and to at least partially define respective capture channels between the rails and the upper surface 416). However, in other examples, the height or depth of the shoulder 480 will comprise some distance or dimension greater than zero. The height $H_{15}$ of the capture channels 488, 490 can be coordinated, such that the capture channels 488,490 are sufficiently sized to receive and capture a portion of the base plate 446 of the first fixture mount 444a. For example, stated one way, the capture channels 488, 490 can be formed to comprise a height $H_{15}$ that is the same or less than that of the depth or height $H_{10}$ of the first recess 472a as measured from the upper surface 416 of the mount support base 414. Stated another way, the capture channels 488, 490 can be formed to comprise a height $H_{15}$ that is the same as the different between the depth or height $H_{10}$ of the first recess 472a and that of the depth or height $H_{13}$ of the shoulder 489 as measured from the upper surface 416 of the mount support base 414. In one aspect, the capture channels 488, 490 can be formed to comprise a height $H_{15}$ that is just slightly greater than the thickness or height $H_{11}$ of the base plate 446 of the first fixture mount 444a. In another aspect, the capture channels 488, 490 can be formed to comprise a height $H_{15}$ between 1 and 2 times the thickness or height $H_{11}$ of the base plate 446 of the first fixture mount 444. In still other aspects, this height can be even greater than twice the height $H_{11}$ of the base plate 446. Of course, these are only example relative sizes, and as such, are not to be limiting in any way. Based on the foregoing, a gap distance $D_{gap}$ between the upper surface 448a of the base plate 446a of the first fixture mount 444a and the bottom surface of the first and third rails 484, 486 (with the first fixture mount 444a secured within the retention system 470) can be calculated in accordance with the following: the height of one or each of the first and second capture channels 488, 490 $H_{15}$ minus the height or thickness $H_9$ of the base plate 446 of the first fixture mount 444a (i.e., $H_{15}-H_9=D_{gap}$). The gap distance $D_{gap}$ can define the amount or distance of travel or play that exists between the first fixture mount 444a and the first and third rails 484, 486 along an axis normal to the recess surface 478a. The same applies to the second recess 472b, and the second and third rails 485, 486.

The first, second and third rails 484, 485, 486 can be coupled or otherwise mounted or joined to the mount support base 414 using permanent or non-permanent types of fasteners (e.g., nails, screws, nuts/bolts, welds, and any others or combination of these). In another example, the first, second and third rails 484, 485, 486 can be coupled or otherwise mounted or joined to the mount support base 414 using, adhesives or any other joining means known by those skilled in the art. The type of joining means used can depend on the type of material making up the mount support base and the rails, or other factors. In the example shown, the first, second and third rails 484, 485, 486 are mounted using screws 487 inserted through apertures formed in the first, second and third rails 484, 485, 486 and driven into the mount support base 414, which can be made of wood, a polymer, a metal, a composite, or any other material or combination of materials.

In an alternative example, and as will be apparent to those skilled in the art, the first, second and third rails 484, 485, 486 can be formed from the material making up the mount support base 414. For example, in the case of a mount support base comprising an apple box made of wood, the recess and the rails can be formed by removing the necessary material (e.g., by routing, milling, etc.) to form these within the wood structure of the apple box. As such, it is contemplated that some equipment mounting assemblies can comprise rails that are integrally formed into the mount support base without requiring additional hardware elements, or fasteners, or both. In still other examples, an equipment mounting assembly could comprise both integrated components and separately attachable components.

The retention system 470 can be configured to support a production fixture, as discussed herein. That being said, the equipment mounting assembly 410 can be configured to withstand the various forces and moments that may result from coupling a production fixture to the equipment mounting assembly 410, as discussed herein.

The retention system 470 can further comprise a position keep system, or more descriptively, a fixture mount position keep system, operable to assist in controlling and maintaining a position of the first and second fixture mounts 444a and 444b, and to further secure the first and second fixture mounts 444a and 444b, once captured by and secured within the retention system 470. The position keep system can employ a variety of devices, systems, mechanisms, etc. for accomplishing this. Various examples are discussed herein, and shown in the drawings. In one example, the position keep system can comprise a biasing system operable to provide a sufficient biasing force between the first and second fixture mounts 444a, 444b and the mount support base 414, such that movement between the first and second fixture mounts 444a, 444b (as captured within the retention system 470) and the mount support base 414 is hindered or resisted, and therefore restricted to some degree. In one aspect, the minimum magnitude of the biasing force can be such that the first and second fixture mounts 444a and 444b are prevented from moving under their own weight (e.g., under the influence of gravity). In this case, the resistance or hindrance of the movement of the first and second fixture mounts 444a and 444b can be controlled by varying the magnitude of the biasing forces(s) generated by the position keep system. This can be accomplished through specific design of the various components of the equipment mounting assembly 410. Indeed, the position keep system can be configured, such that, once activated and the one or more biasing forces are applied, a pre-determined threshold force is required to be applied to the first and second fixture mounts 444a and 444b to overcome the biasing forces and a corresponding coefficient of static friction, and to cause the fixture mounts 444a and 444b to move within the retention system 470. It is noted that this pre-determined threshold force can be applied directly or indirectly, and can be carried out or achieved by manual manipulation of the first and second fixture mounts 444a and 444b, such as by a user or an operator.

In one aspect, the biasing system of the position keep system can comprise one or more elastic elements operable and configured to store and release energy, and to apply a biasing force to the first and second fixture mounts 444a and 444b. The elastic elements can be supported about the fixture mounts 444a, 444b or the mount support base 414, or both, such that the biasing force is applied between the first and second fixture mounts 444a, 444b and the mount support base 414. In one specific example, as shown, the position keep system can comprise one or more springs (e.g., see first and second springs 494 and 495) disposed in the first and second recesses 472a, 472b, the one or more springs 494, 495 being operable to apply or exert a biasing force on the first and second fixture mounts 444a, 444b as these are retained within the retention system 470.

In one aspect, the first and second springs 494, 495 can be disposed in respective first and second spring bays 497, 499 formed at least partially in the recess surfaces 478a and 478b (the first and second recesses 472a, 472b and their respective first and second recess surfaces 478a, 478b being adjacent one another, and separated by the intermediate landing 483), wherein the spring bays 497, 499 extend between the first and second recesses 472a, 472b through the slots formed in the intermediate landing 483. The first and second spring bays 497, 499 can be configured as recesses themselves to receive and retain the first and second springs 494, 495, respectively, wherein the springs 494, 495 are positioned within and extend through the slots of the intermediate landing 483, the first and second ends of each spring 494, 495 extending away from the landing 483. The first and second springs 494, 495 can be secured within the respective first and second spring bays 497, 499 by the third rail 486 as the third rail 486 is mounted to the landing 483, thereby holding the first and second springs 494, 495 in place within the spring bays 497, 499, respectively. In some examples, the first and second springs 494, 495 can be inserted into their respective spring bays 497, 499 and the third rail 486 can then be coupled to the landing 483 of the mount support base 414, wherein the first and second springs 494, 495 are prevented from being removed from the spring bays 497, 499 due to the third rail 486 being positioned about the spring bays 497, 499 so as to limit movement of the first and second springs 494, 495. More specifically, the first and second spring bays 497,498 can comprise a recess formed in the recess surfaces 478a,478b of the first and second recesses 472a,472b, respectively, the spring bays 497,498 being operable to receive the first and second springs 494, 495, respectively. The spring bays 497, 498 can be sized and configured, such that a lower spring support surface of the spring bays 497, 498 is formed or positioned below the recessed surfaces 478a, and 478b. The height or depth of the first and second spring bays 497, 499, as measured from the recessed surfaces 478a, 478b (i.e., the recessed distance of the lower spring support surface from the recessed surfaces 478a, 478b (or the secondary or clearance recess 465 discussed below)) can vary. In some examples, the height or depth of the spring bays 497, 498, as measured from the recessed surfaces 478a, 478b, can be less than a diameter of the first and second springs 494, 495, such that at least a portion of the first and second springs 494, 495, upon being received and seated within the spring bays 497, 499, respectively, extends upward from the first and second spring bays 497, 499, respectively, and above or beyond the recessed surfaces 478a, 478b, thereby providing a portion of the spring capable of coming in contact with an inserted fixture mount. In one aspect, the depth of the spring bays 497,498 can be such that the fixture mounts 444a,444b acting on the springs 494,495 contact the springs 494,495 along a central axis of the springs, thus preventing one side of the springs 494,495 from compressing a greater distance than an opposing side of the springs 494,495. However, this is not intended to be limiting in any way as the depth of the spring bays 497,498 can be such that the fixture mounts 444a or 444b, or both, contact the springs 494,495 at a location away from or off of the central axis of the springs 494,495. Unequal compression of the sides of the springs may be acceptable upon proper retention of the springs 494,495 within the spring bays 497,498 such that the springs are prevented from releasing or coming out of the spring bays 497,498. In addition, the spring bays 497, 499 can comprise a length that extends along a longitudinal axis, and that is configured to receive the first and second springs 494, 495, respectively, such that the first and second springs 494, 495 are oriented in a prone or horizontal manner (i.e., they are oriented such that they are laying on their side, and can extend and retract or compress in a plane parallel to a plane defined by the recessed surfaces 478a, 478b of the first and second recesses 472a, 472b, respectively) once received in the respective spring bays 497, 499 and acted upon by the fixture mounts 444a and 444b. In this position, the first and second springs 494, 495 are configured and operable to apply or exert a force against the sidewall of the base plate 446a of the first fixture mount 444a about the second side 458a of the base plate 446 as the first fixture mount 444a is inserted into the recess 472a, and captured in the retention system 470. Similarly, the first and second springs 494, 495 are configured to and operable to apply or exert a force against the sidewall of the base plate 446b of the second fixture mount 444b about the first side 456b as the second fixture mount 444b is inserted into the recess 472b, and captured in the retention system 470. Moreover, the spring bays 497, 499 can be located and configured such that they extend, or that they are at least partially formed, within a portion of both of the first and second recesses 472a, 472b, wherein the first and second springs 494, 495 extend between and into each of the first and second recesses 472a, 472b, so as to be in a position to come in contact with any fixture mount inserted into the first or second recesses 472a, 472b, or both. The distance the spring bays 497,499 (and the springs 494, 495) extend into the first and second recesses can vary. This can depend upon the type of springs used. Essentially, the spring bays 497,499 can be operable to receive the springs 494, 495, respectively, and to facilitate their compression and expansion along respective longitudinal axes (the long axes of the springs extending in a direction parallel to a direction of travel). In addition, the spring bays 497, 499 can be configured so as to position at least a portion of the springs 494, 495 (e.g., opposing ends of the springs 494, 495) within the capture channels 490 and 491, respectively, upon the third rail 486 being secured in place about the mount support base 414, as discussed herein.

The spring bays 497, 499 can be further configured, such that each end of the springs 494, 495 can be in contact with and can compress against an end wall portion of the spring bays 497, 499, wherein either end or both ends of each of the springs 494, 495 can be or comprise a free, movable end depending upon whether the first fixture mount 444a or the second fixture mount 444b is inserted and used, or both. In a nominal state (e.g., a state without any forces acting on the spring from a fixture mount), the springs can extend end to end in the spring bays 487,499. Indeed, the ends of the springs 494, 495 extending at least partially into the capture channels 490, 491 and that are intended to come in contact with and engage the first and second fixture mounts 444a and 444b, respectively, can travel back and forth within the capture channels 490 and 491 (and the spring bays 497, 499) a given distance as a result of being compressed by forces from the fixture mount(s) acting on the springs 494,495, wherein the springs 494, 495 are caused to store and release energy. The springs 494, 495 are also operable to mover relative to the intermediate landing 483 and the third rail 486. If both the first and second fixture mounts 444a, and 444b are simultaneously used, then the springs 494, 495 will compress in a bi-directional manner (the ends of the springs being compressed inward towards one another), each end exerting a biasing or spring force against its respective fixture mount. Sufficient clearance is provided in the spring bays 497, 499 and suitable springs can be used, such that bi-directional compression of the springs 494, 495 does not bottom out the springs. Indeed, sufficient compression distance and clearance can be provided to accommodate insertion of each of the first and second fixture mounts 444a, and 444b (e.g., at the same time or one at a time) into the recesses 472a,472b, such that the fixture mounts 444a,444b are captured within the retention system 470. On the other hand, if only the first or the second fixture mounts 444a or 444b are inserted and used, then the springs 494, 495 will compress in a single direction, with each spring bay 497, 499 serving to retain the springs 494, 495 so that they do not slide within the spring bays 497, 499. In other words, the spring bays 497, 499 can be configured to retain the springs 494, 495 in both directions and prevent their uncompressed sliding movement along a longitudinal axis of the springs 494, 495. The springs 494, 495 can even be restrained within the spring bays 497, 499 in a preloaded state (under at least some compression), thus facilitating secure retention of each end of the springs 494, 495 against the walls of the spring bays 497, 499 even when the springs 494, 495 are in their most expanded state uncompressed by any fixture mount.

The spring bays 497, 499 can further be configured to laterally constrain the springs 497, 490. Indeed, the spring bays 497, 499 can be configured to comprise a recess just slightly wider than the diameter of the springs, such that the walls of the spring bays 497, 499 are adjacent an outer edge or surface of the springs 494, 495, respectively, thus operating to constrain the springs 494, 495 in the lateral direction. In the example shown, the springs 494, 495 can travel along a longitudinal axis (an axis extending lengthwise of or about the springs 494,495) within the spring bays 497, 499 and the capture channels 490 and 491 from an extended or expanded position (where no energy is stored) to a compressed position (wherein the springs store energy). In one non-limiting example, the spring bays 497, 499 and the springs 494, 495 can be configured, such that, upon compression of the springs 494, 495 by the first fixture mount 444a, the second fixture mount 444b, or both, the ends of the springs 494, 495 travel a distance that allows the fixture mount(s) to clear the first and second rails 484,485, respectively, and to be fully inserted through the openings 492, 493 and to be seated within their respective recesses 472a,472b and captured within the retention system 470 without the springs 494, 495 bottoming out (see FIG. 9D). As such, even with both of the first and second fixture mounts 444a and 444b inserted into the retention system 470, the springs 494, 495 may not be fully compressed, but can comprise a remaining compression distance suitable to remove one or both of the fixture mounts 444a, 444b through further compression of the springs 494, 495.

The position keep system can further comprise base plate interface devices configured to be supported about the distal ends of the springs 494, 495, and configured to engage and interface with the base plates 446a, 446b of the first and second fixture mounts 444a and 444b, respectively. The base plate interface devices can comprise end caps, bumpers, or other similar structural components as discussed herein. For example, the springs 494,495 can each comprise end caps, such as those discussed above (see FIG. 8E).

As shown, the retention system 470 can be configured to accommodate and releasably secure two different fixture mounts. In one aspect, the fixture mounts can be of the same type and size (e.g., see FIGS. 9D and 9E). In another aspect, the retention system 470 can be configured to accommodate and receive and releasably secure fixture mounts of different sizes and/or types (e.g., see FIGS. 9A-9C and 9F). Although not shown, those skilled in the art will recognize that the first and second recesses 472a and 472b can be configured the same so as to accommodate the same type and size of fixture mount. However, that the equipment mounting assembly 410 can be more useful, more efficient and more practical, in another aspect, the retention system can be configured as shown, which retention system 470 can accommodate at least four different types and sizes of fixture mounts between the first and second recesses, not just the different first and second fixture mounts 444a and 444b shown in FIGS. 9A-9C and 9F. As such, the retention system 470 can be referred to herein as a universal retention system in that a single mount support base can quickly and releasably retain within the retention system 470, which functions as a quick-release type of retention system, a number of different types and sizes of fixture mounts (e.g., those from the same company, different companies) without the need for tools or fasteners to secure the fixture mounts to the mount support base. The retention system 470 can provide or facilitate a number of significant advantages over prior or conventional rigging setups and methods, including, but not limited to, multiple fixture mount rigging possibilities with a single mount support base, more efficient (i.e., faster) securing and release of fixture mounts (and thus the fixtures these support) to/from the mount support base, possible simultaneous dual fixture mount support, and others as discussed herein, and as will be apparent to those skilled in the art.

As shown, the first recess 472a can accommodate and receive and secure at least two different sized fixture mounts, namely different fixture mounts that have the same length, but different widths. Specifically, the first recess 472a is sized and configured so as to accept and receive and secure a first fixture mount having a first width and another or second fixture mount having a second width different from that of the first fixture mount. In this example, the first recess 472a can comprise a length $L_8$ (see FIG. 9B), and each of the different fixture mounts to be inserted therein can comprise the same length although they can differ in width. To achieve this function of facilitating the capture of different sized or configured fixture mounts within the first recess 472a, the first recess 472a can be sized for a largest fixture mount intended for use within the first recess 472a. From there, the first and third rails 484 and 486 can be configured and spaced relative to one another, and the position keep system can be configured, such that fixture mounts of different widths can be interchangeably inserted through the opening 492, into the first recess 472a, and still be retained within the capture channels 488 and 490. Much of the accommodation of the different sized fixture mounts will be facilitated by the elastic elements (e.g., the first and second springs 494, 495), which can compress a variable compression distance depending upon the particular fixture mount inserted and used. For example, the larger of two fixture mounts will compress the springs 494, 495 a greater distance than will a fixture mount having a smaller width. However, the springs 494, 495 can comprise a zero or uncompressed position, or in other examples a pre-compressed position, as well as a travel or compression distance sufficient to compress in response to either of the fixture mounts. Depending upon which fixture mount is used, the springs 494, 495 will come to rest at different compression distances, thus accommodating any difference in size between the two fixture mounts.

With respect to the second recess 472b, the retention system 470 can be configured to accommodate fixture mounts of different size (and/or type) in both the length and the width dimensions. In the example shown, which is not intended to be limiting in any way, the second recess 472b comprises a first fixture mount profile A and a second fixture mount profile B, these being illustrated by dotted lines (see FIG. 9B), with the profiles A and B representing the perimeter profile of the respective base plates of two different sized fixture mounts capable of being selected and inserted into the second recess 472b and captured within the retention system 470 (one or the other, and not at the same time), each having a different length and width from the other. To facilitate this, the recess 472b can be formed, sized and configured to receive a first fixture mount (its base plate corresponding to the fixture mount profile A) having a length just slightly smaller than the length $L_9$ between walls 474b and 476b and a given width. This configuration can be similar to that of the first recess 472a. The first fixture mount (of profile A) can be captured within the perimeter wall of the second recess 472b between the first and second ends 474b and 476b and the sides 496. The retention system 470, and more particularly the second recess 472b can further comprise a notch 493 formed within the perimeter wall of the recess 472b. In the example shown, the notch 493 is formed about the side 477b, although this is not intended to be limiting in any way. The notch 493 can be configured to facilitate capture of a second fixture mount of a different size having a base plate corresponding to the fixture mount profile B. The notch 493 can be formed into the shoulder 482 defining the portion of the wall of the recess 472b about the side 477b, such that the wall portion about the side 477b (the portion of the perimeter wall of the second recess 472b configured to apply a force on the fixture mount that counters or opposes the biasing spring force applied on the fixture mount by the springs 494, 495) is positioned in a position offset from the capture channel 491 and the springs 494, 495 a greater distance than the perimeter wall portions of the second recess 472b defining the sides 496 oriented and configured to apply an opposing force on the fixture mount of profile A that counters the biasing force applied by the springs 494, 495 to the fixture mount of profile A. Indeed, the wall portion along the side 477b is oriented orthogonal to a direction of spring or biasing force as applied by the springs 494, 495 on the second fixture mount. As such, the wall portion along the side 477b functions to apply a counter force on the fixture mount upon compressing the spring and inserting and securing the fixture mount within the second recess 472b of the retention system 470. The notch 493 can therefore define additional wall portions of the perimeter wall of the second recess 472b, namely ends 501 and 503 that serve to constrain the second fixture mount having the fixture mount profile B. The notch 493 can be formed anywhere along the perimeter wall of the second recess 472b, and can be formed so as to match or fit and accommodate the profile B of the second fixture mount capable of being inserted into the second recess 472b of the retention system 470. It is noted that the transition of the perimeter wall of the second recess 472b between the side 477b and the ends 501 and 503, as well as the transition between the sides 496 and the ends 472b and 474b can be gradual (e.g., the wall at these transitions can comprise a rounded corner, as shown), thus portions of the perimeter wall in these transition can be configured to also apply a counter force against the fixture mount along with the sides 477b and 496, even though not oriented exactly orthogonal to a direction of the biasing force as applied to the fixture mount.

Stated another way, the second recess 472b can comprise a stepped wall configuration along the side 477b, wherein the stepped wall comprises or defines a first wall portion 496' and a second side wall portion 477b' offset from one another a distance (e.g., to be determined by the type and size of fixture mount having the fixture mount profile B to be captured within the second recess 472b of the retention system 470), wherein the second side wall portion 477b' extends between end wall portions 501' and 503', which extend away from the wall portions 496' into the shoulder 482. The first fixture mount (of profile A) can be constrained or retained between the ends 474b and 476b and the wall portions 496', and the springs 494, 495. The second fixture mount (of profile B) can be constrained between the wall portion 477b' and the end wall portions 501' and 503', and the springs 494, 495.

It is noted that although the second rail 485 is shown as being configured to comprise a length greater than the length $L_9$ of the second recess 472b, and the same as that of the first rail 484, thereby minimizing manufacturing costs (i.e., the size of the second rail 485 can be the same as that of the first rail 484 so that only one size needs to be manufactured and so that the rails are interchangeable with one another), in another aspect, the second rail 485 can be made to match a length $L_9$ of the second recess 472b in a manner similar to how the first rail 484 matches the length $L_8$ of the first recess 472a, the length $L_9$ being less than the length $L_8$.

Those skilled in the art will recognize that the first or second recesses 472a and 472b, or both, can comprise a configuration that accommodates fixture mounts of different size, shape, and/or type. Moreover, those skilled in the art will recognize that one or both of the first and second recesses can be configured in a number of different ways by forming various (one or more) notches or steps within the perimeter wall of the recess(es) to achieve this. As such, the specific example configurations shown in the drawings and discussed herein are not intended to be limiting in any way. For example, as one alternative, the step or notch in the wall of the second recess 472b can be configured to accommodate a second fixture mount having a round or curved base plate, wherein the step or notch formed in the wall 477b can be formed to comprise a curved or rounded profile to match that of the second fixture mount. Those skilled in the art will further recognize that the retention system can comprise a single recess or a plurality of recesses (two, three, four, and so on), each with their own respective rails, biasing elements, and other components or elements as discussed herein. As such, the retention system 470 shown with first and second recesses 472a, 472b is not intended to be limiting in any way.

With the recesses of the retention system being configured to accommodate different sized and/or types of fixture mounts (e.g., the retention system 470 specifically shown being able to accommodate four different sized (or types) of fixture mounts (e.g., two different sized fixture mounts in each of the first and second recesses 472a and 472b)), significant advantages are had. For example, a single equipment mounting assembly, or more particularly a single mount support base, can accommodate multiple different fixture mounts as opposed to requiring four different equipment mounting assemblies and four different associated mount support bases for each of the different fixture mounts, thus minimizing manufacturing costs and reducing inventory requirements, promoting usage of many different types of fixture mounts, and providing other advantages that will be recognized by those skilled in the art.

In operation, the equipment mounting assembly 410 can be assembled and put into use to support various fixtures, such as production equipment (e.g., lights lighting equipment, and other rigging equipment) by securing one or both of the fixture mounts 444a and 444b to the mount support base 414 via the retention system 470 (and then coupling a fixture (not shown, but see FIG. 1) to the fixture mount 444). With the example equipment mounting assembly 410 shown, this can be accomplished by inserting the first fixture mount 444a through the access opening 492, and causing the base plate 446a, and particularly different portions of the base plate 446a (e.g., different edge portions) to be captured by the first and third rails 484, 486 and secured within the capture channels 488, 490, the access opening 492 being in communication with the capture channels 488, 490. In the present case, because the access opening 492 is sized to be smaller than the base plate 446a in order to be able to secure the first fixture mount 444a in the retention system 470 without it inadvertently releasing or disengaging, the first fixture mount 444a can be obtained and rotated about a longitudinal axis extending between the ends 452a, 454a of the base plate 446a of the fixture mount 444a so that it is oriented on an incline relative to the upper surface 416 or recess surface 478a of the mount support base 414 (referred to herein as an access angle) just prior to being inserted through the access opening 492 (see FIG. 9E). With the fixture mount 444a oriented on an access angle $\theta_1$, the second side 458a, for example, of the base plate 446a can be inserted initially through the access opening 492 until coming in contact with the recess surface 478a, the second side 458a subsequently being inserted into the capture channel 490, for example, as far as possible until the upper surface 448 of the base plate 446a comes in contact with the third rail 486, or is inserted a sufficient distance without contact. Once in this position, the fixture mount 444a can be rotated downward toward the mount support base 414, thereby decreasing the access angle to a new access angle $\theta_2$, wherein the second side 458a of the base plate 446a is able to be inserted further into the capture channel 490 causing the third rail 486 to slide along the upper surface 448 of the base plate 446a until contact of the third rail 486 with the upper surface 448 reaches a further point, thus limiting any further progression. In this position, the fixture mount 444a can be again rotated downward toward the mount support base 414, thereby further decreasing the access angle to a new access angle $\theta_3$, wherein the second side 458a of the base plate 446a is able to be inserted even further into the capture channel 490, again causing the third rail 486 to slide along the upper surface 448 of the base plate 446a until contact of the third rail 486 with the upper surface 448 reaches a still further point, which is just prior to when the first side 456a of the base plate 446a is able to clear the first rail 484. As can be seen, as the fixture mount 444a is rotated, it travels along an arcuate path. In addition, as the access angle θ is reduced and the second side 458a of the base plate 446 is caused to progress further into the capture channel 490, the first side 456a of the base plate 446 is brought toward the first rail 484 until the base plate 446 eventually comes to rest on the second rail 486 (see FIGS. 9E and 9D). Further insertion of the second side 458a of the base plate 446 into the capture channel 490 and further rotation of the fixture mount 444a and decrease of the access angle θ will permit the first side 456a to clear and move past the first rail 484, wherein the fixture mount 444a can subsequently be fully inserted into the first recess 472a and caused to be seated about or against the recess surface 478a. Insertion of the fixture mount 444a can also be accomplished by bringing both the second side 458a of the base plate 446 of the fixture mount 444a in contact with the recessed surface 478a, and the first side 456a of the base plate 446 in contact with the first rail 486, and then sliding the second side 458a of the base plate 446 along the recessed surface 478a and the first side 456a (particularly a bottom surface of the base plate 446) along the first rail 484 until the second side 458a of the base plate 446 is inserted a sufficient distance into the capture channel 490 and the first side 456a of the base plate 446 clears the first rail 484 and drops into the first recess 472a. Or, some combination of the above-described insertion steps can be utilized, as will be appreciated by those skilled in the art. Again, this will likely be carried out by the user with little thought to the specific insertion steps or process described.

Once the first fixture mount 444a is initially seated in the recess 472a with the base plate 446a against the recessed surface 478a, the first fixture mount 444a can then be caused to slide along the recess surface 478a toward the side 477a of the first recess 472a a sufficient distance to insert the first side 456a of the base plate 446 into the capture channel 488, thereby capturing the first side 456a in the capture channel 488, and fully securing the first fixture mount 444 to the mount support base 414 (this being the ultimate capture position)(see FIG. 9D). Upon doing so, the retention system 470 can be configured so as to maintain the second side 458a of the base plate 446 of the fixture mount 444 within the capture channel 490.

The same above described process can be carried out for insertion of the second fixture mount 444b within the second recess 472b and the associated capture channels 489 and 491.

The outer or end capture channels 488 and 489 can be sized to be smaller (i.e., smaller in length as defined by the distance between the edge of the respective rails 484,485 and the wall of the recess 472a under the rail) than the inner or center capture channels 490 and 491). Stated another way, this can be accomplished by configuring the retention system 470, such that the overhang distance of the first and second rails 484 and 485 are less than the overhang distances provided by the third rail 486. This can be done in a similar manner as taught above with respect to FIGS. 8A-8I. With the retention system 470 thus configured, the first and second fixture mounts 444a and 444b are caused to be removable from only one direction. In its secured position, the equipment mounting assembly 410 is setup or formed, and ready to receive and support a fixture. It is noted that although the above-recited process is described in a stepwise manner, that this is not intended to be limiting, but merely to assist in the understanding of the process. In practice, it is likely that the above-recited process will be carried out in a single rapid motion.

Regarding the fixture mount insertion and capture process, as the first fixture mount 444a is being inserted into the first recess 472a and the capture channels 488, 490, the position keep system, in the form of a biasing system comprising the springs 494, 495 in the example shown, functions to exert a biasing force on the first fixture mount 444a, and particularly the base plate 446. Specifically, as the second side 458a of the base plate 446a of the fixture mount 444a is inserted into the capture channel 490, the second side 458a can be brought into contact with the springs 494, 495. Further insertion progression of the fixture mount 444a, and particularly the base plate 446, into the capture channel 490 can be carried out by exerting a sufficient force on the fixture mount 444a so as to overcome the biasing or spring force exerted by the springs 494, 495. As the biasing or spring force is overcome, the springs 494, 495 will compress, sliding within their respective spring bays 497, 499, wherein potential energy is stored within the springs 494, 495. The minimum amount of insertion of the base plate 446 into the capture channel 490 and the minimum displacement distance of the springs 494, 405 will depend upon the configuration of the capture channels 488, 490 and the opening 492, such that further insertion of the base plate 446a into the capture channel 490 can cease when the first side 456a of the base plate 446 is able to clear the first rail 484 to allow the fixture mount 444 to be fully inserted into the recess 472a with the base plate 446a fully seated against the recess surface 478a. With the fixture mount 444a in this position, the position keep system can be caused to release its stored potential energy to exert or apply a magnitude of force on the fixture mount 444a to cause the fixture mount 444a to slide along the recessed surface 478a until the first side 456a of the base plate 446 is inserted into the capture channel 488, with the first side 456a ultimately coming to rest against, and being positioned about, the side 475a of the recess 472a. As can be seen, the recess 472a, and the associated capture channels 488, 490 are sized and configured to permit a calculated amount of bi-directional translational movement of the fixture mount 444a once it is fully seated about the recess surface 478a. With the first side 456a of the base plate 446a pressed against and engaging the side 475a of the recess, the fixture mount 444a is retained in a captured position about the mount support base 414 by the retention system 470, with both the first and second sides 456a, 458a retained within the capture channels 488, 490, respectively. The fixture mount 444 can be held in this position by the position keep system, in this example the springs 494, 495, wherein the springs 494, 495 function to maintain a constant biasing or spring force on the fixture mount 444a that forces the fixture mount 444a against the side 475a of the recess 472a of the mount support base 414. This constant biasing force is made possible due to the configuration of the retention system 470 where the elastic element, the springs 494, 495 in this example, is allowed to only partially expand. In other words, with the fixture mount 444a in a captured position (the first and second sides 456a, 458a secured within their respective capture channels) the springs 494, 495 are at least partially compressed, such that they maintain a constant exerted biasing force on the fixture mount 444a, thus holding the fixture mount 444 in place in its proper captured position within the retention system 470 and on the mount support base 414.

The same above-described process can be carried out for insertion of the second fixture mount 444b within the second recess 472b and the associated capture channels 489 and 491. Furthermore, to release the first and second fixture mounts 444a and 444b from the mount support base 414, the above-recited steps for insertion and engagement can be reversed as will be appreciated by those skilled in the art, and thus not discussed in detail herein.

It is noted that with the first and second fixture mounts 444a and 444b in their captured and secured position within the retention system 470 and about the mount support base 414, the first and second fixture mounts 444a and 444b will be biased against and away from one another due to the fact that they utilize the same springs 494, 495, which are situated between the first and second fixture mounts 444a and 444b, and which are exerting a spring or biasing force on each of the first and second fixture mounts 444a and 444b (see FIG. 9D). With both of the first and second fixture mounts 444a and 444b captured and secured within the retention system 470, the magnitude of the applied spring force will be higher than if only one were present. It is noted that if either one of the first or second fixture mounts are removed, with the other remaining captured in the retention system 470, this will not affect the secured capture of the remaining fixture mount as the springs 494, 495 will expand to contact the wall of the spring bays 497, 499, thereby preserving the biasing or spring force being applied to the remaining fixture mount. Although this might reduce the magnitude of the biasing or spring force being applied to the remaining fixture mount, such calculations can be contemplated and accounted for in the design of the retention system 470 in order to facilitate and maintain the proper capture and function of the remaining fixture element.

As discussed herein, it is noted that although two springs are shown, this is not intended to be limiting in any way as any number of springs may be used, as well as springs of different types. In addition, although the springs are shown as comprising coil springs, those skilled in the art will recognize that other types of springs can be used. It is still further noted that the position keep system could instead comprise elastomeric elements that function in a similar manner as discussed above with respect to the springs 494, 495. It is still further noted that the position keep system could comprise additional elastomeric elements (e.g., additional springs (more than two)) implemented within the recesses 472a and 472b in a similar manner and that comprise a similar function as discussed with respect to the springs 494, 495. For example, spring bays and springs could be formed into the recesses that are associated with the outer capture channels, and that oppose the springs associated with the central capture channels. In this case, the fixture mount 444 could be caused to float between the biasing elements, which could operate to apply or exert opposing biasing forces on the fixture mount 444. Still further, in another example, the position keep system, including the biasing system, any bays, and any elastic components, could be associated only with the second end 476 of the recess 472a, along with any clearance recesses that could also be formed about or at the second end 476 and associated with the capture channel 488.

The equipment mounting assembly 410, and particularly the retention system 470, can further comprise one or more secondary or clearance recesses (e.g., see first and second clearance recesses 465a and 465b associated with recesses 472a and 472b, respectively) formed within the mount support base 414, and specifically within the recess surfaces 478a,478b of the first and second recesses 472a and 472b. The first and second clearance recesses 465a,465b can be similar in form and function as those described above with respect to the examples shown in FIGS. 8A-8I, and as such, the above description is incorporated here, where applicable and where. The first clearance recess 465a can be formed about or at the first side 477a of the first recess 472a, and can extend a distance into the recess surface 478a beyond the edge of the third rail 486 overhanging the intermediate landing 483. The second clearance recess 465b can be formed about or at the first side 475b of the recess 472b, and can extend a distance into the recess surface 478b beyond the edge of the third rail 486 overhanging the intermediate landing 483. The first and second clearance recesses 465a and 465b can be located on opposing sides of the landing 483 about the sides 477a and 475b of the first and second recesses 472a and 472b, respectively, and can at least partially define the capture channels 490 and 491, respectively. As can be seen, first and bays, in this example spring bays 497, 499, can be formed in the clearance recess surfaces of the clearance recesses 465a and 465b of the mount support base 414 rather than in the recess surfaces 478a,478b of the first and second recesses 472a,472b discussed above. Other than this, the spring bays 497,499 can function in a similar manner as discussed above. The first secondary or clearance recess 465a and the edge of the third rail 486 extending into the first recess 472a can form an opening to receive an edge of the base plate of the first fixture mount 444a as it is being inserted into the retention system 470. Likewise, the second clearance recess 465b and the edge of the third rail 486 extending into the second recess 472b can form a second opening to receive an edge of the base plate of the second fixture mount 444a as it is being inserted into the retention system 470. The clearance recesses 465a and 465b can be located on opposite sides of the intermediate landing 483, and can further be defined by the intermediate landing 483. Moreover, the third rail 486 can cover and retain any elastic elements (e.g., see elastic elements in the form of springs 494,495) situated or disposed in respective spring bays 497,499.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. An equipment mounting system facilitating support of a piece of equipment, comprising:
   a mount support base having an upper surface; and
   a retention system supported by the mount support base, and operable to releasably capture at least one fixture mount and secure the at least one fixture mount to the mount support base, the retention system comprising:
   a first capture channel defined at least in part by a portion of the mount support base;
   a second capture channel defined at least in part by a portion of the mount support base;
   a first recess formed in the upper surface of the mount support base, the first recess comprising a recess surface, a perimeter wall, and first and second fixture mount profiles different from one another, the first recess being operable to interchangeably capture first and second fixture mounts comprising first and second perimeter profiles different from one another corresponding to the first and second fixture mount profiles, respectively, of the first recess.

2. The equipment mounting system of claim 1, wherein the retention system further comprises a position keep system operable to maintain a position of the fixture mount relative to the mount support base once the fixture mount is captured by and secured within the retention system.

3. The equipment mounting system of claim 2, wherein the position keep system comprises a biasing system associated with the first capture channel, the biasing system comprising at least one elastic component operable to provide a biasing force to the fixture mount as the fixture mount is being inserted into the retention system, and to provide a threshold biasing force between the fixture mount and the mount support base once the fixture mount is captured by and secured within the retention system, such that movement between the fixture mount and the mount support base is resisted.

4. The equipment mounting system of claim 3, wherein the retention system further comprises at least one bay formed, at least in part, in a surface of the mount support base, the elastic component retained within the bay, and the bay being associated with the first capture channel.

5. The equipment mounting system of claim 3, wherein the position keep system further comprises a base plate interface device operable with the elastic component of the biasing system, the base plate interface device being operable to engage and interface with the base plate of the fixture mount.

6. The equipment mounting system of claim 5, further comprising:
a second recess formed in the mount support base;
a second retention system associated and operable with the second recess; and
a second position keep system associated and operable with the second recess,
wherein the second recess is positioned at a location different from that of the first recess.

7. The equipment mounting system of claim 1, wherein the retention system comprises:
a first rail secured to the mount support base at a first position adjacent the first recess, wherein a portion of the first rail extends beyond the perimeter wall of the first recess, such that the portion of the first rail and a first portion of the first recess surface define, at least in part, the first capture channel;
a second rail secured to the mount support base at a second position adjacent the first recess, wherein a portion of the second rail extends beyond the perimeter wall of the first recess, such that the portion of the second rail and a second portion of the first recess surface define, at least in part, the second capture channel,
wherein the first and second rails are positioned so as to define an access opening in communication with the first and second capture channels.

8. The equipment mounting system of claim 7, wherein the mount support base further comprises:
a first shoulder formed in the upper surface of the mount support base adjacent the first recess, the first shoulder being configured to receive and support the first rail in the first position; and
a second shoulder formed in the upper surface of the mount support base adjacent the first recess, the second shoulder being configured to receive and support the second rail in the second position,
wherein the first and second shoulders are recessed in the upper surface of the mount support base at a given depth, such that an upper surface of each of the first and second rails is positioned in one of a position flush with the upper surface of the mount support base, or a position below the upper surface of the mount support base.

9. The equipment mounting system of claim 7, wherein a length of the each of the first and second rails is greater than a width of the first recess.

10. The equipment mounting system of claim 7, wherein the distance between opposing edges of the first and second rails and a resulting length of the access opening is smaller than a length of the first fixture mount and a length of the second fixture mount, such that the first and second fixture mounts cannot be removed from the retention system solely by displacing it along an axis normal to the upper surface of the mount support base.

11. The equipment mounting system of claim 7, wherein the first recess comprises a length sized so as to facilitate movement of the first and second fixture mounts between the first and second capture channels.

12. The equipment mounting system of claim 7, wherein the retention system further comprises:
a bay formed, at least in part, in the recess surface of the first recess at a first end of the first recess, the bay being associated with the first capture channel; and
an elastic element situated in the bay,
wherein at least part of the elastic element is positioned within the first capture channel.

13. The equipment mounting system of claim 12, wherein the first rail operates to retain the elastic element within the bay.

14. The equipment mounting system of claim 7, wherein the retention system further comprises a clearance recess formed in the recess surface of the first recess at a first end of the first recess, the clearance recess being associated with the first capture channel.

15. The equipment mounting system of claim 14, wherein the clearance recess comprises a clearance recess surface positioned at a depth relative to the upper surface of the support mount greater than a depth of the recess surface relative to the support mount.

16. The equipment mounting system of claim 14, wherein the clearance recess surface of the clearance recess extends away from a sidewall of the recess at the first end of the first recess a given distance beyond the first rail, such that an edge of the first rail and a sidewall of the clearance recess define an opening.

17. The equipment mounting system of claim 14, wherein the retention system further comprises a bay formed, at least in part, in the clearance recess surface of the clearance recess, and an elastic element situated in the bay, such that at least part of the elastic element is positioned within the first capture channel.

18. The equipment mounting system of claim 1, wherein the retention system comprises:
a second recess formed in the upper surface of the mount support base, the second recess comprising a recess surface, and a perimeter wall.

19. The equipment mounting system of claim 18, wherein the first and second recesses are positioned adjacent one another, and wherein the retention system further comprises:
an intermediate landing that defines a portion of each of the perimeter walls of the first and second recesses;
a central rail operable with both of the first and second recesses, and supported by the intermediate landing;
a third capture channel; and
a fourth capture channel,
wherein the second and fourth capture channels are defined, at least in part, by the central rail, and
wherein the first and second capture channels are associated with the first recess, and wherein the third and fourth capture channels are associated with the second recess.

20. The equipment mounting system of claim 18, wherein the first and second recesses are positioned adjacent one another, and wherein the retention system further comprises:

an intermediate landing separating the first and second recesses, the intermediate landing defining at least part of each of the first and second recesses;

a first rail secured to the mount support base at a first position adjacent the first recess, wherein a portion of the first rail extends beyond the perimeter wall of the first recess, such that the portion of the first rail and a first portion of the first recess surface of the first recess define, at least in part, the first capture channel;

a second rail secured to the mount support base at a first position adjacent the second recess, wherein a portion of the second rail extends beyond the perimeter wall of the second recess, such that the portion of the second rail and a first portion of the recess surface of the second recess define, at least in part, a third capture channel;

a central rail secured to the mount support base over, and supported by, the intermediate landing, wherein a first portion of the central rail extends beyond a perimeter wall of the intermediate landing, such that the first portion of the central rail and a second portion of the recess surface of the first recess define, at least in part, the second capture channel, and wherein a second portion of the central rail extends beyond the perimeter wall of the intermediate landing in a different direction, such that the second portion of the central rail and a second portion of the recess surface of the second recess define, at least in part, a fourth capture channel.

21. The equipment mounting system of claim 18, wherein the second recess comprises third and fourth fixture mount profiles, the second recess being a operable to interchangeably capture third and fourth fixture mounts comprising third and fourth perimeter profiles corresponding to the third and fourth fixture mount profiles, respectively, of the second recess.

22. The equipment mounting system of claim 18, wherein the first recess comprises a notch formed within its perimeter wall about one side, the notch facilitating the first recess to comprise the first and second fixture mount profiles.

23. The equipment mounting system of claim 18, wherein the retention system further comprises a first clearance recess formed in the recess surface of the first recess, and wherein the retention system further comprises a second clearance recess formed in the recess surface of the second recess.

24. The equipment mounting system of claim 23, wherein the first and second clearance recesses each comprises a clearance recess surface positioned at a depth relative to the upper surface of the support mount greater than a depth of respective recess surfaces of the first and second recesses relative to the support mount.

25. The equipment mounting system of claim 23, wherein the clearance recess surface of the first clearance recess extends away from a first sidewall of the intermediate landing a given distance beyond the central rail, such that a first edge of the central rail and a sidewall of the clearance recess define an opening, and wherein the clearance recess surface of the second clearance recess extends away from a second sidewall of the intermediate landing a given distance beyond the central rail, such that a second edge of the central rail and a second sidewall of the clearance recess define a second opening.

26. The equipment mounting system of claim 23, wherein the retention system further comprises at least one bay operable to retain an elastic member formed in the first and second clearance recesses, through the intermediate landing, the central rail covering the bay and retaining the elastic member in place within the bay, the elastic member at least partially extending into each of the second and fourth capture channels.

27. An equipment mounting system facilitating support of a piece of equipment, comprising:
   a mount support base having an upper surface; and
   a retention system supported by the mount support base, and operable to releasably capture at least one fixture mount and secure the at least one fixture mount to the mount support base, the retention system comprising:
      a first capture channel defined at least in part by a portion of the mount support base;
      a second capture channel defined at least in part by a portion of the mount support base;
      a first recess formed in the upper surface of the mount support base, the first recess comprising a recess surface, a perimeter wall, and at least one fixture mount profile;
      a second recess formed in the upper surface of the mount support base, the second recess comprising a recess surface, a perimeter wall, and at least one fixture mount profile, the first and second recesses being positioned adjacent one another;
      an intermediate landing that defines a portion of each of the perimeter walls of the first and second recesses;
      a central rail operable with both of the first and second recesses, and supported by the intermediate landing;
      a third capture channel; and
      a fourth capture channel,
   wherein the second and fourth capture channels are defined, at least in part, by the central rail, and
   wherein the first and second capture channels are associated with the first recess, and wherein the third and fourth capture channels are associated with the second recess.

28. An equipment mounting system facilitating support of a piece of equipment, comprising:
   a mount support base having an upper surface; and
   a retention system supported by the mount support base, and operable to releasably capture at least one fixture mount and secure the at least one fixture mount to the mount support base, the retention system comprising:
      a first capture channel defined at least in part by a portion of the mount support base;
      a second capture channel defined at least in part by a portion of the mount support base;
      a first recess formed in the upper surface of the mount support base, the first recess comprising a recess surface, a perimeter wall, and at least one fixture mount profile;
      a second recess formed in the upper surface of the mount support base, the second recess comprising a recess surface, a perimeter wall, and at least one fixture mount profile, the first and second recesses being positioned adjacent one another;
      a first clearance recess formed in the recess surface of the first recess; and
      a second clearance recess formed in the recess surface of the second recess.

29. An equipment mounting system facilitating support of a piece of equipment, comprising:
   a mount support base having an upper surface; and
   a retention system supported by the mount support base, and operable to releasably capture at least one fixture mount and secure the at least one fixture mount to the mount support base, the retention system comprising:

a first capture channel defined at least in part by a portion of the mount support base;

a second capture channel defined at least in part by a portion of the mount support base;

a first recess formed in the upper surface of the mount support base, the first recess comprising a recess surface, a perimeter wall, and at least one fixture mount profile;

a second recess formed in the upper surface of the mount support base, the second recess comprising a recess surface, a perimeter wall, and at least one fixture mount profile, wherein the first and second recesses are positioned adjacent one another;

an intermediate landing separating the first and second recesses, the intermediate landing defining at least part of each of the first and second recesses;

a first rail secured to the mount support base at a first position adjacent the first recess, wherein a portion of the first rail extends beyond the perimeter wall of the first recess, such that the portion of the first rail and a first portion of the first recess surface of the first recess define, at least in part, the first capture channel;

a second rail secured to the mount support base at a first position adjacent the second recess, wherein a portion of the second rail extends beyond the perimeter wall of the second recess, such that the portion of the second rail and a first portion of the recess surface of the second recess define, at least in part, a third capture channel; and a central rail secured to the mount support base over, and supported by, the intermediate landing, wherein a first portion of the central rail extends beyond a perimeter wall of the intermediate landing, such that the first portion of the central rail and a second portion of the recess surface of the first recess define, at least in part, the second capture channel, and wherein a second portion of the central rail extends beyond the perimeter wall of the intermediate landing in a different direction, such that the second portion of the central rail and a second portion of the recess surface of the second recess define, at least in part, a fourth capture channel.

30. An equipment mounting system facilitating support of a piece of equipment, comprising:

a mount support base having an upper surface; and a retention system supported by the mount support base, and operable to releasably capture at least one fixture mount and secure the at least one fixture mount to the mount support base, the retention system comprising:

a first capture channel defined at least in part by a portion of the mount support base;

a second capture channel defined at least in part by a portion of the mount support base;

a first recess formed in the upper surface of the mount support base, the first recess comprising a recess surface and a perimeter wall;

a second recess formed in the upper surface of the mount support base, the second recess comprising a recess surface, a perimeter wall, and at least one fixture mount profile, wherein the second recess comprises third and fourth fixture mount profiles, the second recess being operable to interchangeably capture third and fourth fixture mounts comprising third and fourth perimeter profiles corresponding to the third and fourth fixture mount profiles, respectively, of the second recess.

31. An equipment mounting system facilitating support of a piece of equipment, comprising:

a mount support base having an upper surface; and a retention system supported by the mount support base, and operable to releasably capture at least one fixture mount and secure the at least one fixture mount to the mount support base, the retention system comprising:

a first capture channel defined at least in part by a portion of the mount support base;

a second capture channel defined at least in part by a portion of the mount support base;

a first recess formed in the upper surface of the mount support base, the first recess comprising a recess surface, a perimeter wall, and at least one fixture mount profile;

a second recess formed in the upper surface of the mount support base, the second recess comprising a recess surface, a perimeter wall, and at least one fixture mount profile, wherein the first recess comprises a notch formed within its perimeter wall about one side, the notch facilitating the first recess to comprise the first and second fixture mount profiles.

* * * * *